(12) United States Patent
Ogino

(10) Patent No.: US 12,218,338 B2
(45) Date of Patent: Feb. 4, 2025

(54) ELECTRODE, STORAGE BATTERY, POWER STORAGE DEVICE, AND ELECTRONIC DEVICE

(71) Applicant: SEMICONDUCTOR ENERGY LABORATORY CO., LTD., Atsugi (JP)

(72) Inventor: Kiyofumi Ogino, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 77 days.

(21) Appl. No.: 17/569,537

(22) Filed: Jan. 6, 2022

(65) Prior Publication Data

US 2022/0302433 A1  Sep. 22, 2022

Related U.S. Application Data

(63) Continuation of application No. 15/207,219, filed on Jul. 11, 2016, now Pat. No. 11,289,692.

(30) Foreign Application Priority Data

Jul. 16, 2015 (JP) .................................. 2015-142050

(51) Int. Cl.
*H01M 4/134* (2010.01)
*H01G 11/28* (2013.01)
(Continued)

(52) U.S. Cl.
CPC ............ *H01M 4/134* (2013.01); *H01G 11/28* (2013.01); *H01G 11/32* (2013.01); *H01G 11/38* (2013.01);
(Continued)

(58) Field of Classification Search
CPC .... H01M 4/1395; H01M 4/386; H01M 4/134; H01M 4/622; H01M 4/625;
(Continued)

(56) References Cited

U.S. PATENT DOCUMENTS 7,179,561 B2   2/2007  Niu et al.
7,745,047 B2   6/2010  Zhamu et al.
(Continued)

FOREIGN PATENT DOCUMENTS

CN   102694155 A      9/2012
CN   103985848 A  *  8/2014  ............. B82Y 40/00
(Continued)

OTHER PUBLICATIONS

Machine translation of Chinese Patent Publication No. 103985848, published Aug. 13, 2014. (Year: 2014).*

(Continued)

*Primary Examiner* — Stewart A Fraser
*Assistant Examiner* — Lilia Nedialkova
(74) *Attorney, Agent, or Firm* — NIXON PEABODY LLP; Jeffrey L. Costellia

(57) ABSTRACT

A power storage device with high capacity is provided. A power storage device with high energy density is provided. A highly reliable power storage device is provided. A long-life power storage device is provided. An electrode with high capacity is provided. An electrode with high energy density is provided. A highly reliable electrode is provided. Such a power storage device includes a first electrode and a second electrode. The first electrode includes a first current collector and a first active material layer. The first active material layer includes active material particles, spaces provided on the periphery of the active material particles, graphene, and a binder. The active material particles are silicon. The active material particles and the spaces are surrounded by the graphene and the binder.

11 Claims, 31 Drawing Sheets

(51) Int. Cl.
| | |
|---|---|
| *H01G 11/32* | (2013.01) |
| *H01G 11/38* | (2013.01) |
| *H01G 11/42* | (2013.01) |
| *H01M 4/1395* | (2010.01) |
| *H01M 4/38* | (2006.01) |
| *H01M 4/62* | (2006.01) |
| H01G 11/66 | (2013.01) |
| H01G 11/84 | (2013.01) |
| H01M 10/0525 | (2010.01) |

(52) U.S. Cl.
CPC ............ *H01G 11/42* (2013.01); *H01M 4/386* (2013.01); *H01M 4/622* (2013.01); *H01M 4/625* (2013.01); H01G 11/66 (2013.01); H01G 11/84 (2013.01); H01M 4/1395 (2013.01); H01M 10/0525 (2013.01); Y02E 60/10 (2013.01); Y02E 60/13 (2013.01)

(58) Field of Classification Search
CPC ... H01M 10/0525; H01G 11/28; H01G 11/32; H01G 11/38; H01G 11/42; H01G 11/66; H01G 11/84; Y02E 60/10; Y02E 60/13
See application file for complete search history.

(56) References Cited

U.S. PATENT DOCUMENTS

| | | | |
|---|---|---|---|
| 7,842,432 B2 | 11/2010 | Niu et al. | |
| 7,939,218 B2 | 5/2011 | Niu | |
| 7,977,007 B2 | 7/2011 | Niu et al. | |
| 7,977,013 B2 | 7/2011 | Niu et al. | |
| 8,003,257 B2 | 8/2011 | Takeuchi et al. | |
| 8,278,011 B2 | 10/2012 | Zhu et al. | |
| 8,685,362 B2 | 4/2014 | Takeuchi et al. | |
| 8,685,569 B2 | 4/2014 | Oguni et al. | |
| 9,276,257 B2 | 3/2016 | Takeuchi et al. | |
| 9,680,272 B2 | 6/2017 | Ogino | |
| 9,929,408 B2 | 3/2018 | Inoue et al. | |
| 10,593,940 B2 | 3/2020 | Ogino et al. | |
| 2005/0064291 A1* | 3/2005 | Sato ................. | H01M 4/386 429/231.95 |
| 2008/0254296 A1 | 10/2008 | Handa et al. | |
| 2009/0305135 A1 | 12/2009 | Shi et al. | |
| 2010/0143798 A1 | 6/2010 | Zhamu et al. | |
| 2010/0176337 A1 | 7/2010 | Zhamu et al. | |
| 2010/0248034 A1 | 9/2010 | Oki et al. | |
| 2010/0288970 A1* | 11/2010 | Watanabe ............ | H01M 4/134 216/13 |
| 2010/0330421 A1 | 12/2010 | Cui et al. | |
| 2011/0012067 A1 | 1/2011 | Kay | |
| 2011/0111303 A1 | 5/2011 | Kung et al. | |
| 2011/0121240 A1 | 5/2011 | Amine et al. | |
| 2011/0159372 A1 | 6/2011 | Zhamu et al. | |
| 2011/0229795 A1 | 9/2011 | Niu et al. | |
| 2012/0308884 A1 | 12/2012 | Oguni et al. | |
| 2012/0308894 A1 | 12/2012 | Oguni et al. | |
| 2012/0328956 A1 | 12/2012 | Oguni et al. | |
| 2013/0045418 A1 | 2/2013 | Oguni et al. | |
| 2013/0052547 A1 | 2/2013 | Ogino et al. | |
| 2013/0089783 A1 | 4/2013 | Yoo et al. | |
| 2013/0189575 A1* | 7/2013 | Anguchamy ......... | H01M 4/134 977/948 |
| 2013/0212879 A1 | 8/2013 | Ogino | |
| 2013/0323585 A1 | 12/2013 | Inoue et al. | |
| 2014/0004412 A1 | 1/2014 | Ogino | |
| 2014/0057165 A1 | 2/2014 | Yamakaji et al. | |
| 2015/0050556 A1 | 2/2015 | Liu et al. | |
| 2015/0132649 A1 | 5/2015 | Ogino et al. | |
| 2015/0270534 A1 | 9/2015 | Nozato et al. | |
| 2016/0365573 A1 | 12/2016 | Li et al. | |
| 2017/0279239 A1 | 9/2017 | Ogino | |

FOREIGN PATENT DOCUMENTS

| | | |
|---|---|---|
| EP | 2579366 A | 4/2013 |
| JP | 2001-283834 A | 10/2001 |
| JP | 2002-252028 A | 9/2002 |
| JP | 2006-265751 A | 10/2006 |
| JP | 2007-042620 A | 2/2007 |
| JP | 2007-294196 A | 11/2007 |
| JP | 2009-524567 | 7/2009 |
| JP | 2009-176721 A | 8/2009 |
| JP | 2011-503804 | 1/2011 |
| JP | 2011-048992 A | 3/2011 |
| JP | 2011-517053 | 5/2011 |
| JP | 2012-182101 A | 9/2012 |
| JP | 2012-227047 A | 11/2012 |
| JP | 2013-187097 A | 9/2013 |
| JP | 2013-191552 A | 9/2013 |
| JP | 2015-514310 | 5/2015 |
| JP | 2015-111566 A | 6/2015 |
| JP | 2015-118924 A | 6/2015 |
| WO | WO-2006/062947 | 6/2006 |
| WO | WO-2007/004728 | 1/2007 |
| WO | WO-2007/061945 | 5/2007 |
| WO | WO-2009/061685 | 5/2009 |
| WO | WO-2009/127901 | 10/2009 |
| WO | WO-2009/144600 | 12/2009 |
| WO | WO-2013/140177 | 9/2013 |

OTHER PUBLICATIONS

Liu.N et al., "A pomegranate-inspired nanoscale design for large-volume change lithium battery anodes", Nature Nanotechnology, Feb. 16, 2014, vol. 9, pp. 187-192.
Nguyen.C et al., "Comparative Study of Fluoroethylene Carbonate and Vinylene Carbonate for Silicon Anodes in Lithium Ion Batteries", J. Electrochem. SOC. (Journal of the Electrochemical Society), 2014, vol. 161, No. 12, pp. A1933-A1938.
Zhou.X et al., "Graphene modified LiFePO4 cathode materials for high power lithium ion batteries", J. Mater. Chem. (Journal of Materials Chemistry), 2011, vol. 21, pp. 3353-3358.
Su.F et al., "Flexible and planar graphene conductive additives for lithium-ion batteries", J. Mater. Chem. (Journal of Materials Chemistry), 2010, vol. 20, pp. 9644-9650.
Yu.G et al., "Solution-Processed Graphene/MnO2 Nanostructured Textiles for High-Performance Electrochemical Capacitors", Nano Letters, 2011, vol. 11, No. 7, pp. 2905-2911.
Yun.Q et al., "'Concrete' inspired construction of a silicon/carbon hybrid electrode for high performance lithium ion battery", Carbon, May 16, 2015, vol. 93, pp. 59-67.
Cover, Cambridge Dictionary, Cambridge University Press.
Chinese Office Action (Application No. 201610556782.6) Dated Jun. 24, 2020.

* cited by examiner

FIG. 20A
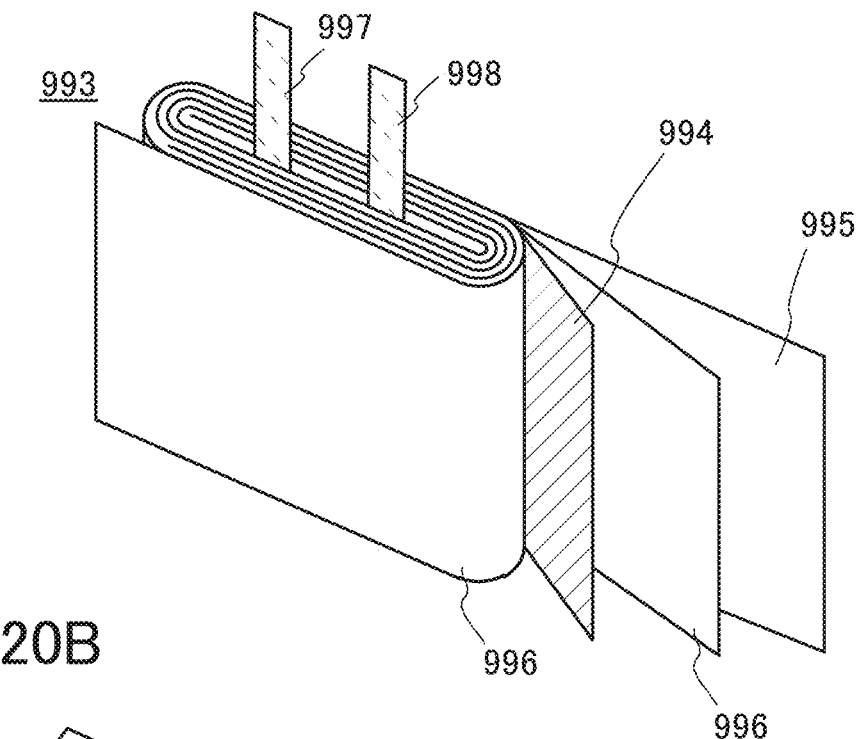
FIG. 20B
FIG. 20C
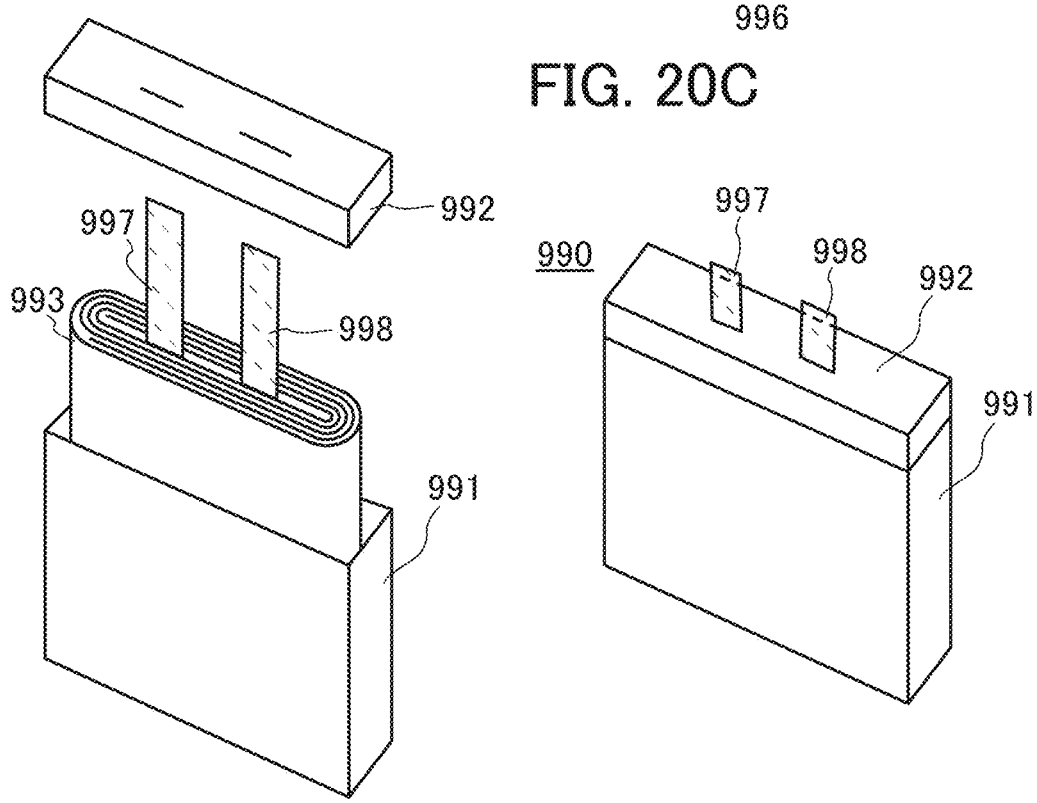

FIG. 22A1 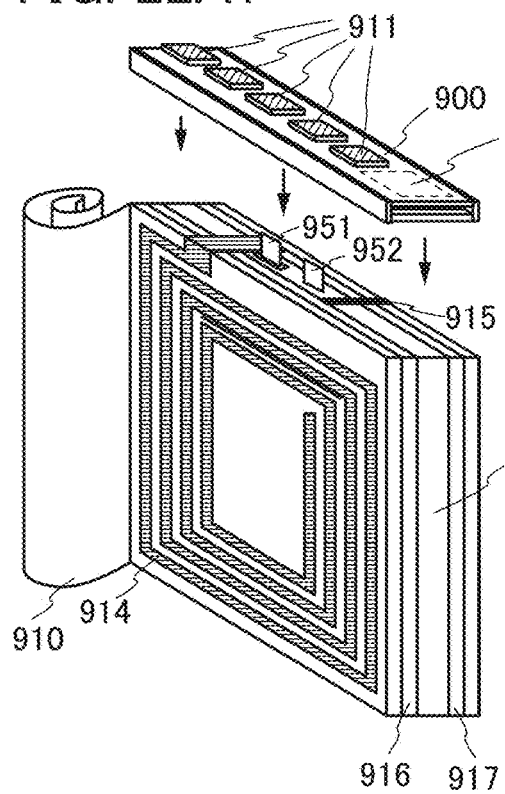 FIG. 22A2 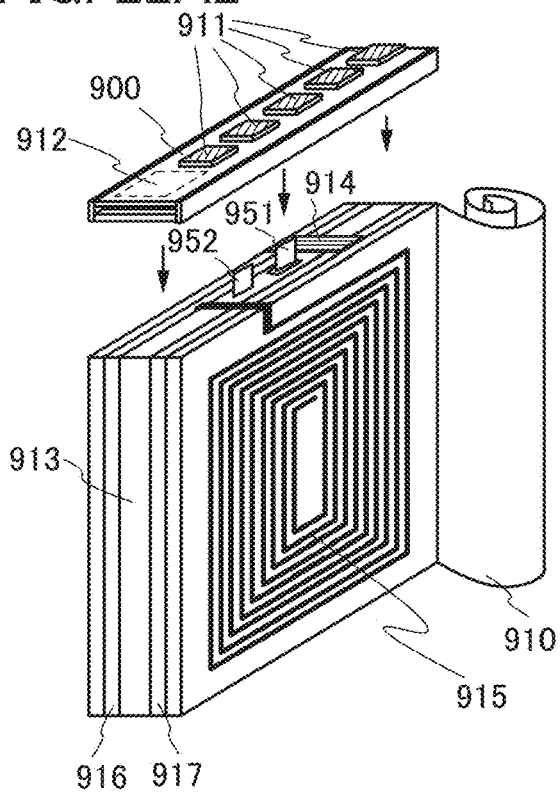
FIG. 22B1 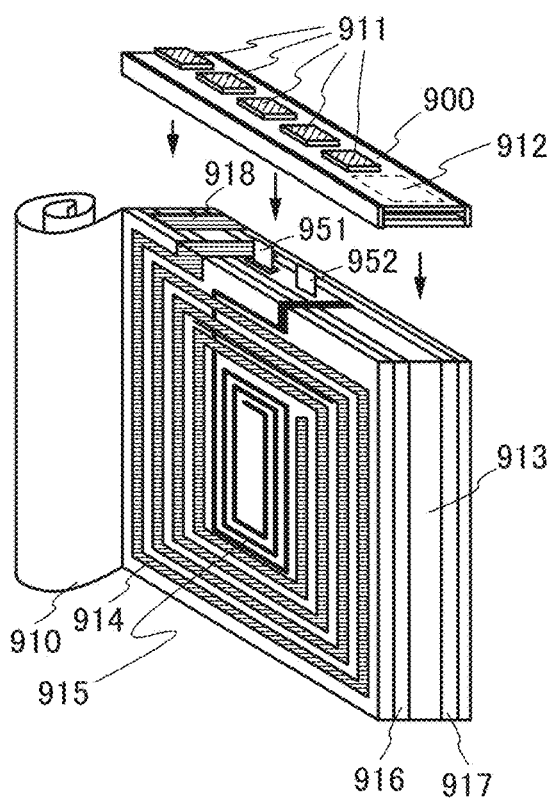 FIG. 22B2 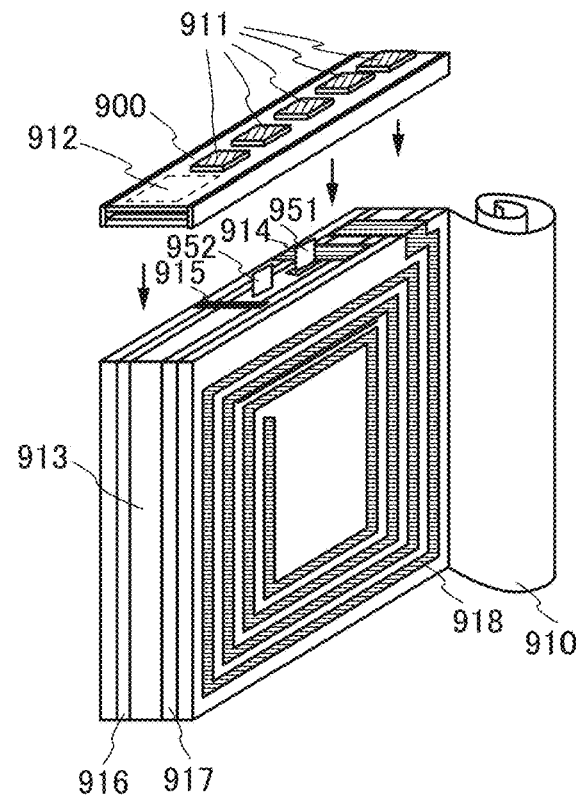

ELECTRODE, STORAGE BATTERY, POWER STORAGE DEVICE, AND ELECTRONIC DEVICE

BACKGROUND OF THE INVENTION

1. Field of the Invention

One embodiment of the present invention relates to an electrode, a storage battery, a power storage device, and an electronic device.

Note that one embodiment of the present invention is not limited to the above technical field. One embodiment of the invention disclosed in this specification and the like relates to an object, a method, and a manufacturing method. One embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, an imaging device, a method for driving any of them, and a method for manufacturing any of them.

Note that electronic devices in this specification generally mean devices driven by electricity; and electro-optical devices, information terminal devices, and the like are all electronic devices. Electronic devices incorporate storage batteries in some cases. Note that in this specification, to incorporate something means to incorporate something such that it can be freely detached as a battery pack or the like as well as to incorporate something so that it cannot be removed to be replaced.

2. Description of the Related Art

In recent years, a variety of power storage devices such as lithium-ion secondary batteries, lithium-ion capacitors, and air batteries have been actively developed. In particular, demand for lithium-ion storage batteries with high output and high energy density has rapidly grown with the development of the semiconductor industry, for electronic devices, for example, portable information terminals such as mobile phones, smartphones, and laptop computers, portable music players, and digital cameras; medical equipment; next-generation clean energy vehicles such as hybrid electric vehicles (HEVs), electric vehicles (EVs), and plug-in hybrid electric vehicles (PHEVs); and the like. The lithium-ion storage batteries are essential as rechargeable energy supply sources for today's information society.

The basic structure of a storage battery includes a positive electrode, a negative electrode, and an electrolyte (an electrolytic solution or a solid electrolyte) provided therebetween. Typically, a positive electrode and a negative electrode each include a current collector and an active material provided over the current collector. In the case of a lithium-ion storage battery, a material capable of receiving and releasing lithium and being alloyed and dealloyed with lithium is used as an active material for a positive electrode and a negative electrode.

To increase the contact area between an active material and an electrolyte, particulate active materials are preferably used. Thus, a binder, a conductive additive, and the like are mixed with the particulate active materials to form an active material layer, and the active material layer is provided over a current collector to form an electrode (positive electrode or negative electrode) in some cases.

As a negative electrode active material, a material that can receive and release ions serving as carriers (hereinafter referred to as carrier ions) and can be alloyed and dealloyed with carrier ions, including carbon or silicon, is used. For example, silicon is capable of being alloyed with approximately ten times as many carrier ions per unit weight as carbon and thus has higher theoretical capacity and is advantageous in increasing the capacity of the lithium-ion storage battery.

In general, the volume of active materials whose carrier ions have high theoretical capacity and that receive and release carrier ions or the volume of active materials that are alloyed and dealloyed with carrier ions is noticeably changed with cycles. For example, the volume of silicon with high theoretical capacity used as an active material is significantly changed by alloying and dealloying reactions with carrier ions, resulting in the following problem. Stress due to a change in the volume of silicon reduces a region in which a current collector and silicon are in contact with each other and a region in which active materials are in contact with each other, so that a conductive path is lost. This results in deterioration of the battery characteristics. In view of the above problem, Patent Document 1 discloses that a layer formed using silicon and a layer formed using a graphite are formed over a current collector in this order so that stress due to expansion and contraction of the layer formed using silicon is relieved and deterioration of battery characteristics is inhibited.

In addition, Non-Patent Document 1 discloses that a composite material formed by wrapping one or more silicon particles and a space with a carbon film is used as a negative electrode active material.

REFERENCE

Patent Document

[Patent Document 1] Japanese Published Patent Application No. 2001-283834

Non-Patent Document 1

"A pomegranate-inspired nanoscale design for large-volume-change lithium battery anodes", Nian Liu, Zhenda Lu, Jie Zhao, Matthew T_McDowell, Hyun-Wook Lee, Wenting Zhao and Yi Cui, Nature Nanotechnology Letters, 16 Feb. 2014.

SUMMARY OF THE INVENTION

In Non-Patent Document 1, a carbon film is formed so as to wrap one or more silicon particles with a diameter of approximately 80 nm and a space. The composite material is obtained in such a manner that the surface of the silicon particle is oxidized to form a silicon oxide film, the surface of the silicon oxide film is covered by a carbon film, and the silicon oxide film is removed by etching so that a space is formed on the periphery of the silicon particle covered with the carbon film.

For the composite material disclosed in Non-Patent Document 1, silicon particles with a diameter of as small as 80 nm are used. Silicon particles with such a small diameter are expensive and thus are not suitable for being practically used as a negative electrode active material of a lithium-ion storage battery in terms of mass production.

Furthermore, the volume of silicon particles is greatly changed by alloying and dealloying reactions with carrier ions as described above. Thus, silicon particles might be dynamically broken and pulverized by repeated alloying and dealloying reactions. Such pulverization makes a lithium-ion storage battery difficult to remain functioning. Here, pulverization means that a material is repeatedly broken into minute pieces because of expansion and contraction, for example. If a material is pulverized, the material might be separated from the current collector, a separated piece thereof might get stuck in a space of a separator or might be attached to a surface of a positive electrode, or phenomena like that might occur. Moreover, because of expansion and contraction, the contact states between silicon particles and between a silicon particle and a current collector might become worse, leading to loss of a conductive path. The loss of the conductive path decreases the capacity with charge and discharge cycles.

When pulverization of the silicon particle in the composite material disclosed in Non-Patent Document 1 proceeds, fragments of the silicon particle might break the carbon film covering the silicon particle and a space, which has a thickness of as small as 10 nm or less, and might enter a gap of a separator or be attached to a surface of a positive electrode. Furthermore, there is possibility that the silicon particle could not be held by the carbon film with such a small thickness. In view of such problems, a film that has physical durability and high conductivity is desirably used as a film that covers a silicon particle and a space.

In view of the above, an object of one embodiment of the present invention is to provide a power storage device with high capacity. Another object of one embodiment of the present invention is to provide a power storage device with high energy density. Another object of one embodiment of the present invention is to provide a highly reliable power storage device. An object of one embodiment of the present invention is to provide a long-life power storage device. Another object of one embodiment of the present invention is to provide an inexpensive power storage device.

Another object of one embodiment of the present invention is to provide an electrode with a high capacity. Another object of one embodiment of the present invention is to provide an electrode with a high energy density. Another object of one embodiment of the present invention is to provide a highly reliable electrode. Another object of one embodiment of the present invention is to provide a long-life electrode. Another object of one embodiment of the present invention is to provide an inexpensive electrode.

Another object of one embodiment of the present invention is to provide a novel material, a novel electrode, a novel storage battery, a novel power storage device, or the like.

Note that the description of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is a power storage device including a negative electrode and a positive electrode. The negative electrode includes a current collector and an active material layer. The active material layer includes active material particles and a graphene compound and a binder that cover the active material particles. A space is present between the active material particle, and the graphene compound and the binder.

Another embodiment of the present invention is a power storage device including a negative electrode and a positive electrode. The negative electrode includes a current collector and an active material layer. The active material layer includes active material particles and a graphene compound and a binder that cover the active material particles. A first space is present between the active material particle, and the graphene compound and the binder. A second space is surrounded by the graphene compound and the binder.

Another embodiment of the present invention is a power storage device including a negative electrode and a positive electrode. The negative electrode includes a current collector and an active material layer. The active material layer includes active material particles and a graphene compound and a binder that cover the active material particles. A plurality of spaces are present between the active material particle, and the graphene compound and the binder.

In any of the above structures, it is preferred that the graphene compound include 2 or more and 100 or less reduced graphene oxide layers, and the distance between the reduced graphene oxide layers be greater than or equal to 0.335 nm and less than or equal to 0.7 nm.

In any of the above structures, the active material particles are preferably silicon.

In any of the above structures, the binder is preferably polyimide.

In any of the above structures, the average diameter of the active material particles is preferably greater than or equal to 0.5 μm and less than or equal to 1.5 μm.

In any of the above structures, the active material particles are preferably formed by grinding a silicon wafer.

Another embodiment of the present invention is an electronic device including any one of the above power storage devices, an operation button, and a display device.

According to one embodiment of the present invention, a power storage device with high capacity can be provided. According to another embodiment of the present invention, a power storage device with high energy density can be provided. According to one embodiment of the present invention, a highly reliable power storage device can be provided. According to one embodiment of the present invention, a power storage device with a long lifetime can be provided. According to one embodiment of the present invention, an inexpensive power storage device can be provided.

According to one embodiment of the present invention, an electrode with high capacity can be provided. According to another embodiment of the present invention, an electrode with high energy density can be provided. According to one embodiment of the present invention, a highly reliable electrode can be provided. According to one embodiment of the present invention, an electrode with a long lifetime can be provided. According to one embodiment of the present invention, an inexpensive electrode can be provided.

According to one embodiment of the present invention, a novel material, a novel electrode, a novel storage battery, a novel power storage device, or the like.

Note that the description of these effects does not disturb the existence of other effects. One embodiment of the present invention does not necessarily have all the effects listed above. Other effects will be apparent from and can be derived from the description of the specification, the drawings, the claims, and the like.

BRIEF DESCRIPTION OF THE DRAWINGS

In the accompanying drawings:

FIGS. 20A to 20C illustrate an example of a power storage device;

FIGS. 22A1, 22A2, 22B1, and 22B2 illustrate examples of power storage devices;

DETAILED DESCRIPTION OF THE INVENTION

Figure 1A:
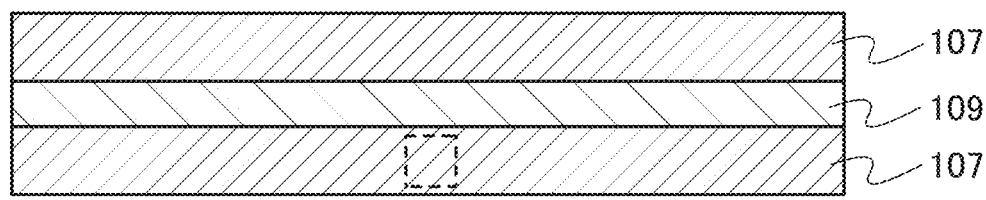
FIGS. 1A and 1B are cross-sectional views illustrating an electrode.

Hereinafter, embodiments and an example of the present invention will be described in detail with reference to the accompanying drawings. However, the present invention is not limited to the following description of the embodiments and example and it is easily understood by those skilled in the art that the mode and details can be changed variously. Accordingly, the present invention should not be interpreted as being limited to the description of the embodiments and example below.

Note that in drawings used in this specification, the sizes, thicknesses, and the like of components such as a positive electrode, a negative electrode, an active material layer, a separator, an exterior body are exaggerated for simplicity in some cases. Therefore, the sizes of the components are not limited to the sizes in the drawings and relative sizes between the components.

Note that the term "electrically connected" includes the case where components are connected through an object having any electric function. There is no particular limitation on an "object having any electric function" as long as electric signals can be transmitted and received between components that are connected through the object.

Note that the terms "film" and "layer" can be interchanged with each other depending on the case or circumstances. For example, the term "conductive layer" can be changed into the term "conductive film" in some cases. Also, the term "insulating film" can be changed into the term "insulating layer" in some cases.

Note that in structures of the present invention described in this specification and the like, the same portions or portions having similar functions are denoted by common reference numerals in different drawings, and descriptions thereof are not repeated. Further, the same hatching pattern is applied to portions having similar functions, and the portions are not especially denoted by reference numerals in some cases.

Note that the ordinal numbers such as "first", "second", and "third" in this specification and the like are used for convenience and do not denote the order of steps, the positional relation, or the like. Therefore, for example, description can be made even when "first" is replaced with "second" or "third", as appropriate. In addition, the ordinal numbers in this specification and the like are not necessarily the same as those which specify one embodiment of the present invention.

In this specification, flexibility refers to a property of an object being flexible and bendable. In other words, it is a property of an object that can be changed in form in response to an external force applied to the object, and elasticity or restorability to the former shape is not taken into consideration. A flexible storage battery can be changed in form in response to an external force. A flexible storage battery can be used with its shape fixed in a state of being changed in form, can be used while repeatedly changed in form, and can be used in a state of not changed in form. In this specification and the like, the inside of an exterior body refers to a region surrounded by the exterior body of the lithium-ion storage battery, in which structures such as a positive electrode, a negative electrode, an active material layer, and a separator, and an electrolytic solution are included.

The descriptions in embodiments of the present invention can be combined with each other as appropriate.

Embodiment 1

In this embodiment, an electrode of one embodiment of the present invention will be described.

To increase the lifetime of a storage battery such as a lithium-ion battery, it is important to inhibit deterioration of components of the storage battery, such as electrodes, through repeated charge and discharge cycles.

Increased lifetime of a storage battery can reduce the frequency of battery changes and improve the convenience of a device provided with the storage battery. For example, a storage battery preferably has a lifetime of five or more years. Alternatively, a storage battery preferably has a lifetime long enough to withstand 1800 or more charges and discharge cycles.

In view of the use in a motor vehicle or outdoor use, a storage battery is preferably capable of operating at a wider range of temperatures. For example, the storage battery is preferably capable of operating stably even at a temperature over 45° C.

An electrode used in a lithium-ion storage battery includes active materials. Most active materials expand and contract with charge and discharge cycles.

Here, the case where an electrode includes a current collector and an active material layer on the current collector will be described. The active material layer includes an active material. The active material layer may further include a binder and a conductive additive.

Furthermore, a storage battery that can be used for a wearable device is needed. The wearable device preferably has enough flexibility to be changed in form so as to conform to a body part on which it is worn. The storage battery is preferably capable of being changed in form along with the change in form of the wearable device, providing a wide range of choice of the positions where the storage battery is provided in the wearable device or on a surface of the wearable device, for example.

The storage battery mounted on the wearable device is changed in form by an external force applied when the wearable device is changed in form, in some cases. The electrode is curved when the storage battery is changed in form, which might make the contact between the active materials, between the active material and the conductive additive, or between the active material and the binder, for example, poor.

Thus, it is very important to, for example, inhibit a decrease in the adhesion between the active materials, between the active material and the conductive additive, or between the active material and the binder in the storage battery or the like mounted on the wearable device even when the electrode is changed in form.

In a storage battery using the redox reaction of carrier ions, such as a lithium-ion storage battery, insertion and extraction of carrier ions to and from an active material and alloying and dealloying reactions with a metal to be carrier ions accompany charge and discharge.

Here, in the case where the electric resistance of the electrode of a storage battery is high, overvoltage is generated, so that a reaction caused by overvoltage occurs in the surface of the active material, for example, in some cases. For example, the reaction potential of a negative electrode is low in many cases, and when the electric resistance of the negative electrode is high, a metal to be carrier ions might be deposited on a surface of an active material, for example. For this reason, the resistance of the electrode of a storage battery is preferably low.

Furthermore, for example, the contact state between components in an electrode becomes worse during or after charging due to expansion of an active material accompanying charge, leading to loss of a conductive path. In such a case, carrier ions that are inserted in or received by the active material or those with which the active material is alloyed in charging cannot be extracted from the active material and remain in the active material even after discharging in some cases. The carrier ions remaining in the active material might reduce the capacity of a storage battery and thus are disadvantageous.

The carrier ions remaining in the active material can be measured by elementary analysis, for example. Examples of elementary analysis methods include inductively coupled plasma mass spectrometry (ICP-MS) and X-ray photoelectron spectroscopy (XPS).

It is preferred that the adhesion between the current collector and the active material layer be increased, for example, to lower the resistance of the electrode of a storage battery.

Alternatively, it is preferred that the adhesion between the active materials be improved and the area of contact between the active material and the conductive additive be increased in order to lower the resistance of the electrode of a storage battery.

In this embodiment, first, a negative electrode of a lithium-ion storage battery and a method for forming the negative electrode will be described with reference to FIGS. 1A and 1B.

<Negative Electrode Structure 1>

Here, FIG. 1A is a cross-sectional view of a negative electrode 101. In the negative electrode 101, negative electrode active material layers 107 are in contact with a negative electrode current collector 109. FIG. 1B is an enlarged view illustrating a region surrounded by dashed lines in FIG. 1A.

The negative electrode active material layer 107 includes negative electrode active materials 121, graphene compounds 123 dispersed to cover the negative electrode active materials 121, a binder 122 dispersed to be in contact with the graphene compounds, and spaces 124 and 125. Here, conductive graphene compounds are preferably used as the graphene compounds 123. For example, reduced graphene oxide flakes are used. Furthermore, the graphene compounds 123 preferably have a sheet form; the sheet form may be formed with a plurality of reduced graphene oxide flakes that partly overlap with each other.

Figure 1B:
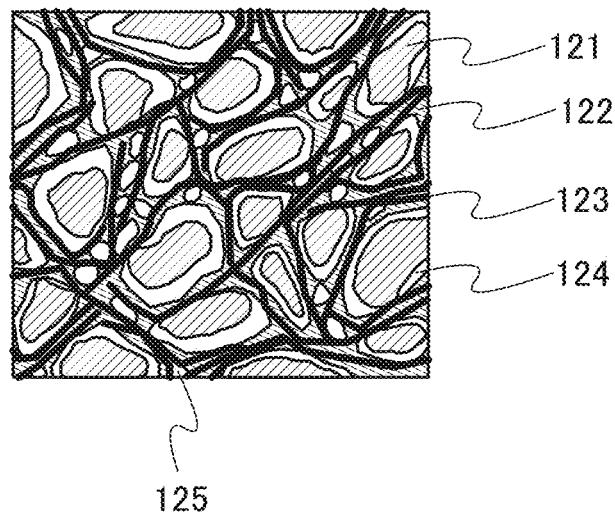

FIG. 1B shows substantially uniform dispersion of the sheet-like graphene compounds 123 in the negative electrode active material layer 107. The graphene compounds 123 are schematically shown by thick lines in FIG. 1B but are actually thin films each having a thickness corresponding to the thickness of a single layer or a multi-layer of carbon molecules. The plurality of graphene compounds 123 and the binder 122 are formed to wrap, surround, or cover the negative electrode active materials 121, the spaces 124, and the spaces 125, or adhere to the surfaces of the negative electrode active materials 121. Thus, the graphene compounds 123 make surface contact with the negative electrode active materials 121. Furthermore, the graphene compounds 123 also make surface contact with each other; consequently, the plurality of graphene compounds 123 form a three-dimensional network for electrical conduction. For these reasons, conductive graphene compounds are preferably used for a conductive additive.

In this embodiment, reduced graphene oxide flakes are used as the graphene compounds 123; formation of the graphene compounds 123 will be described in detail later. Since graphene oxide flakes dispersed very well in a polar dispersion medium are used for formation of the graphene compounds 123, a three-dimensional network for electrical conduction is formed by the plurality of graphene compounds 123. The graphene compounds 123 remaining in the negative electrode active material layer 107 partly overlap with each other. This is because the graphene compounds 123 are graphene compounds including reduced graphene oxide flakes obtained in such a manner that a dispersion medium in a dispersion liquid containing uniformly dispersed graphene oxide flakes is volatilized and the graphene oxide flakes are reduced. The graphene compounds 123 are dispersed to the extent allowing surface contact with each other, thereby forming an electrical conduction path. Note that graphene oxide flakes may be reduced by heat treatment or with the use of a reducing agent, for example.

Kneading performed in adding graphene oxide flakes in a process for forming the negative electrode active material layer allows graphene oxide flakes to be further dispersed in the negative electrode active material layer 107, whereby a favorable three-dimensional network for electrical conduction can be formed; a method for forming the negative electrode active material layer will be described in detail later.

Unlike a conductive additive in the form of particles, such as acetylene black, which makes point contact with an active material, the graphene compounds 123 are capable of surface contact with low contact resistance; accordingly, the electrical conduction between the particulate negative electrode active material 121 and the graphene compounds 123 can be improved with a small amount of conductive additive. Thus, the proportion of the negative electrode active materials 121 in the negative electrode active material layer 107 can be increased. Accordingly, the discharge capacity of a power storage device can be increased.

Graphene compounds are bonded to each other to form net-like graphene compound (hereinafter referred to as a graphene net or a graphene compound net). The graphene compound net covering the active material can function as a binder for binding particles. The amount of the binder can thus be reduced, or the binder does not have to be used. This can increase the proportion of the active material in the electrode volume or weight. That is to say, the capacity of the power storage device can be increased.

The binder 122 may exist in the form of a layer on the surface of the negative electrode active material 121. The graphene compound 123 preferably includes a region in contact with a surface of the binder 122. The binder 122 is located between the negative electrode active material 121 and the graphene compound 123. Preferably, the binder 122 is provided on the negative electrode active materials 121 and the graphene compounds 123 are provided on the binder 122.

The structure illustrated in FIG. 1B is not necessarily formed in the whole negative electrode active material layer 107, and for example, the negative electrode active material layer 107 may partly include a region in which the above structure is formed.

<Negative Electrode Structure 2>

Figure 2A:
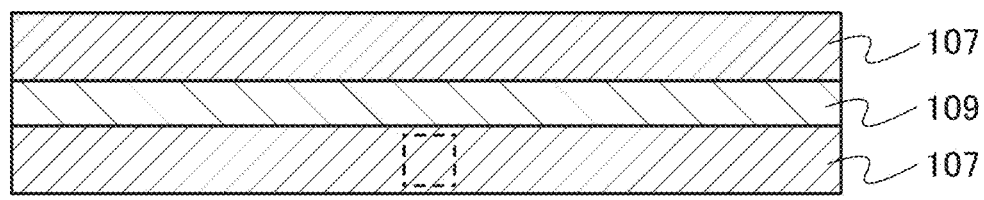
FIGS. 2A to 2C are cross-sectional views illustrating electrodes.
Figure 2B:
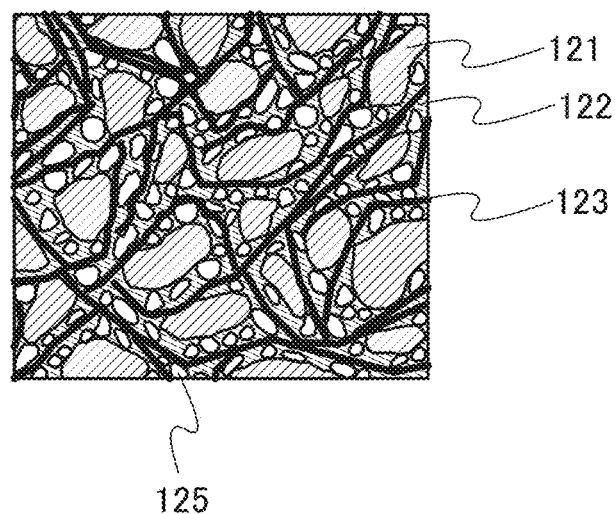
Figure 2C:
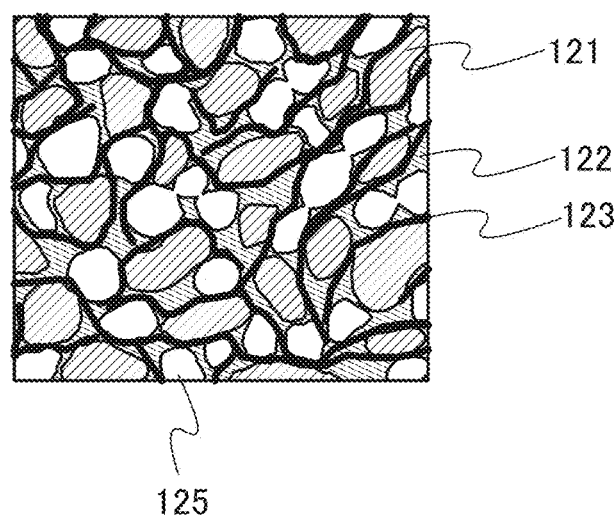

FIGS. 2A to 2C illustrate the structure of a negative electrode partly different from that of the negative electrode described above. FIG. 2A is a cross-sectional view of the negative electrode 101, and FIG. 2B is an enlarged view illustrating a region surrounded by dashed lines in FIG. 2A.

The negative electrode active material layer 107 includes the negative electrode active materials 121, the graphene compounds 123 dispersed so as to cover the negative electrode active materials 121, the binder 122 dispersed so as to be in contact with the graphene compounds, and the spaces 125. Here, reduced graphene oxide flakes are used as the graphene compounds 123. Furthermore, the graphene compounds 123 preferably have a sheet form; the sheet form may be formed with a plurality of reduced graphene oxide flakes that partly overlap with each other.

Like FIG. 1B, FIG. 2B shows substantially uniform dispersion of the sheet-like graphene compounds 123 in the negative electrode active material layer 107. The plurality of graphene compounds 123 and the binder 122 are formed so as to wrap, surround, or cover the negative electrode active materials 121 and the spaces 125, or adhere to the surfaces of the negative electrode active materials 121. Thus, the graphene compounds 123 make surface contact with the negative electrode active materials 121. Furthermore, the graphene compounds 123 also make surface contact with each other; consequently, the plurality of graphene compounds 123 form a three-dimensional network for electrical conduction.

FIG. 2C is an enlarged view of the negative electrode active material layer 107 when the size of the space 125 is larger than that of the space 125 illustrated in FIG. 2B. In FIG. 2C, the size of the space 125 is comparable to that of the negative electrode active material 121. The plurality of graphene compounds 123 and the binder 122 are formed so as to wrap, surround, or cover the negative electrode active materials 121 and the spaces 125, or adhere to the surfaces of the negative electrode active materials 121.

The structure illustrated in FIG. 2B or FIG. 2C is not necessarily formed in the whole negative electrode active material layer 107, and for example, the negative electrode active material layer 107 may partly include a region in which the above structure is formed.

The binder 122 may exist in the form of a layer on the surface of the negative electrode active material 121. The graphene compound 123 preferably includes a region in contact with the surface of the binder 122. The binder 122 is located between the negative electrode active material 121 and the graphene compound 123. Preferably, the binder 122 is provided on the negative electrode active materials 121 and the graphene compounds 123 are provided on the binder 122.

Since the volume of a negative electrode active material increases because of an alloying reaction with carrier ions or reception of carrier ions, stress due to an increase and a decrease in the volume accompanying charge and discharge cycles might decrease adhesion between a current collector and a negative electrode active material. This might form wrinkles in the current collector, resulting in separation of the negative electrode active material from the current collector. Consequently, the contact state between the negative electrode active material and the current collector might become worse, leading to loss of a conductive path. The loss of the conductive path might decrease the capacity with charge and discharge cycles.

In one embodiment of the present invention, however, even when the volume of the negative electrode active materials 121 repeatedly increases and decreases with charge and discharge cycles, stress due to the increase and the decrease in the volume can be relieved because the spaces 124 on the periphery of the negative electrode active materials 121 and the spaces 125 dispersed in the whole negative electrode active material layer 107 are provided, as illustrated in FIGS. 1A and 1B and FIGS. 2A to 2C. Consequently, separation of the negative electrode active materials from the current collector can be inhibited and a conductive path is maintained, which prevents capacity from decreasing with charge and discharge cycles.

When negative electrode active materials whose volume is increased by an alloying reaction with carrier ions or reception of carrier ions are cracked by charging and discharging, a negative electrode active material layer might get vulnerable and be partly collapsed. Moreover, the negative electrode active materials might be pulverized. When a negative electrode active material layer is partly collapsed or negative electrode active materials are pulverized by charging and discharging, a conductive path between the negative electrode active materials is broken, so that the amount of the negative electrode active materials that are not involved in an electrochemical reaction increases. This decreases the capacity with charge and discharge cycles. Furthermore, pulverized negative electrode active materials might be separated from a current collector, or a separated piece thereof might get stuck in a space of a separator or might be attached to a surface of a positive electrode, for example. This might result in a reduction in the capacity of a storage battery.

In one embodiment of the present invention, however, the graphene compounds 123 and the binder 122 dispersed in the negative electrode active material layer 107 cover the negative electrode active materials 121 as illustrated in FIGS. 1A and 1B and FIGS. 2A to 2C. Thus, the graphene compounds 123 and the binder 122 can prevent the collapse of the negative electrode active material layer 107 and attachment of the pulverized negative electrode active materials 121 to a separator or a positive electrode. Even if the negative electrode active material layer 107 collapses, the pulverized negative electrode active materials 121 can stay in the spaces 125. That is, even when the volume of the negative electrode active materials 121 repeatedly increases and decreases with charge and discharge cycles, the graphene compounds 123 and the binder 122 allows the negative electrode active materials 121 to stay in the negative electrode active material layer 107, maintaining a conductive path between the negative electrode active materials 121.

The negative electrode active material layer 107 has a porous structure including the spaces 124 and the spaces 125. The spaces 124 and the spaces 125 in the negative electrode active material layer 107 allow some increase in the volume of the negative electrode active materials due to expansion. Furthermore, the graphene compounds 123 are formed with a plurality of reduced graphene oxide flakes that partly overlap with each other as described above and thus have flexibility. This allows the graphene compounds 123 to change their forms in accordance with the forms of the negative electrode active materials 121, even when the negative electrode active materials 121 expand but do not fit into the spaces 124 and the spaces 125 due to charge. Thus, stress due to expansion can be dispersed, preventing part of the negative electrode active material layer 107 from collapsing.

<Negative Electrode Active Material>

As the negative electrode active material 121, a material that is capable of being alloyed and dealloyed with carrier ions, such as silicon (Si), is used. Silicon is capable of being alloyed with approximately ten times as many carrier ions per unit weight as graphite, and thus has higher theoretical capacity and is advantageous in increasing the capacity of a power storage device.

The negative electrode active materials 121 preferably contains at least one of Mg, Ca, Ga, Al, Ge, Sn, Pb, Sb, Bi, Ag, Zn, Cd, As, Hg, and In, for example, other than Si. The negative electrode active materials 121 may contain $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, or the like. Alternatively, for the negative electrode active materials 121, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$), or $Li_{3-x}M_xN$ (M=Co, Ni, or Cu) with a $Li_3N$ structure, which is a nitride containing lithium and a transition metal, can be used.

In this embodiment, silicon particles are used as the particulate negative electrode active materials 121. The silicon particles are obtained by grinding a silicon wafer and thus can be formed at significantly lower cost than commercial silicon particles. The average diameter of the silicon particles is preferably greater than or equal to 0.5 µm and less than or equal to 3 µm, more preferably greater than or equal to 0.5 µm and less than or equal to 1.5 µm. Here, the diameter of a particle can be calculated by converting the volume of the particle into that of a sphere and obtaining the diameter of the sphere. Alternatively, the diameter of a particle can be calculated by converting the cross-sectional area of the particle into the area of a circle and obtaining the diameter of the circle. Note that the average particle diameter can be measured with a particle diameter distribution analyzer or the like using a laser diffraction and scattering method or by observation with a scanning electron microscope (SEM) or a TEM.

Note that an active material refers to a material that relates to insertion and extraction of ions serving as carriers or alloying and dealloying reactions. For example, when an electrode (a positive electrode, a negative electrode, or both of them) is formed, an active material layer in which the active material is mixed with a conductive additive, a binder, a dispersion medium, and the like is formed on a current collector. Thus, the active material and the active material layer are distinguished. Therefore, a positive electrode active material and a positive electrode active material layer are distinguished and a negative electrode active material and a negative electrode active material layer are distinguished.

Although not illustrated, the negative electrode active material 121 may include, in its surface layer, a layer including a compound containing an element that is the same as one contained in the negative electrode active material 121 as its main component. For example, the surface layer of the negative electrode active material 121 may include an oxide of an element that is the same as one contained as the main component of the negative electrode active material 121. Alternatively, for example, the surface layer of the negative electrode active material 121 may include a nitride, a sulfide, a phosphide, or a fluoride of the element that is the main component of the negative electrode active material 121.

For example, the negative electrode active material 121 may include, as its main component, at least one element selected from Si, Mg, Ca, Ga, Al, Ge, Sn, Pb, Sb, Bi, Ag, Zn, Cd, As, Hg, and In, and the surface layer of the negative electrode active material 121 may include an oxide of the element. For example, the negative electrode active material 121 in one embodiment of the present invention may include, as its main component, silicon, and the surface layer of the negative electrode active material 121 may include silicon oxide. Alternatively, the negative electrode active material 121 in one embodiment of the present invention may include, as its main component, tin, and the surface layer of the negative electrode active material 121 may include tin oxide.

<Space>

The forms of the spaces are maintained by the graphene compounds 123 and the binder 122. The spaces are acceptable as long as they have a volume corresponding to the difference in the volume of the negative electrode active materials 121 between before and after its expansion accompanying charge and they are provided so as to cover the negative electrode active materials like the spaces 124 illustrated in FIG. 1B. Specifically, when silicon is used as a negative electrode active material for example, its volume theoretically increases by two times or more, or in some cases, four times or more compared with that before expansion accompanying charge. For this reason, the volume of the space 124 in FIG. 1B is preferably four times or more as large as that of a silicon particle in order to reduce stress due to an increase in the volume of the silicon particle accompanying charge. On the other hand, the excessively-large volume of spaces reduces the capacity per unit volume of the negative electrode active material because the spaces are not involved in an electrode reaction. Thus, the volume of the space is more preferably five times or less as large as that of the silicon particle. The volume of the space 125 illustrated in FIG. 1B may be smaller than that of the silicon particle. Alternatively, a plurality of spaces may be provided on the periphery of the negative electrode active material 121 as illustrated in FIG. 2B or FIG. 2C. Here, the volume of a space is calculated from the diameter of the space, for example. Alternatively, the volume can be calculated by converting the cross-sectional area of the space into the area of a circle and obtaining the volume from the diameter. Note that the diameter of the space can be measured by observation with a scanning electron, microscope (SEM) or a TEM.

The volume of the space 125 in FIG. 2B preferably has a diameter smaller than the average diameter of the negative electrode active materials 121. Specifically, the diameter of the space is preferably greater than or equal to 100 nm and less than or equal to 600 nm, more preferably greater than or equal to 200 nm and less than or equal to 400 nm. Furthermore, the total volume of a plurality of spaces 125 provided on the periphery of the negative electrode active materials 121 is preferably equal to or substantially equal to the difference in the volume of the negative electrode active material 121 between before and after expansion of thereof accompanying charge. Specifically, when the negative electrode active materials 121 are silicon, the total volume of the plurality of spaces 125 provided on the periphery of a silicon particle is preferably four times or more as large as the volume of the silicon particle. The plurality of spaces 125 provided on the periphery of the negative electrode active materials 121 can relieve stress due to expansion of the negative electrode active material 121 accompanying charge.

The space 125 in FIG. 2C preferably has a diameter equal to or substantially equal to the average diameter of the negative electrode active materials 121. Specifically, the diameter of the space is preferably greater than or equal to 0.5 μm and less than or equal to 3 μm, more preferably greater than or equal to 0.5 μm and less than or equal to 1.5 μm. Furthermore, the total volume of a plurality of spaces 125 provided on the periphery of the negative electrode active materials 121 is preferably equal to or substantially equal to the difference in the volume of the negative electrode active material 121 between before and after expansion thereof accompanying charge. Specifically, when the negative electrode active materials 121 are silicon, the total volume of the plurality of spaces 125 provided on the periphery of a silicon particle is preferably four times or more as large as the volume of the silicon particle. The plurality of spaces 125 provided on the periphery of the negative electrode active materials 121 can relieve stress due to expansion of the negative electrode active material 121 accompanying charge. Note that the diameter of the space can be measured by observation with a SEM or a TEM.

<Binder>

As the binder, a material such as polyimide, polyvinyl chloride, polytetrafluoroethylene, polyethylene, polypropylene, isobutylene, polyethylene terephthalate, nylon, polyvinylidene fluoride (PVdF), polyacrylonitrile (PAN), polyvinyl chloride, ethylene-propylene-diene polymer, polyvinyl acetate, nitrocellulose, polystyrene, poly(methyl acrylate), poly(methyl methacrylate) (PMMA), sodium polyacrylate, polyvinyl alcohol (PVA), polyethylene oxide (PEO), or polypropylene oxide is preferably used. As the binder, styrene-butadiene rubber (SBR), styrene-isoprene-styrene rubber, acrylonitrile-butadiene rubber, butadiene rubber, a diene-based rubber material such as ethylene-propylene-diene copolymer, or fluororubber can be used.

In this embodiment, polyimide is used as the binder 122. Polyimide is particularly preferable because it has high heart resistance and high durability and thus is capable of withstanding expansion and contraction of the negative electrode active material accompanying charge and discharge cycles. Note that a substance mixed in the electrode formation step is a precursor of polyimide, and the precursor of polyimide is imidized by heat treatment performed later to be polyimide.

The amount of the binder 122 in the total amount of the negative electrode active material layer 107 is preferably greater than or equal to 10 wt % and less than or equal to 40 wt %, more preferably greater than or equal to 20 wt % and less than or equal to 40 wt %, and still more preferably greater than or equal to 25 wt % and less than or equal to 35 wt %.

<Conductive Additive>

In this embodiment, conductive graphene compounds are used for a conductive additive. Examples of the conductive additive include a carbon fiber material, a metal material, and a conductive ceramic material. The amount of the conductive additive in the total amount of negative electrode active material layer 107 is preferably greater than or equal to 5 wt % and less than or equal to 40 wt %, more preferably greater than or equal to 10 wt % and less than or equal to 20 wt %.

A network for electrical conduction can be formed in the electrode by the conductive additive. The conductive additive also allows maintaining of a path for electric conduction between the active materials. The addition of the conductive additive to the active material layer increases the electrical conductivity of the active material layer.

For the conductive additive, carbon fiber can be used for example, instead of graphene compounds. Examples of carbon fiber include mesophase pitch-based carbon fiber, isotropic pitch-based carbon fiber, carbon nanofiber, carbon nanotube, and vapor-grown carbon fiber (VGCF, registered trademark). Alternatively, metal powder or metal fibers of copper, nickel, aluminum, silver, gold, or the like, a conductive ceramic material, or the like can be used.

Graphene or graphene compounds will be described below. Graphene has carbon atoms arranged in one atomic layer. A π bond exists between the carbon atoms.

Compounds including graphene as a basic skeleton are referred to as graphene compounds.

Graphene compounds will be detailed below.

Among graphene compounds, those with two to a hundred layers of graphene are referred to as multilayer graphene in some cases. Graphene and multilayer graphene have a length in the longitudinal direction of greater than or equal to 50 nm and less than or equal to 100 μm or greater than or equal to 800 nm and less than or equal to 50 μm.

Graphene compounds may be compounds where graphene or multilayer graphene is modified with an atom other than carbon or an atomic group with an atom other than carbon. Graphene compounds may be compounds where graphene or multilayer graphene is modified with an atomic group composed mainly of carbon, such as an alkyl group. An atomic group is sometimes referred to as a substituent group, a functional group, a characteristic group, or the like. Here, examples of graphene compounds include graphene modified with any of the above atoms or atomic groups.

The top and rear surfaces of a graphene compound may be modified with different atoms or atomic groups. When a graphene compound has multilayer graphene, those layers may be modified with different atoms or atomic groups.

An example of the above-mentioned graphene modified with an atomic group is graphene or multilayer graphene modified with oxygen. Alternatively, graphene or multilayer graphene modified with a functional group containing oxygen may be used. Examples of functional groups containing oxygen include an epoxy group, a carbonyl group such as a carboxyl group, and a hydroxyl group. Graphene modified with oxygen is referred to as graphene oxide in some cases.

A formation method example of graphene oxide will be described below. Graphene oxide can be obtained by oxidizing the aforementioned graphene or multilayer graphene. Alternatively, graphene oxide can be obtained by being separated from graphite oxide. Graphite oxide can be formed by oxidizing graphite. The graphene oxide may be further modified with the above-mentioned atom or atomic group.

Reducing graphene oxide provides graphene compounds with high conductivity. Graphene compounds that can be obtained by reducing graphene oxide is referred to as reduced graphene oxide (RGO) in some cases. In RGO, in some cases, all oxygen atoms contained in the graphene oxide are not extracted and part of them remains in a state of bonded oxygen or atomic group containing oxygen. In some cases, RGO includes a functional group, e.g., an epoxy group, a carbonyl group such as a carboxyl group, or a hydroxyl group.

A graphene compound may have a sheet-like shape where a plurality of graphene compounds partly overlap with each other. Such a graphene compound is referred to as a graphene compound sheet in some cases. The graphene compound sheet has, for example, an area with a thickness larger than or equal to 0.33 nm and smaller than or equal to 50 µm, or preferably larger than or equal to 0.34 nm and smaller than or equal to 10 µm. The graphene compound sheet may be modified with an atom other than carbon, an atomic group containing an atom other than carbon, an atomic group mainly composed of carbon, such as an alkyl group, or the like. A plurality of layers in the graphene compound sheet may be modified with different atoms or atomic groups.

A graphene compound may have a five-membered ring composed of carbon atoms or a poly-membered ring that is a seven or more-membered ring composed of carbon atoms, in addition to a six-membered ring composed of carbon atoms. In the neighborhood of a poly-membered ring except a six-membered ring, a region through which lithium ions can pass may be generated.

A plurality of graphene compounds may be gathered to form a sheet-like shape.

A graphene compound has a planar shape, thereby enabling surface contact.

A graphene compound with high conductivity, such as graphene or multilayer graphene, maintains its high conductivity even when it is thin, and the area where graphene flakes are in contact with each other and the area where a graphene flake is in contact with an active material can be increased by surface contact. Thus, a conductive path can be efficiently formed even with a small amount per unit volume of the graphene compound.

Some graphene compounds can be used as insulators. For example, a graphene compound sheet can be used as a sheet-like insulator. Graphene oxide, for example, has a more excellent insulation property than graphene in some cases. A graphene compound modified with an atomic group may have an improved insulation property, depending on the type of the modifying atomic group.

The graphene compound of one embodiment of the present invention may include a precursor of graphene. The precursor of graphene may contain the above-mentioned graphene oxide, graphite oxide, or the like.

Graphene containing an alkali metal or an element other than carbon, such as oxygen, is referred to as a graphene analog in some cases. Examples of the graphene compound of one embodiment of the present invention include graphene analogs.

The graphene compound of one embodiment of the present invention may include an atom, an atomic group, and ions of them between the layers. For example, the graphene compound may include a lithium compound or lithium ions between graphene layers. The physical properties, such as electric conductivity and ionic conductivity, of a graphene compound sometimes change when an atom, an atomic group, and ions of them exist between layers of the compound. In such a case, a distance between the layers may be large than that of multilayer graphene, for example.

A graphene compound may have excellent electrical characteristics of high conductivity and excellent physical properties of high flexibility and high mechanical strength. A graphene compound has a planar shape, thereby enabling low-resistant surface contact. Furthermore, a graphene compound has extremely high conductivity even with a small thickness in some cases and thus allows a conductive path to be formed in an active material layer efficiently even with a small amount. Thus, a conductive graphene compound is preferably used as a conductive additive, in which case the area where an active material and the conductive additive are in contact with each other can be increased and electrical resistance may be reduced. Here, it is particularly preferred that reduced graphene oxide be used as the graphene compound of one embodiment of the present invention.

In the case where active materials with a small average particle diameter (e.g., 1 µm or less) is used, the specific surface area of the active material is large and thus more conductive paths for the active materials are needed. In such a case, it is particularly preferred that a graphene compound that can efficiently form a conductive path even in a small amount be used.

In the case where the graphene compound is reduced graphene oxide, the distance between adjacent reduced graphene oxide layers is preferably greater than or equal to 0.335 nm and less than or equal to 0.7 nm.

The interlayer distance of reduced graphene oxide can be measured by observing a cross section of the reduced graphene oxide with a TEM. The interlayer distance of reduced graphene oxide can be calculated as interplanar spacing by X-ray diffraction (XRD), for example.

As the graphene compound of one embodiment of the present invention, reduced graphene oxide is used. The oxygen concentration in the whole reduced graphene oxide that is measured by XPS is, for example, preferably higher than or equal to 0.3 atomic % and lower than or equal to 20 atomic %, more preferably higher than or equal to 1 atomic % and lower than or equal to 11 atomic %, still more preferably higher than or equal to 3 atomic % and lower than or equal to 10 atomic %.

In the case where a graphene compound is analyzed by XPS and the spectrum of binding energy of carbon corresponding to C1s is subjected to waveform separation, the proportion of peaks indicating $sp^2$ with respect to the whole spectrum of C1s can be estimated as an area ratio. The proportion of $sp^2$ in the graphene compound of one embodiment of the present invention is preferably higher than or equal to 50% and lower than or equal to 90% of the whole spectrum of C1s. Increasing the proportion of $sp^2$ can heighten the conductivity of the graphene compound, for example.

Note that physical values such as the interplanar spacing and the oxygen concentration given above are only examples, and those of the graphene compound of one embodiment of the present invention are not limited thereto.

<Negative Electrode Current Collector>

The negative electrode current collector 109 can be formed using a material that has high conductivity, such as a metal like copper, stainless steel, gold, platinum, aluminum, or titanium, or an alloy thereof. It is preferred that a material of the negative electrode current collector 109 not be alloyed with carrier ions such as lithium ions. Alternatively, the negative electrode current collector 109 can be formed using an aluminum alloy to which an element that improves heat resistance, such as silicon, titanium, neodymium, scandium, or molybdenum, is added. Still alternatively, a metal element that forms silicide by reacting with silicon can be used. Examples of the metal element that forms silicide by reacting with silicon include zirconium, titanium, hafnium, vanadium, niobium, tantalum, chromium, molybdenum, tungsten, cobalt, nickel, and the like. The negative electrode current collector 109 can have any of various shapes including a foil-like shape, a plate-like shape (sheet-like shape), a net-like shape, a punching-metal shape, and an expanded-metal shape. The negative electrode current collector 109 preferably has a thickness of 5 μm to 30 μm inclusive.

Alternatively, a carbon material may be used for the negative electrode current collector.

<Method 1 for Forming Negative Electrode>

A method for forming a negative electrode of one embodiment of the present invention will be described below with reference to FIG. 3.

Figure 3:
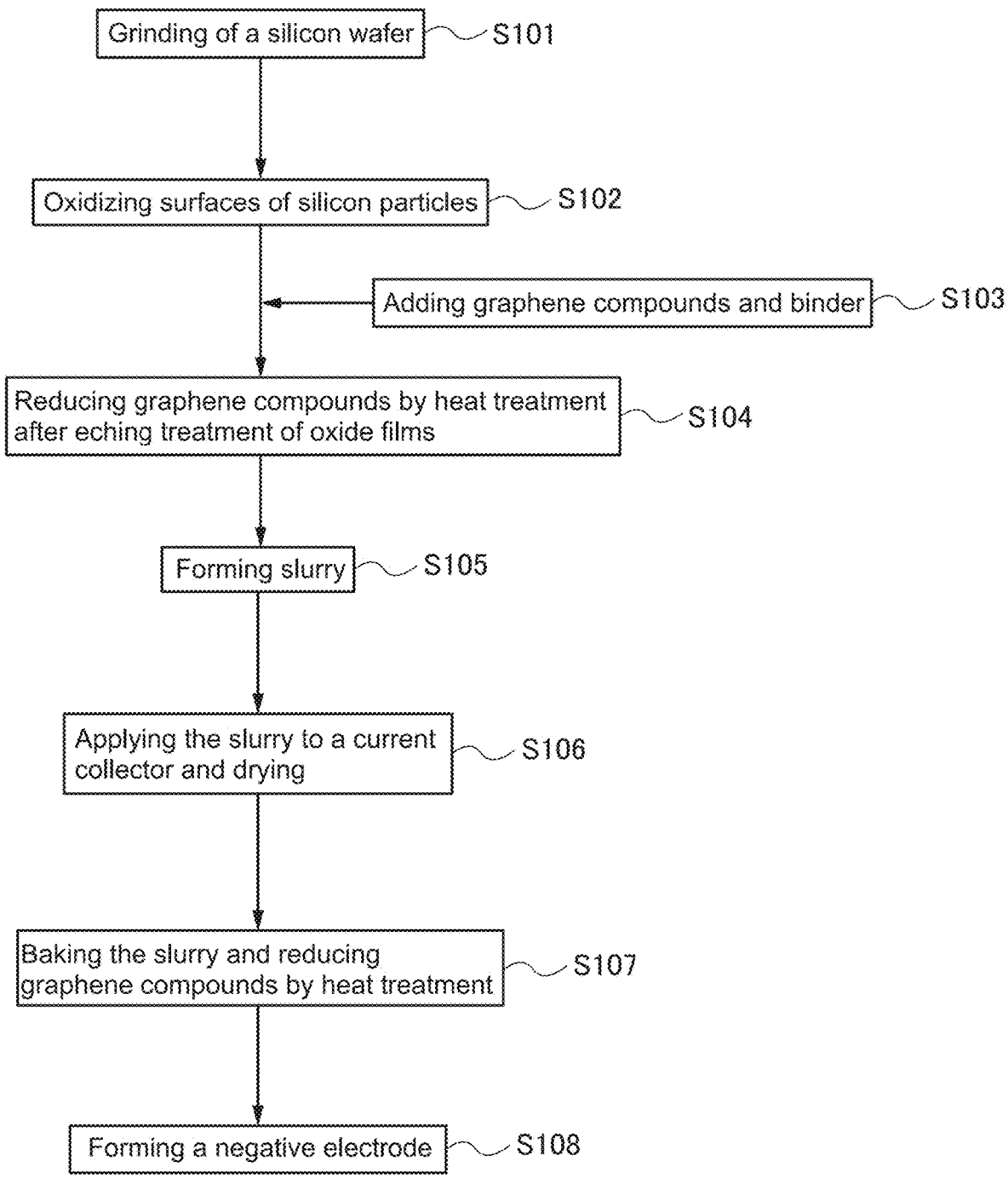
FIG. 3 is a flow chart showing a method for forming an electrode.

FIG. 3 is a flow chart showing a method for forming the negative electrode illustrated in FIGS. 1A and 1B.

<Step S101>

In Step S101, a silicon wafer is ground to form silicon particles that serve as negative electrode active materials.

For example, an 8-inch round silicon wafer is cut into pieces each with a diameter of greater than or equal to 0.5 cm and less than or equal to 1.5 cm with a glass cutter, a cutter, or the like, and then, the pieces are further roughly ground in a mortar or the like so as to have a diameter of less than or equal to 1 mm. In this manner, silicon powder is obtained. The silicon powder is further ground down with a ball mill. Specifically, the silicon powder and a dispersion medium are put into a container together with metallic balls or ceramic balls, and the container is rotated, for example. The ball mill treatment is preferably performed at greater than or equal to 200 rpm and less than or equal to 500 rpm for longer than or equal to 3 hours and shorter than or equal to 6 hours. With ball mill treatment, the silicon powder can be formed into minute particles, so that the electrode material that is to be formed can be minute particles. In the aforementioned manner, silicon particles are obtained. As the dispersion medium, a material in which raw materials are not dissolved can be used. Furthermore, screening is preferably performed with a sieve to extract silicon particles with a small diameter. Here, a sieve with a hole diameter of greater than or equal to 10 μm and less than or equal to 100 μm is preferably used. Through the above steps, silicon particles with an average diameter of greater than or equal to 0.5 μm and less than or equal to 5 μm can be obtained.

In general, commercial silicon particles with a small diameter (for example, with an average diameter of less than or equal to 100 nm) are expensive. In one embodiment of the present invention, a silicon wafer is ground to form silicon particles. The use of a silicon wafer enables the formation of silicon particles at very low cost. The resistivity of the silicon particles that serve as negative electrode active materials is preferably low. In one embodiment of the present invention, a low-resistance silicon wafer containing an impurity (such as boron, phosphorus, or antimony) can be used, and thus silicon particles with low resistivity can be used as negative electrode active materials. Note that in one embodiment of the present invention, silicon particles are not limited to those formed by grinding a silicon wafer.

<Step S102>

The silicon particles obtained by the grinding treatment in Step S101 are subjected to heat treatment to form silicon oxide films on the surfaces of the silicon particles.

For example, the silicon particles formed in Step S101 are preferably subjected to heat treatment at higher than or equal to 700° C. and lower than or equal to 1000° C. in an air atmosphere for longer than or equal to 0.5 hours and shorter than or equal to 5 hours. By the heat treatment, silicon oxide films are preferably formed on the surfaces of the silicon particles to a thickness of greater than or equal to 100 nm and less than or equal to 900 nm, more preferably greater than or equal to 150 nm and less than or equal to 450 nm. All the silicon particles with a radius smaller than the thickness of the silicon oxide film are oxidized to be a silicon oxide in some cases. Note that the silicon oxide films formed in this step are removed by etching treatment in a step described later to be spaces. The volume of the spaces is larger than or equal to that of a negative electrode active material whose volume increases due to charge. Thus, stress due to an increase in the volume of the silicon particles accompanying charge can be relieved.

<Step S103>

Subsequently, graphene oxide flakes, a binder, the silicon particles obtained in S102 are mixed to form Mixture A.

For example, a mixture of graphene compounds, a binder, and a dispersion medium is added to the silicon particles obtained in S102, kneading (mixing with a high viscosity) is performed, and then, the dispersion medium is volatilized with a circulation dryer. The kneading allows the silicon particles, the graphene compounds, and the binder to be mixed uniformly. Graphene oxide flakes are preferably added as the graphene compounds.

In this embodiment, graphene oxide flakes for a conductive additive, a precursor of polyimide for a binder, N-methylpyrrolidone (NMP) as the dispersion medium are used. By the kneading, graphene oxide flakes are uniformly dispersed and a single-layer graphene oxide flakes or 2 to 100-layer graphene oxide flakes are attached to the surfaces of the silicon particles. Volatilizing the dispersion medium fixes the graphene oxide flakes and the binder on the surfaces of the silicon particles. Note that the amount of the silicon particles in the total amount of Mixture A is preferably greater than or equal to 40 wt % and less than or equal to 80 wt %, more preferably greater than or equal to 50 wt % and less than or equal to 70 wt %. The amount of the conductive additive in the total amount of Mixture A is preferably greater than or equal to 10 wt % and less than or equal to 30 wt %, more preferably greater than or equal to 15 wt % and less than or equal to 25 wt % The amount of the binder in the total amount of Mixture A is preferably greater than or equal to 10 wt % and less than or equal to 30 wt %, more preferably greater than or equal to 15 wt % and less than or equal to 25 wt %.

As the dispersion medium, a material in which raw materials are not dissolved can be used. Examples of the dispersion medium include water, methanol, ethanol, acetone, tetrahydrofuran (THF), dimethylformamide (DMF), N-methylpyrrolidone (NMP), dimethyl sulfoxide (DMSO), and a mixed solution of any two or more of the above.

Note that the precursor of polyimide is imidized to be polyimide by heat treatment to be performed later.

First, a method for forming graphene oxide flakes is described. In this embodiment, graphene oxide flakes are used as the graphene compounds. For example, graphene oxide can be formed by a method for forming a dispersion liquid containing graphite oxide by mixing a sulfuric acid solution of potassium permanganate, hydrogen peroxide water, or the like into single crystal graphite powder to cause an oxidation reaction. The graphite oxide has functional groups such as an epoxy group, a carbonyl group, a carboxyl group, and a hydroxyl group due to oxidation of carbon in graphite.

Since the graphite oxide has such functional groups, the interlayer distance between adjacent graphenes of a plurality of graphenes is longer than the interlayer distance in graphite.

Next, ultrasonic vibration is applied to the dispersion liquid containing the graphite oxide, so that the graphite oxide whose interlayer distance is long can be cleaved to separate graphene oxide flakes and to form a dispersion liquid containing the graphene oxide flakes. A dispersion medium is removed from the dispersion liquid containing the graphene oxide flakes, whereby the graphene oxide flakes can be obtained.

In a solution having polarity, different graphene oxide flakes are not easily aggregated because the graphene oxide flakes are negatively charged due to a functional group. Thus, the graphene oxide flakes are easily uniformly dispersed in the solution having polarity.

The length of one side (also referred to as a flake size) of graphene oxide which is used is preferably greater than or equal to 1 μm and less than or equal to 50 μm.

<Step S104>

The silicon oxide films on the surfaces of the silicon particles included in Mixture A formed in Step S103 are removed by etching treatment, so that Mixture B is formed. After that, Mixture B is washed and dried, and heat treatment is performed.

A region of the silicon oxide film removed by the etching treatment is the space 124. For example, the space 124 is acceptable as long as the volume thereof is larger than or equal to the volume of the silicon particle that increases due to charge. Specifically, in the case where the volume of the silicon particle with a diameter of 1.0 μm increases by four times due to charge, the diameter of the space 124 is greater than or equal to 1.6 μm. In addition, some of the silicon particles that are entirely oxidized by thermal oxidation are removed by etching treatment, so that the spaces 125 are formed. There is no particular limitation on etching treatment; for example, a fluorine-based aqueous solution can be used. Specifically, it is preferred that a mixed solution containing 7.13% ammonium hydrogen fluoride ($NH_4HF_2$) and 15.4% ammonium fluoride ($NH_4F$) (product name: LAL500, produced by Stella Chemifa Corporation) be dripped to Mixture A formed in Step S103 and etching be performed. Time for etching treatment is preferably longer than or equal to 1 minute and shorter than or equal to 10 minutes. Note that controlling time for etching treatment allows the silicon oxide film on the surface of the silicon particle to be not entirely removed and partly left.

For the washing and drying after the etching treatment, it is preferred that washing with pure water be repeated a plurality of times and then vacuum drying be performed. Note that the vacuum drying is preferably performed at higher than or equal to 100° C. and lower than or equal to 150° C. for longer than or equal to 10 hours.

Furthermore, the heat treatment is preferably performed in a vacuum furnace at higher than or equal to 300° C. and lower than or equal to 500° C., more preferably higher than or equal to 350° C. and lower than or equal to 450° C. for longer than or equal to 30 minutes and shorter than or equal to 2 hours. By the beat treatment, the precursor of polyimide included in Mixture B is imidized to be polyimide. At the same time, the heat treatment reduces the graphene compounds included in Mixture B. In this embodiment, since graphene oxide flakes are used as the graphene compounds added in Step S103, the heat treatment reduces graphene oxide flakes to form reduced graphene oxide flakes. This increases the conductivity of the graphene compounds.

<Step S105>

Mixture B obtained in Step S104 is used to form slurry.

A binder and a dispersion medium are added to Mixture B to form slurry. For example, a binder and a dispersion medium are added to Mixture B and mixing is performed by stirring with a stirrer. The stirring is preferably performed at greater than or equal to 1000 rpm and less than or equal to 3000 rpm for longer than or equal to 3 minutes and shorter than or equal to 10 minutes. Furthermore, kneading is preferably performed after the stirring.

Note that the amount of Mixture B in the total amount of the slurry is preferably greater than or equal to 70 wt % and less than or equal to 95 wt %, more preferably greater than or equal to 80 wt % and less than or equal to 90 wt %. The amount of the binder in the total amount of the slurry is preferably greater than or equal to 5 wt % and less than or equal to 30 wt %, more preferably greater than or equal to 10 wt % and less than or equal to 20 wt %.

For the binder, any of the above binder materials can be used; however, the same material as that of the binder used in Step S103 is preferably used. In this embodiment, a precursor of polyimide is used for the binder.

For the dispersion medium, any of the above dispersion medium materials described in Step S103 can be used; however, the same material as that of the dispersion medium used in Step S103 is preferably used. In this embodiment, N-methylpyrrolidone (NMP) is used as the dispersion medium.

<Step S106>

The slurry formed in Step S105 is applied to the negative electrode current collector 109.

First, the slurry is applied to the negative electrode current collector 109. Before the application of the slurry, surface treatment may be performed on the negative electrode current collector 109. Examples of surface treatment include corona discharge treatment, plasma treatment, and undercoat treatment. Here, the "undercoat" refers to a film formed over a current collector before application of slurry onto the current collector for the purpose of reducing the interface resistance between an active material layer and the current collector or increasing the adhesion between the active material layer and the current collector. Note that the undercoat is not necessarily formed in a film shape, and may be formed in an island shape. In addition, the undercoat may serve as an active material to have capacity. For the undercoat, a carbon material can be used, for example. Examples of the carbon material include graphite, carbon black such as acetylene black and ketjen black (registered trademark), and a carbon nanotub.

For the application of the slurry, a slot die method, a gravure method, a blade method, or combination of any of them can be used. Furthermore, a continuous coater or the like may be used for the application.

Then, the dispersion medium of the slurry is volatilized. The step of volatilizing the dispersion medium of the slurry is preferably performed at a temperature in the range from 50° C. to 200° C. inclusive, more preferably from 60° C. to 150° C. inclusive.

Heat treatment is performed using a hot plate at 30° C. or higher and 70° C. or lower in an air atmosphere for longer than or equal to 10 minutes, and then, for example, another heat treatment is performed at room temperature or higher and 100° C. or lower in a reduced-pressure environment for longer than or equal to 1 hour and shorter than or equal to 10 hours.

Alternatively, heat treatment may be performed using a drying furnace or the like. In the case of using a drying furnace, the heat treatment is performed at 30° C. or higher and 120° C. or lower for longer than or equal to 30 seconds and shorter than or equal to 20 minutes, for example.

The temperature may be increased in stages. For example, after heat treatment is performed at 60° C. or lower for shorter than or equal to 10 minutes, another heat treatment may further be performed at higher than or equal to 65° C. for longer than or equal to 1 minute.

The thickness of the active material layer formed through the above steps is, for example, preferably greater than or equal to 5 m and less than or equal to 300 μm, more preferably greater than or equal to 10 μm and less than or equal to 150 μm.

When the dispersion medium of the slurry is volatilized, the active materials, the conductive additive, and the binder might move, resulting in a reduction in dispersibility thereof. For example, the concentration distribution of the binder might increase in the active material layer. Note that a higher viscosity of the slurry may be preferred, in which case a change in dispersibility after the volatilization of the dispersion medium can be smaller. Furthermore, the rate at which the dispersion medium of the slurry is volatilized may preferably be lower, in which case a change in dispersibility can be smaller.

The slurry is applied to both surfaces or one surface of the negative electrode current collector 109. Alternatively, the slurry can be applied to part of both surfaces of the negative electrode current collector 109.

<Step S107>

Next, heat treatment is performed on the negative electrode current collector 109 to which the slurry is applied.

The heat treatment is preferably performed with a vacuum furnace for longer than or equal to 30 minutes and shorter than or equal to 2 hours at a temperature in the range of 300° C. to 500° C. inclusive, more preferably from 350° C. to 450° C. inclusive. By the heat treatment, the slurry is baked and thus the precursor of polyimide is imidized to be polyimide. At the same time, the heat treatment thermally reduces the graphene compounds. Through the above steps, the negative electrode active material layer 107 is formed.

The heat treatment in Steps S104 and S107 in this embodiment can thermally reduce the graphene compounds, increasing the conductivity of the graphene compounds. In this embodiment, since graphene oxide flakes are used as the graphene compounds added in Step S103, the heat treatment reduces graphene oxide flakes to form reduced graphene oxide flakes. This increases the conductivity of the reduced graphene oxide flakes.

Further, in this embodiment, the heating step of baking the slurry and reducing the graphene oxide flakes is performed at a temperature at which the binder is not decomposed, for example, at a temperature in the range of 300° C. to 500° C. inclusive, more preferably from 350° C. to 450° C. inclusive. Thus, the decomposition of the binder can be prevented. In addition, heating at a temperature at which the binder is not decomposed can suppress deterioration of the negative electrode, leading to prevention of reduction in the reliability of the lithium secondary battery.

Furthermore, in this embodiment, graphene oxide flakes are used as the added graphene compounds as described above. The graphene oxide flakes are formed by oxidizing graphite, and a functional group formed by the oxidation contributes to a dispersion property; therefore, the graphene oxide flakes have a high dispersion property. In the reduction of the graphene oxide flakes, however, the number of functional groups which contribute to the dispersion property is decreased due to the reduction; therefore, the reduced graphene oxide flakes have a low dispersion property.

In an electrode (negative electrode) formed by heating a mixture of graphene oxide flakes and active materials, the graphene oxide flakes are dispersed before the number of the functional groups is decreased due to the reduction; thus, the reduced graphene oxide flakes are dispersed uniformly. Therefore, a lithium-ion storage battery using such the electrode (negative electrode) of one embodiment of the present invention has a favorable electric characteristics.

<Step S108>

Through the above steps, the negative electrode 101 including the negative electrode active material layer 107 formed on the negative electrode current collector 109 is formed.

Another method for forming the negative electrode of one embodiment of the present invention will be described below with reference to FIG. 4.

<Method 2 for Forming Negative Electrode>

Figure 4:
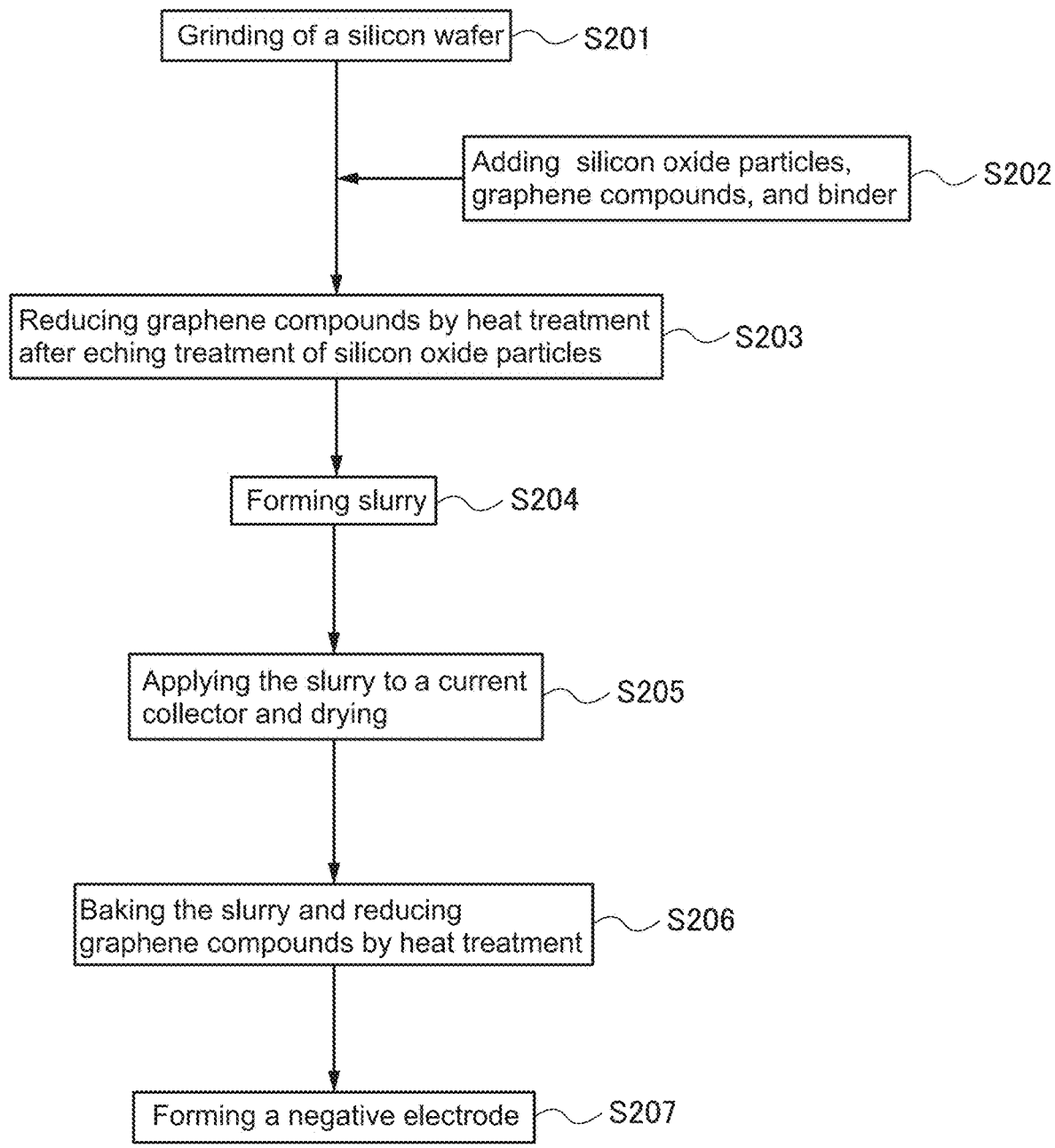
FIG. 4 is a flow chart showing a method for forming an electrode.

FIG. 4 is a flow chart showing a method for forming the negative electrode illustrated in FIGS. 2A to 2C.

<Step S201>

A silicon wafer is ground to form silicon particles that serve as negative electrode active materials. Note that the step S201 is the same as the step S101.

<Step S202>

Subsequently, the silicon particles formed in S201, silicon oxide particles, graphene compounds, and a binder are mixed to form Mixture A.

For example, a mixture of silicon oxide particles, graphene compounds, a binder, and a dispersion medium is added to the silicon particles obtained in S201, kneading (mixing with a high viscosity) is performed, and then, the dispersion medium is volatilized with a circulation dryer. The kneading allows the silicon particles, the silicon oxide particles, the graphene compounds, and the binder to be mixed uniformly. Graphene oxide flakes are preferably added as the graphene compounds.

Here, in the negative electrode active material layer 107 illustrated in FIG. 2B, the average diameter of the silicon oxide particles is preferably greater than or equal to 100 nm and less than or equal to 500 nm, more preferably greater than or equal to 200 nm and less than or equal to 300 nm. In the negative electrode active material layer 107 illustrated in FIG. 2C, the average diameter of the silicon oxide particles is preferably greater than or equal to 0.5 μm and less than or equal to 3.0 μm, more preferably greater than or equal to 0.5 μm and less than or equal to 1.5 μm. A method for forming silicon oxide particles is not particularly limited; for example, a high-temperature hydrolysis method in which silicon tetrachloride, oxygen, and hydrogen are reacted with one another at a time to form silicon oxide or a physical vapor synthesis method in which a raw material such as silicon or a metal is vaporized by thermal energy and an oxidizing reaction is caused in an oxygen atmosphere to generate oxide microparticles can be employed. Alternatively, commercial silicon oxide particles may be used.

For the binder and the dispersion medium, the same materials as those of the binder and the dispersion medium used in Step S103 can be used. The mixing method is the same as that in Step S103.

<Step S203>

The silicon particles included in Mixture A formed in Step S202 are removed by etching treatment, so that Mixture B is formed. After that, Mixture B is washed and dried, and heat treatment is performed.

A region of the silicon oxide particle removed by the etching treatment is the space 125. The etching treatment step is the same as that described in Step S104.

<Step S204>

Mixture B obtained in Step S203 is used to form slurry. The slurry formation step is the same as that described in Step S105.

<Step S205>

The slurry formed in Step S204 is applied to the negative electrode current collector 109. The slurry formation step is the same as that described in Step S106.

<Step S206>

Next, heat treatment is performed on the negative electrode current collector 109 to which the slurry is applied. The heat treatment process is the same as that described in Step S107.

<Step S207>

Through the above steps, the negative electrode 101 including the negative electrode active material layer 107 formed on the negative electrode current collector 109 is formed.

In this embodiment, one embodiment of the present invention is described. Other embodiments of the present invention are described in the other embodiments. Note that one embodiment of the present invention is not limited to the above examples. That is, since various embodiments of the present invention are disclosed in this embodiment and the other embodiments, one embodiment of the present invention is not limited to a specific embodiment. For example, although an example of use in a lithium-ion storage battery is described in this embodiment, one embodiment of the present invention is not limited thereto. Depending on circumstances or conditions, application of one embodiment of the present invention to a variety of secondary batteries such as a lead storage battery, a lithium-ion polymer storage battery, a nickel-hydrogen storage battery, a nickel-cadmium storage battery, a nickel-iron storage battery, a nickel-zinc storage battery, a silver oxide-zinc storage battery, a solid-state battery, an air battery, a zinc air battery, and a lithium air battery; a primary battery; a capacitor such as an electric double layer capacitor, an ultracapacitor, a supercapacitor, and a lithium ion capacitor; and the like is also possible. Depending on circumstances or conditions, one embodiment of the present invention is not necessarily applied to a lithium-ion storage battery, for example. Although an example where graphene flakes, graphene compounds, or graphene oxide flakes are included have been described as one embodiment of the present invention, one embodiment of the present invention is not limited to this example. Depending on circumstances or conditions, one embodiment of the present invention may include any of a variety of materials or does not necessarily include graphene, a graphene compound, or graphene oxide, for example.

Embodiment 2

Described in this embodiment will be an example of a power storage device using the electrode of one embodiment of the present invention.

Note that the power storage device in this specification and the like indicates all elements and devices that have the function of storing electric power. For example, a storage battery such as a lithium-ion secondary battery, a lithium-ion capacitor, and an electric double layer capacitor are included in the category of the power storage device.

[Thin Storage Battery]

Figure 5:
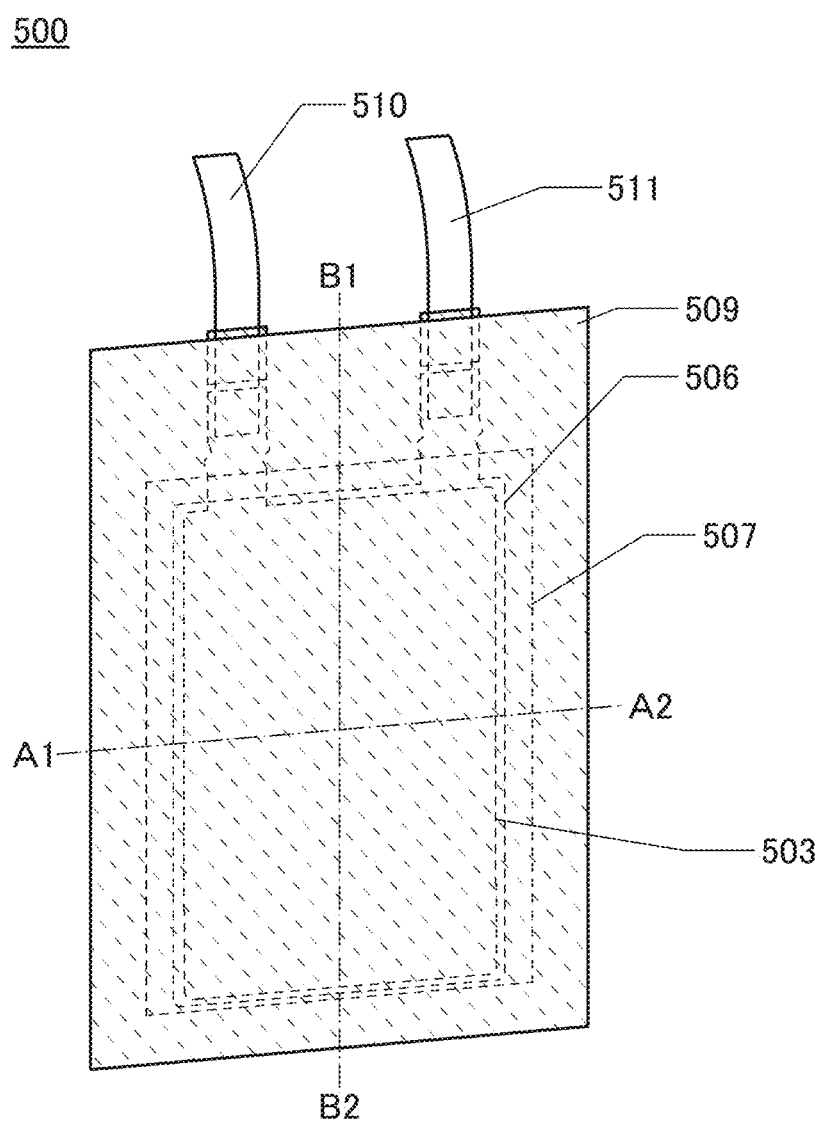
FIG. 5 illustrates a storage battery.

FIG. 5 illustrates a thin storage battery as an example of a storage device. FIG. 5 illustrates an example of a thin storage battery. When a flexible thin storage battery is used in an electronic device at least part of which is flexible, the storage battery can be bent as the electronic device is bent.

Figure 6A:
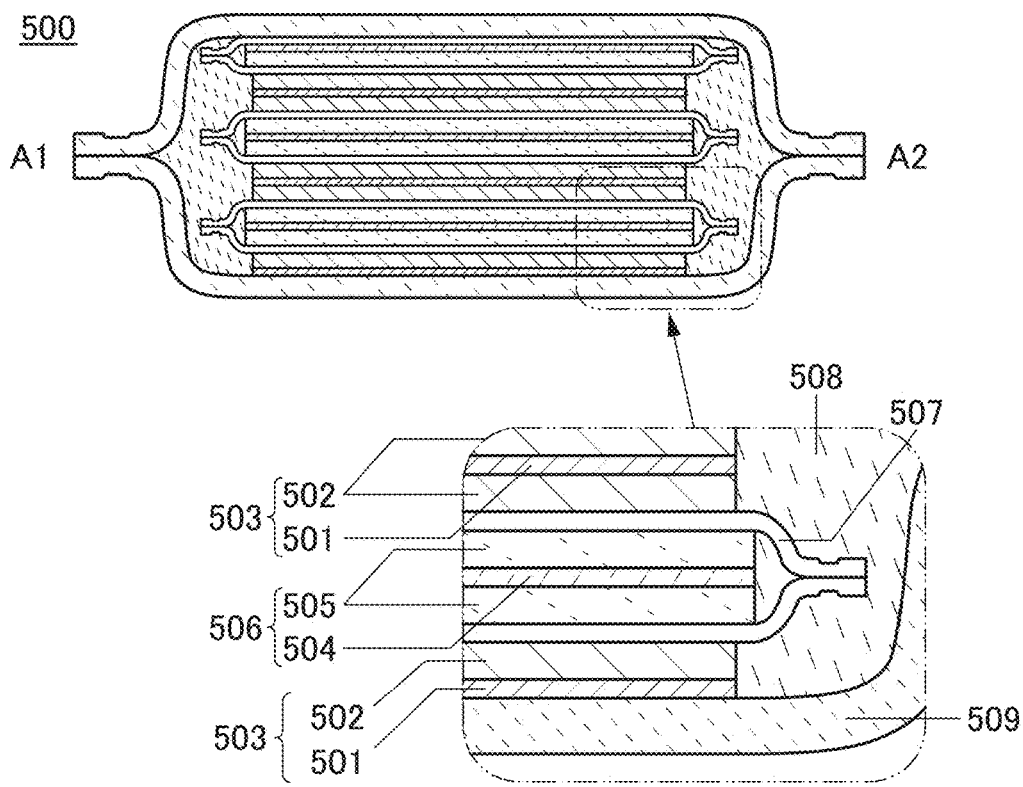
FIGS. 6A and 6B are cross-sectional views illustrating storage batteries.
Figure 6B:
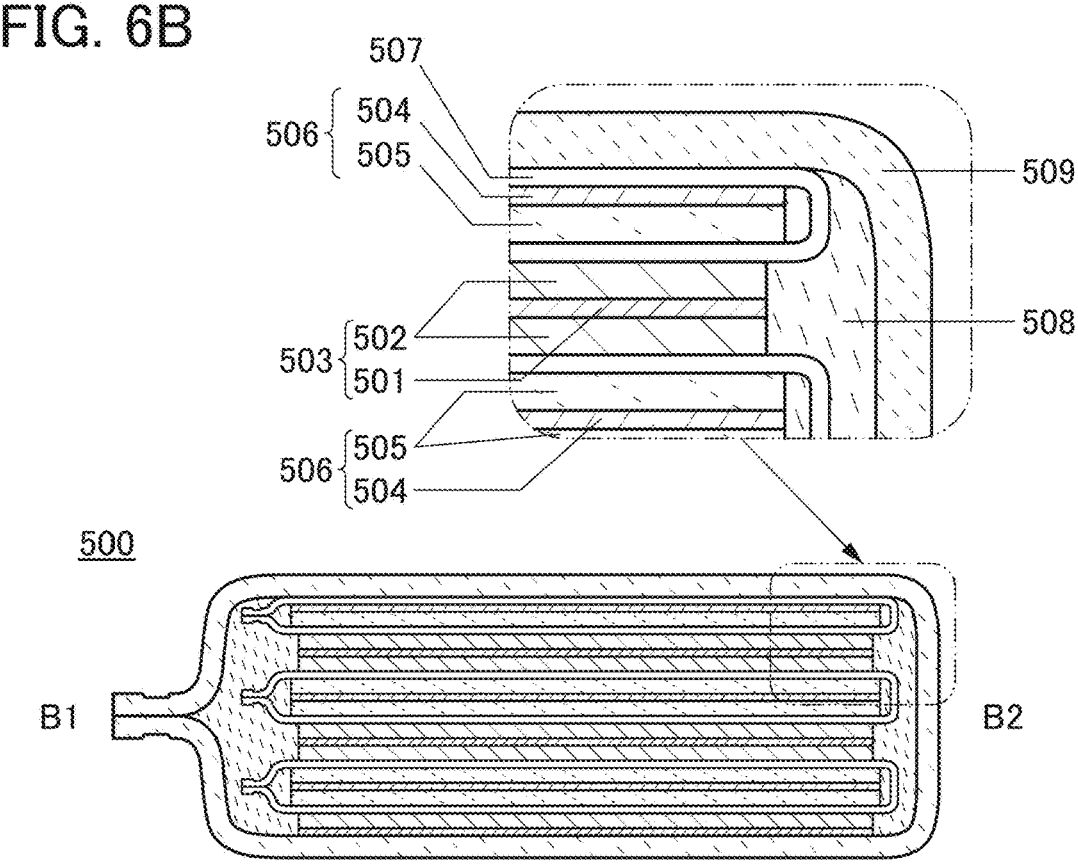

FIG. 5 is an external view of a thin storage battery 500. FIG. 6A is a cross-sectional view along dashed-dotted line A1-A2 in FIG. 5, and FIG. 6B is a cross-sectional view along dashed-dotted line B1-B2 in FIG. 5. The thin storage battery 500 includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. The electrolytic solution 508 is included in the exterior body 509.

The negative electrode 101 described in Embodiment 1 can be used as appropriate as the negative electrode 506.

As the positive electrode current collector 501 and the positive electrode active material layer 502 in the positive electrode 503, a positive electrode current collector and a positive electrode active material layer which will be described below can be used as appropriate.

<Positive Electrode Current Collector>

The positive electrode current collector 501 can be formed using a material that has high conductivity and does not dissolve at the potential of the positive electrode, such as a metal typified by stainless steel, gold, platinum, aluminum, or titanium, or an alloy thereof. Alternatively, the positive electrode current collector 501 can be formed using an aluminum alloy to which an element that improves heat resistance, such as silicon, titanium, neodymium, scandium, or molybdenum, is added. Still alternatively, a metal element that forms silicide by reacting with silicon can be used. Examples of the metal element that forms silicide by reacting with silicon include zirconium, titanium, hafnium, vanadium, niobium, tantalum, chromium, molybdenum, tungsten, cobalt, nickel, and the like. The positive electrode current collector 501 can have any of various shapes including a foil-like shape, a plate-like shape (sheet-like shape), a net-like shape, a punching-metal shape, and an expanded-metal shape. The positive electrode current collector 501 preferably has a thickness of 5 μm to 30 μm inclusive. The surface of the positive electrode current collector 501 may be provided with an undercoat using graphite or the like.

<Positive Electrode Active Material Layer>

The positive electrode active material layer 502 may further include, in addition to a positive electrode active material, a binder for increasing adhesion of the positive electrode active material, a conductive additive for increasing the conductivity of the positive electrode active material layer 502, and the like.

Examples of a positive electrode active material that is used in the positive electrode active material layer 502 include a composite oxide with an olivine crystal structure, a composite oxide with a layered rock-salt crystal structure, and a composite oxide with a spinel crystal structure. As the positive electrode active material, a compound such as $LiFeO_2$, $LiCoO_2$, $LiNiO_2$, $LiMn_2O_4$, $V_2O_5$, $Cr_2O_5$, or $MnO_2$ is used, for example.

$LiCoO_2$ is particularly preferable because it has a high capacity, stability in the air higher than that of $LiNiO_2$, and thermal stability higher than that of $LiNiO_2$, for example.

It is preferable to add a small amount of lithium nickel oxide ($LiNiO_2$ or $LiNi_{1-x}MO_2$ (0<x<1, M=Co, Al, or the like)) to a lithium-containing material with a spinel crystal structure which contains manganese such as $LiMn_2O_4$ because the characteristics of a power storage device using such a material can be improved.

Another example of the positive electrode active material is a lithium-manganese composite oxide that is represented by a composition formula $Li_aMn_bM_cO_d$. Here, the element M is preferably a metal element other than lithium and manganese, or silicon or phosphorus, more preferably nickel. Furthermore, in the case where the whole particle of a lithium-manganese composite oxide is measured, it is preferable to satisfy the following at the time of discharging: $0<a/(b+c)<2$; $c>0$; and $0.26\leq(b+c)/d<0.5$. Note that the ratios of metal, silicon, phosphorus, and other elements to the total composition in the whole particle of a lithium-manganese composite oxide can be measured with, for example, an inductively coupled plasma mass spectrometer (ICP-MS). The ratio of oxygen to the total composition in the whole particle of a lithium-manganese composite oxide can be measured by, for example, energy dispersive X-ray spectroscopy (EDX). Alternatively, the ratio of oxygen to the total composition in the whole particle of a lithium-manganese composite oxide can be measured by ICP-MS combined with fusion gas analysis and valence evaluation of X-ray absorption fine structure (XAFS) analysis. Note that the lithium-manganese composite oxide is an oxide containing at least lithium and manganese, and may contain at least one selected from chromium, cobalt, aluminum, nickel, iron, magnesium, molybdenum, zinc, indium, gallium, copper, titanium, niobium, silicon, phosphorus, and the like.

To achieve a high capacity, the lithium-manganese composite oxide preferably includes a region where the surface portion and the middle portion are different in the crystal structure, the crystal orientation, or the oxygen content. In order that such a lithium-manganese composite oxide can be obtained, the composition formula is preferably $Li_aMn_bNi_cO_d$ satisfying the following: $1.6\leq a\leq 1.848$; $0.19\leq c/b\leq 0.935$; and $2.5\leq d\leq 3$. Furthermore, it is particularly preferable to use a lithium-manganese composite oxide represented by a composition formula $Li_{1.68}Mn_{0.8062}Ni_{0.318}O_3$.

In this specification and the like, a lithium-manganese composite oxide represented by a composition formula $Li_{1.68}Mn_{0.8062}Ni_{0.318}O_3$ refers to that formed at a ratio (molar ratio) of the amounts of raw materials of $Li_2CO_3$: $MnCO_3$:NiO=0.84:0.8062:0.318. Although this lithium-manganese composite oxide is represented by a composition formula $Li_{1.68}Mn_{0.8062}Ni_{0.318}O_3$, the composition might deviate from this.

Figure 7A:
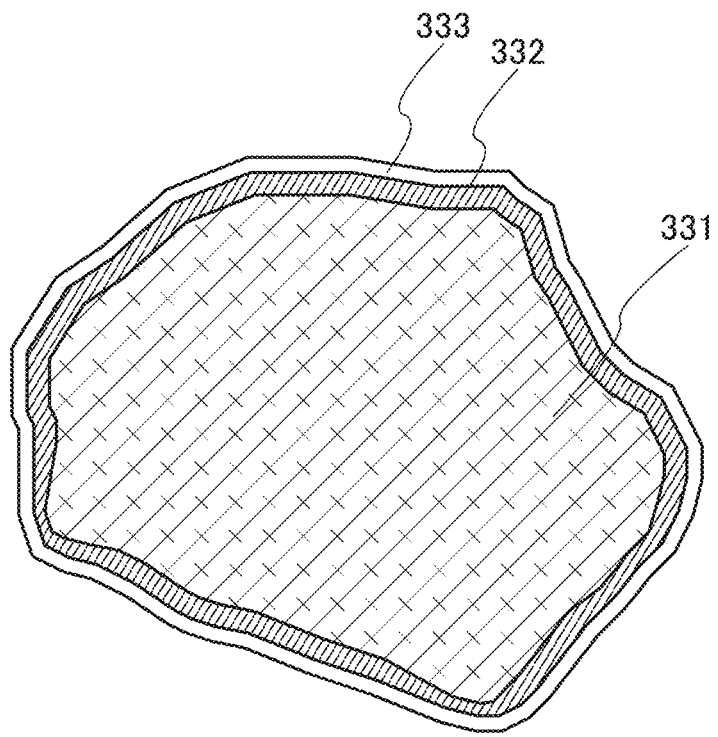
FIGS. 7A and 7B are each a cross-sectional view of a particle.
Figure 7B:
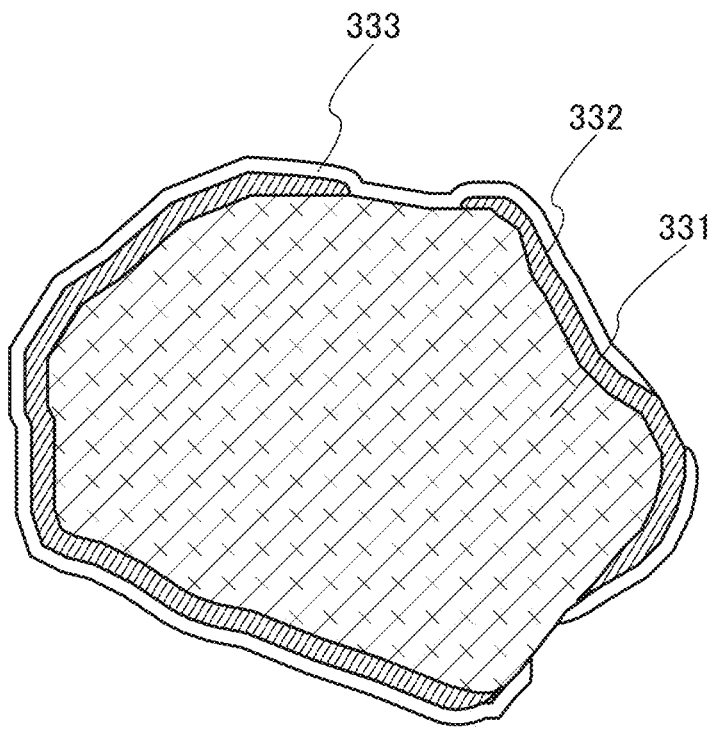

FIGS. 7A and 7B each illustrate an example of a cross-sectional view of a particle of a lithium-manganese composite oxide having a region with different crystal structures, crystal orientations, or oxygen contents.

As illustrated in FIG. 7A, the lithium-manganese composite oxide having a region with different crystal structures, crystal orientations, or oxygen contents preferably include a first region 331, a second region 332, and a third region 333. The second region 332 is in contact with at least part of the outer side of the first region 331. Here, the term "outer side" refers to the side closer to a surface of a particle. The third region 333 preferably includes a region corresponding to a surface of a particle containing the lithium-manganese composite oxide.

As shown in FIG. 7B, the first region 331 may include a region not covered with the second region 332. The second region 332 may include a region not covered with the third region 333. Furthermore, the first region 331 may include a region in contact with the third region 333, for example. Furthermore, the first region 331 may include a region covered with neither the second region 332 nor the third region 333.

The second region 332 preferably has composition different from that of the first region 331.

For example, the case will be described where the composition of the first region 331 and that of the second region 332 are separately measured and the first region 331 and the second region 332 each contain lithium, manganese, the element M, and oxygen; the atomic ratio of lithium to manganese, the element M, and oxygen in the first region 331 is represented by a1:b1:c1:d1; and the atomic ratio of lithium to manganese, the element M, and oxygen in the second region 332 is represented by a2:b2:c2:d2. Note that the composition of each of the first region 331 and the second region 332 can be measured by, for example, EDX using a TEM. In measurement by EDX, the proportion of lithium is sometimes difficult to measure. Thus, a difference between the first region 331 and the second region 332 in composition except for lithium will be described below. Here, $d1/(b1+c1)$ is preferably greater than or equal to 2.2, more preferably greater than or equal to 2.3, still more preferably greater than or equal to 2.35 and less than or equal to 3. Furthermore, $d2/(b2+c2)$ is preferably less than 2.2, more preferably less than 2.1, much more preferably greater than or equal to 1.1 and less than or equal to 1.9. In this case, the composition of the whole particle of lithium-manganese composite oxide including the first region 331 and the second region 332 also preferably satisfies the above inequality: $0.26\leq(b+c)/d<0.5$.

The valence of manganese in the second region 332 may be different from that of manganese in the first region 331. The valence of the element M in the second region 332 may be different from that of the element M in the first region 331.

Specifically, the first region 331 is preferably a lithium-manganese composite oxide having a layered rock-salt crystal structure. The second region 332 is preferably a lithium-manganese composite oxide having a spinel crystal structure.

Here, in the case where the compositions of the regions or valences of elements in the regions are spatially distributed, the compositions or valences in a plurality of portions are obtained, the average values thereof are calculated, and the average values are regarded as the compositions or valences of the regions, for example.

A transition layer may be provided between the second region 332 and the first region 331. The transition layer is a region where the composition, crystal structure, or crystal lattice constant changes continuously or gradually. A mixed layer may be provided between the second region 332 and the first region 331. The mixed layer is a layer in which, for example, two or more crystals having different crystal orientations are mixed, two or more crystals having different crystal structures are mixed, or two or more crystals having different compositions are mixed.

The third region 333 preferably contains carbon or a metal compound. Examples of the metal include cobalt, aluminum, nickel, iron, manganese, titanium, zinc, and lithium. Examples of the metal compound include an oxide and a fluoride of the metal.

It is particularly preferable that the third region 333 contain carbon. Since carbon has high conductivity, the particle covered with carbon in the electrode of the power storage device can reduce the resistance of the electrode, for example. When the third region 333 contains carbon, the second region 332 which is in contact with the third region 333 can be oxidized. The third region 333 may include a conductive graphene compound (that will be described later). A conductive graphene compound has excellent electrical characteristics of high conductivity and excellent physical properties of high flexibility and high mechanical strength. Moreover, a particle of the lithium-manganese composite oxide can be coated efficiently.

When the third region 333 includes a carbon material such as a conductive graphene compound, the power storage device using the lithium-manganese composite oxide as a positive electrode material can have improved cycle performance.

The thickness of a layer containing carbon is preferably greater than or equal to 0.4 nm and less than or equal to 40 nm.

The average diameter of primary particles of the lithium-manganese composite oxide is preferably greater than or equal to 5 nm and less than or equal to 50 μm, more preferably greater than or equal to 100 nm and less than or equal to 500 nm, for example. Furthermore, the specific surface area is preferably greater than or equal to 5 m²/g and less than or equal to 15 m²/g. Furthermore, the average diameter of secondary particles is preferably greater than or equal to 5 μm and less than or equal to 50 μm. Note that the average particle diameters can be measured with a particle diameter distribution analyzer or the like using a laser diffraction and scattering method or by observation with a SEM or a TEM. The specific surface area can be measured by a gas adsorption method.

Alternatively, a complex material ($LiMPO_4$ (general formula) (M is one or more of Fe(II), Mn(II), Co(II), and Ni(II))) can be used as the positive electrode active material. Typical examples of the general formula $LiMPO_4$ are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b \leq 1$, $0 < a < 1$, and $0 < b < 1$), $LiFe_cNi_dCo_ePO_4$, $LiFe_cNi_dMn_ePO_4$, $LiNi_cCo_dMn_ePO_4$ ($c+d+e \leq 1$, $0 < c < 1$, $0 < d < 1$, and $0 < e < 1$), and $LiFe_fNi_gCo_hMn_iPO_4$ ($f+g+h+i \leq 1$, $0 < f < 1$, $0 < g < 1$, $0 < h < 1$, and $0 < i < 1$).

$LiFePO_4$ is particularly preferable because it properly has properties necessary for the positive electrode active material, such as safety, stability, a high capacity density, and the existence of lithium ions which can be extracted in initial oxidation (in charging).

Alternatively, a complex material such as $Li_{(2-j)}MSiO_4$ (general formula) (M is one or more of Fe(II), Mn(II), Co(II), and Ni(II); $0 \leq j \leq 2$) may be used as the positive electrode active material. Typical examples of the general formula $Li_{(2-j)}MSiO_4$ are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ ($k+l \leq 1$, $0 < k < 1$, and $0 < l < 1$), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ ($m+n+q \leq 1$, $0 < m < 1$, $0 < n < 1$, and $0 < q < 1$), and $Li_{(2-j)}Fe_rNi_sCo_tMn_uSiO_4$ ($r+s+t+u \leq 1$, $0 < r < 1$, $0 < s < 1$, $0 < t < 1$, and $0 < u < 1$).

Still alternatively, a nasicon compound expressed by $A_xM_2(XO_4)_3$ (general formula) (A=Li, Na, or Mg, M=Fe, Mn, Ti, V, or Nb, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaFeF_3$ and $FeF_3$, a metal chalcogenide (a sulfide, a selenide, or a telluride) such as $TiS_2$ and $MoS_2$, an oxide with an inverse spinel structure such as $LiMVO_4$ (M=Mn, Co, or Ni), a vanadium oxide ($V_2O_5$, $V_6O_{13}$, $LiV_3O_8$, or the like), a manganese oxide, an organic sulfur compound, or the like can be used as the positive electrode active material.

In the case where carrier ions are alkali metal ions other than lithium ions, or alkaline-earth metal ions, a material containing an alkali metal (e.g., sodium and potassium) or an alkaline-earth metal (e.g., calcium, strontium, barium, beryllium, and magnesium) instead of lithium may be used as the positive electrode active material. For example, the positive electrode active material may be a layered oxide containing sodium, such as $NaFeO_2$ and $Na_{2/3}[Fe_{1/2}Mn_{1/2}]O_2$.

Note that although not illustrated, a conductive material such as a carbon layer may be provided on the surface of the positive electrode active material. Providing a conductive material such as a carbon layer lead to increase in the conductivity of an electrode. For example, the positive electrode active material can be coated with a carbon layer by mixing a carbohydrate such as glucose at the time of baking the positive electrode active material.

The average diameter of primary particles of the positive electrode active material is preferably greater than or equal to 50 nm and less than or equal to 100 km.

<Conductive Additive>

Examples of the conductive additive include a carbon material, a metal material, and a conductive ceramic material. Alternatively, a fiber material may be used as the conductive additive. The content of the conductive additive in the positive electrode active material layer 502 is preferably greater than or equal to 1 wt % and less than or equal to 10 wt %, more preferably greater than or equal to 1 wt % and less than or equal to 5 wt %.

A network for electric conduction can be formed in the electrode by the conductive additive. The conductive additive also allows maintaining of a path for electric conduction between the active material particles. The addition of the conductive additive to the active material layer increases the electric conductivity of the active material layer.

For the conductive additive, the same material as that of the conductive additive used in the negative electrode active material layer 107 that is described in Embodiment 1 can be used.

In particular, a conductive graphene compound may have excellent electrical characteristics and excellent physical properties of high flexibility and high mechanical strength. For this reason, the use of conductive graphene compounds for the conductive additive can increase the points and the area where the active materials are in contact with each other.

The conductive graphene compounds have planar surfaces and thus are capable of making low-resistance surface contact. Furthermore, the conductive graphene compounds have extremely high conductivity even with a small thickness. Therefore, even a small amount of graphene compounds can efficiently form a conductive path in an active material layer.

In the case where an active material with a small average particle diameter (e.g., 1 μm or less) is used, the specific surface area of the active material is large and thus more conductive paths for the active material particles are needed. In such a case, it is particularly preferred that graphene with extremely high conductivity that can efficiently form a conductive path even in a small amount is used.

A cross-sectional structure example of the positive electrode active material layer 502 using the conductive graphene compounds for a conductive additive as in the negative electrode active material layer 107 in Embodiment 1 will be described below.

Figure 8A:
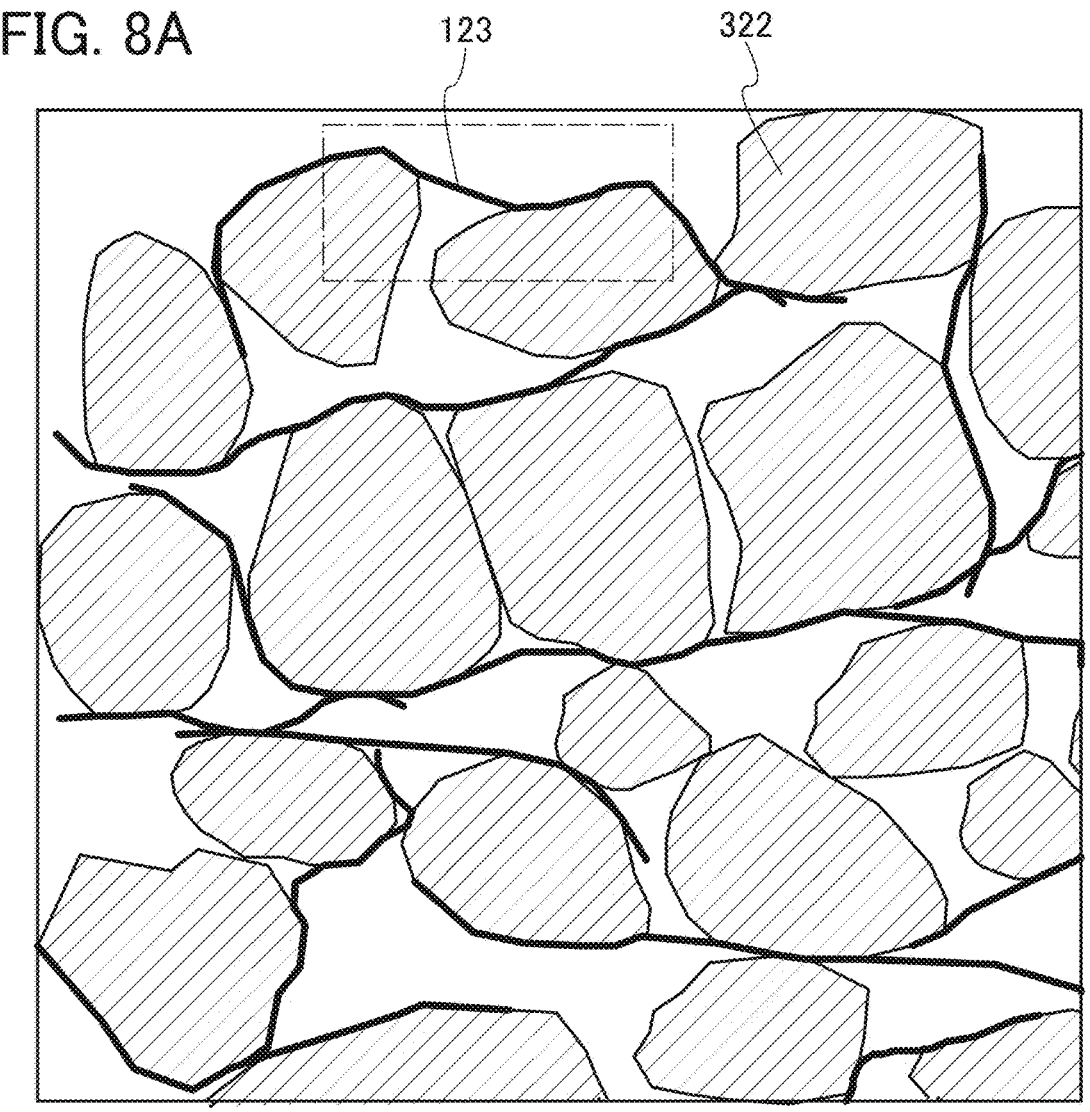
FIGS. 8A and 8B are cross-sectional views illustrating an electrode.

FIG. 8A is a longitudinal sectional view of the positive electrode active material layer 502. The positive electrode active material layer 502 includes active material particles 322, graphene compounds 123 as a conductive additive, and a binder (not illustrated). Here, the graphene compounds 123 are preferably reduced graphene oxide flakes, which are conductive graphene compounds.

The longitudinal section of the positive electrode active material layer 502 in FIG. 8A shows substantially uniform dispersion of the sheet-like graphene compounds 123 in the positive electrode active material layer 502. The graphene compounds 123 are schematically shown by thick lines in FIG. 8A but are actually thin films each having a thickness corresponding to the thickness of a single layer or a multilayer of carbon molecules. The plurality of graphene compounds 123 are formed in such a way as to wrap, coat, or adhere to the surfaces of the plurality of positive electrode active material particles 322, so that the graphene compounds 123 make surface contact with the positive electrode active material particles 322. Furthermore, the graphene compounds 123 are also in surface contact with each other; consequently, the plurality of graphene compounds 123 form a three-dimensional network for electric conduction.

This is because graphene oxide flakes with extremely high dispersibility in a polar dispersion medium is used for the formation of the graphene compounds 123. The dispersion medium is removed by volatilization from a dispersion liquid in which graphene oxide flakes are uniformly dispersed, and the graphene oxide flakes are reduced to graphene flakes; hence, the graphene compounds 123 remaining in the positive electrode active material layer 502 partly overlap with each other and are dispersed such that surface contact is made, thereby forming an electrical conduction path. Note that graphene oxide flakes can be reduced either by heat treatment or with the use of a reducing agent, for example.

Unlike a conductive additive in the form of particles, such as acetylene black, which makes point contact with an active material, the graphene compound 123 is capable of making low-resistance surface contact; accordingly, the electrical conduction between the positive electrode active material particles 322 and the graphene compounds 123 can be improved without an increase in the amount of a conductive additive. Thus, the proportion of the positive electrode active material particles 322 in the positive electrode active material layer 502 can be increased. This can increase the discharge capacity of a power storage device.

Graphene compounds can be bonded to each other to form a net-like graphene compound (hereinafter referred to as a graphene net). The graphene net covering the positive electrode active material can function as a binder for binding particles. The amount of a binder can thus be reduced, or the binder does not have to be used. This can increase the proportion of the positive electrode active material in the electrode volume or weight. That is to say, the capacity of the power storage device can be increased.

Figure 8B:
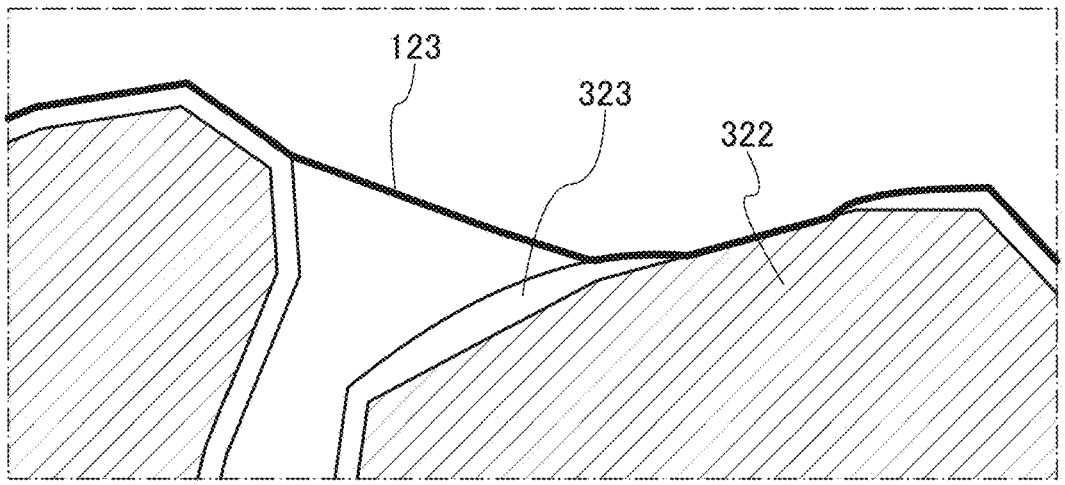

FIG. 8B is an enlarged view illustrating a region surrounded by a dashed dotted line in FIG. 8A. A binder 323 may exist in the shape of a layer on a surface of the positive electrode active material particle 322. The graphene compound 123 preferably includes a region in contact with a surface of the binder 323. The binder 323 is located between the positive electrode active material particle 322 and the graphene compound 123, for example. Preferably, the binder 323 is provided on the positive electrode active material particle 322 and the graphene compound 123 is provided on the binder 323.

<Electrolytic Solution>

As a solvent of the electrolytic solution 508, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a high-molecular material that undergoes gelation is used as a solvent of the electrolytic solution, safety against liquid leakage and the like is improved. Furthermore, a storage battery can be thinner and more lightweight. Typical examples of the high-molecular material that undergoes gelation include a silicone gel, an acrylic gel, an acrylonitrile gel, a polyethylene oxide-based gel, a polypropylene oxide-based gel, a fluorine-based polymer gel, and the like.

Alternatively, the use of one or more kinds of ionic liquids (room temperature molten salts) which have features of non-flammability and non-volatility as a solvent of the electrolytic solution can prevent a power storage device from exploding or catching fire even when a power storage device internally shorts out or the internal temperature increases owing to overcharging or the like. An ionic liquid contains a cation and an anion. The ionic liquid of one embodiment of the present invention contains an organic cation and an anion. Examples of the organic cation used for the electrolytic solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolytic solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

In the case of using lithium ions as carriers, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_{12}B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolytic solution used for a power storage device is preferably highly purified and contains a small amount of dust particles and elements other than the constituent elements of the electrolytic solution (hereinafter, also simply referred to as impurities). Specifically, the weight ratio of impurities to the electrolytic solution is less than or equal to 1%, preferably less than or equal to 0.1%, and more preferably less than or equal to 0.01%.

Furthermore, an additive agent such as vinylene carbonate, propane sultone (PS), tert-butylbenzene (TBB), fluoroethylene carbonate (FEC), or lithium bis(oxalatoborate) (LiBOB) may be added to the electrolytic solution. The concentration of such an additive agent in the whole solvent is, for example, higher than or equal to 0.1 wt % and lower than or equal to 5 wt %.

Alternatively, a polymer gelled electrolyte obtained in such a manner that a polymer is swelled with an electrolytic solution may be used.

Examples of host polymers include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP) can be used. The polymer may be porous.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator and a spacer are not necessary. Furthermore, the battery can be entirely solidified; therefore, there is no possibility of liquid leakage and thus the safety of the storage battery is dramatically increased.

Figure 9A:
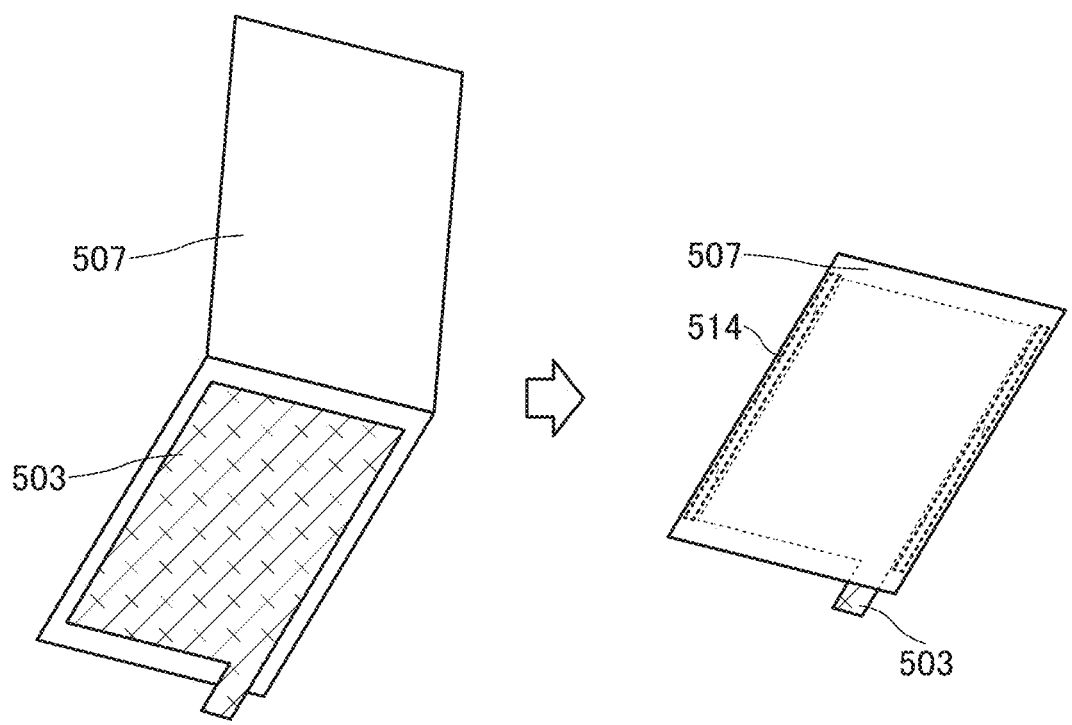
FIGS. 9A and 9B show a method for fabricating a storage battery.
Figure 9B:
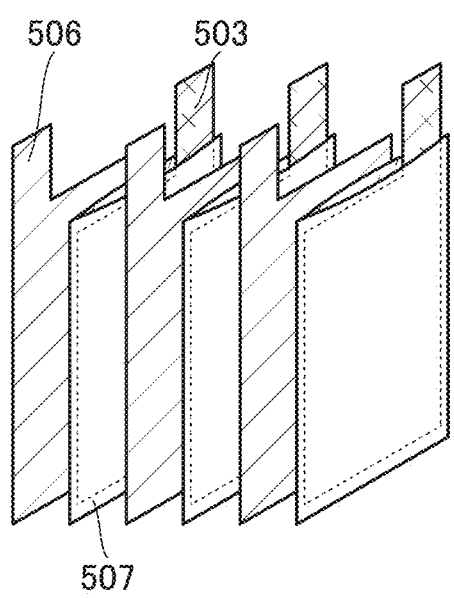

As the separator 507, paper; nonwoven fabric; glass fiber; ceramics; synthetic fiber containing nylon or polyamide, vinylon or polyvinyl alcohol-based fiber, polyester, acrylic, polyolefin, or polyurethane; or the like can be used. The separator 507 is preferably formed to have a bag-like shape to surround one of the positive electrode 503 and the negative electrode 506. For example, as illustrated in FIG. 9A, the separator 507 is folded in two so that the positive electrode 503 is sandwiched, and sealed with a sealing member 514 in a region outside the region overlapping with the positive electrode 503; thus, the positive electrode 503 can be reliably supported inside the separator 507. Then, as illustrated in FIG. 9B, the positive electrodes 503 surrounded by the separators 507 and the negative electrodes 506 are alternately stacked and provided in the exterior body 509, whereby the thin storage battery 500 can be formed.

Figure 10A:
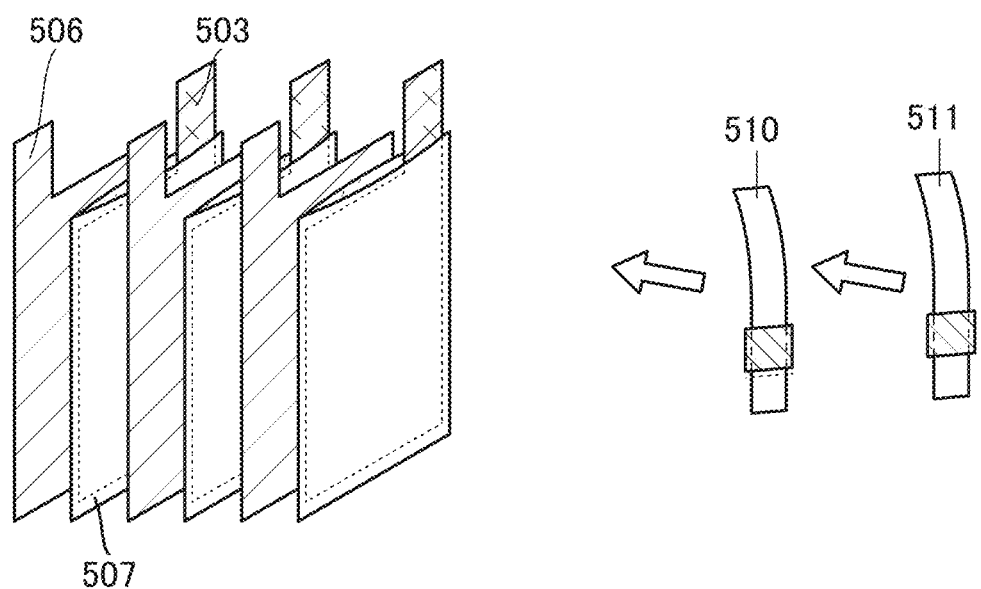
FIGS. 10A and 10B show a method for fabricating a storage battery.
Figure 10B:
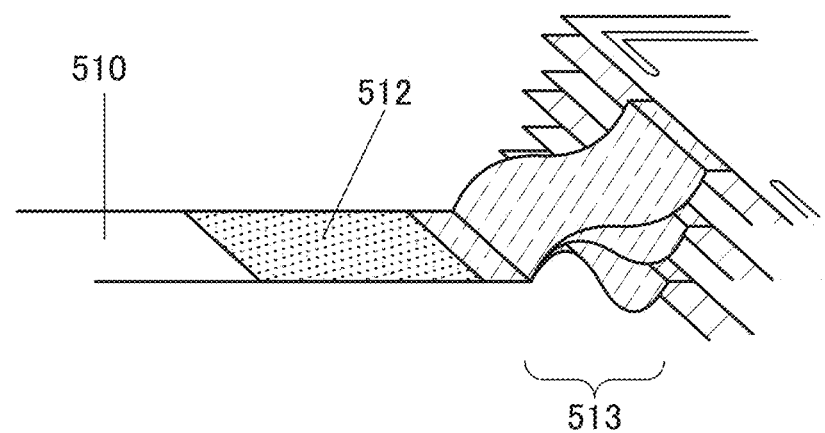

FIG. 10B illustrates an example where current collectors are welded to a lead electrode. As illustrated in FIG. 10A, the positive electrodes 503 each wrapped by the separator 507 and the negative electrodes 506 are alternately stacked. Then, the positive electrodes 503 are welded to the positive electrode lead electrode 510, and the negative electrodes 506 are welded to the negative electrode lead electrode 511. FIG. 10B illustrates an example in which the positive electrodes 503 are welded to the positive electrode lead electrode 510. The positive electrodes 503 are welded to the positive electrode lead electrode 510 in a welding region 512 by ultrasonic welding or the like. The positive electrode 503 includes a bent portion 513 as illustrated in FIG. 101B, and it is therefore possible to relieve stress due to external force applied after fabrication of the thin storage battery 500. The reliability of the thin storage battery 500 can be thus increased.

In the thin storage battery 500 illustrated in FIG. 5 and FIGS. 6A and 6B, the positive electrode 503 and the negative electrode 506 are welded to the positive electrode lead electrode 510 and a negative electrode lead electrode 511, respectively, by ultrasonic welding and part of the positive electrode lead electrode 510 and part of the negative electrode lead electrode 511 are exposed to the outside. The positive electrode 503 and the negative electrode 506 can double as terminals for electrical contact with the outside. In that case, the positive electrode 503 and the negative electrode 506 may be arranged so that part of the positive electrode 503 and part of the negative electrode 506 are exposed to the outside the exterior body 509 without using lead electrodes.

Figure 11:
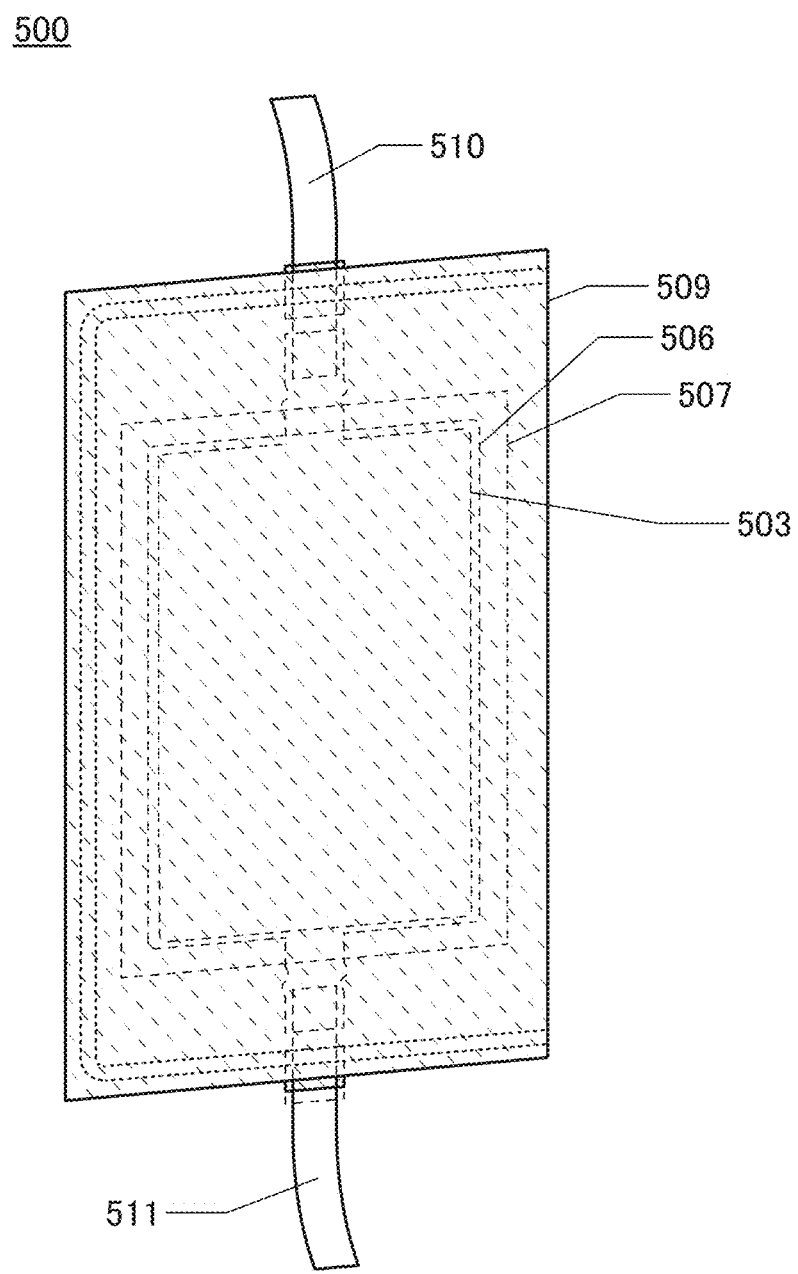
FIG. 11 illustrates a storage battery.

Although the positive electrode lead electrode 510 and the negative electrode lead electrode 511 are provided on the same side in FIG. 5, the positive electrode lead electrode 510 and the negative electrode lead electrode 511 may be provided on different sides as illustrated in FIG. 11. The lead electrodes of a storage battery of one embodiment of the present invention can be freely positioned as described above; therefore, the degree of freedom in design is high. Accordingly, a product including a storage battery of one embodiment of the present invention can have a high degree of freedom in design. Furthermore, a yield of products each including a storage battery of one embodiment of the present invention can be increased.

As the exterior body 509 in the thin storage battery 500, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

Although the examples in FIGS. 6A and 6B each include five positive electrode active material layer-negative electrode active material layer pairs (the positive and negative electrode active material layers of each pair face each other), it is needless to say that the number of pairs of electrode active material layers is not limited to five, and may be more than five or less than five. In the case of using a large number of electrode active material layers, the storage battery can have a high capacity. In contrast, in the case of using a small number of electrode active material layers, the storage battery can have a small thickness and high flexibility.

In the above structure, the exterior body 509 of the thin storage battery 500 can change its form such that the smallest curvature radius is greater than or equal to 3 mm and less than or equal to 30 mm, preferably greater than or equal to 3 mm and less than or equal to 10 mm. One or two films are used as the exterior body of the storage battery. In the case where the storage battery has a layered structure, the storage battery has a cross section sandwiched by two curved surfaces of the films when it is bent.

Figure 12A:
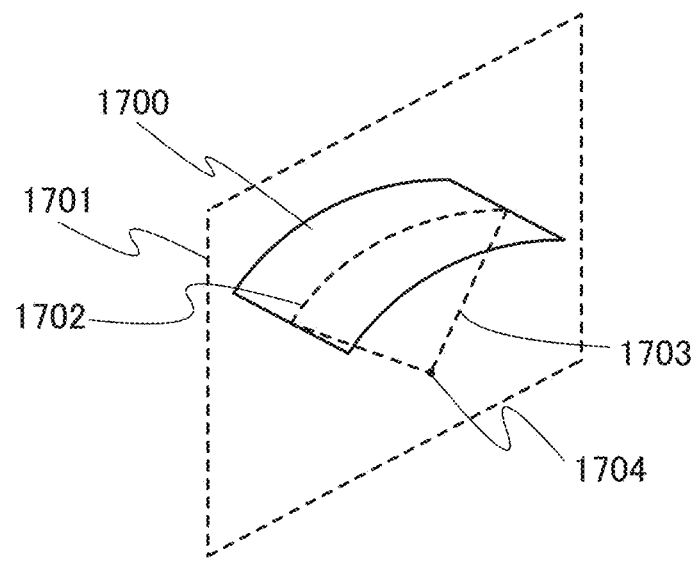
FIGS. 12A to 12C illustrate the radius of curvature of a surface.
Figure 12B:
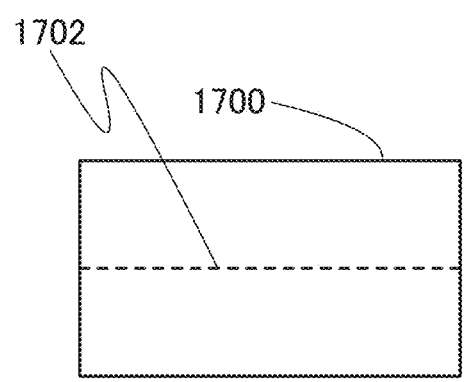
Figure 12C:
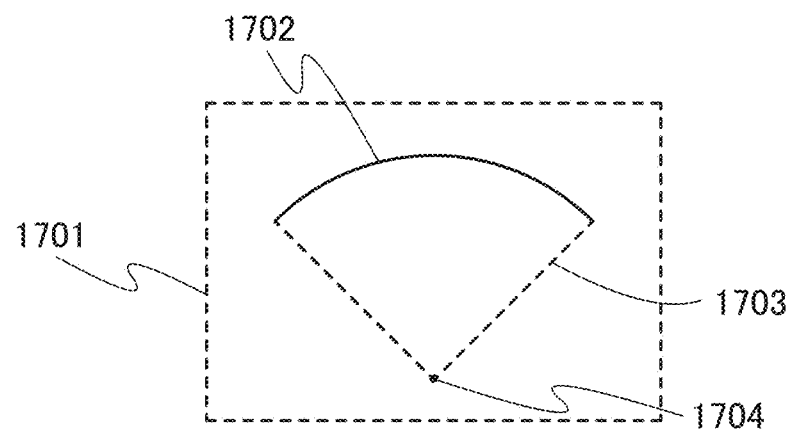

Description will be given of the radius of curvature of a surface with reference to FIGS. 12A to 12C. In FIG. 12A, on a plane 1701 along which a curved surface 1700 is cut, part of a curve 1702 of the curved surface 1700 is approximate to an arc of a circle, and the radius of the circle is referred to as a radius 1703 of curvature and the center of the circle is referred to as a center 1704 of curvature. FIG. 12B is a top view of the curved surface 1700. FIG. 12C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

Figure 13A:
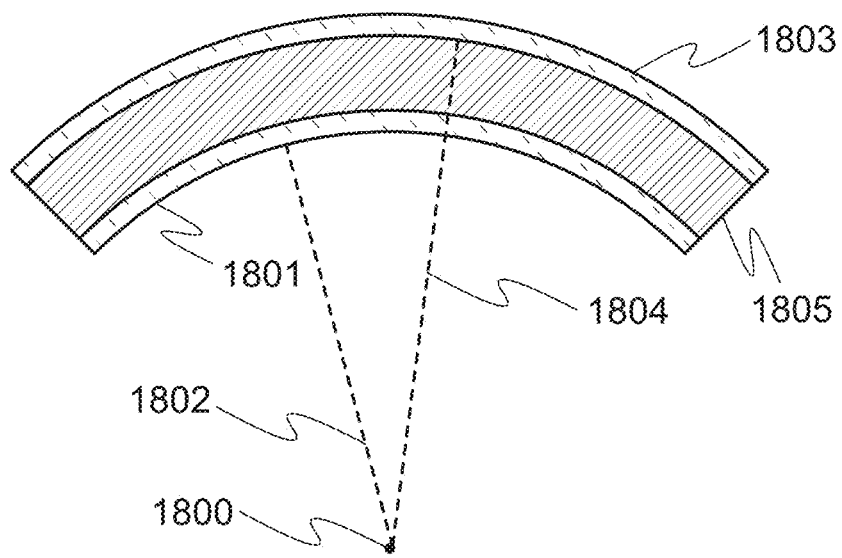
FIGS. 13A to 13D illustrate the radius of curvature of a film.
Figure 13B:
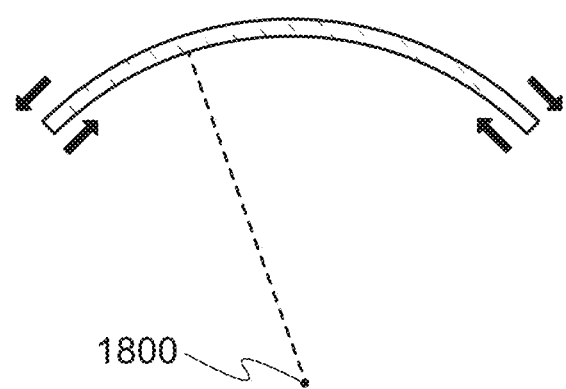

In the case of bending a storage battery in which a component 1805 including electrodes and an electrolytic solution is sandwiched between two films as exterior bodies, a radius 1802 of curvature of a film 1801 close to a center 1800 of curvature of the storage battery is smaller than a radius 1804 of curvature of a film 1803 far from the center 1800 of curvature (FIG. 13A). When the storage battery is curved and has an arc-shaped cross section, compressive stress is applied to a surface of the film on the side closer to the center 1800 of curvature and tensile stress is applied to a surface of the film on the side farther from the center 1800 of curvature (FIG. 13B). However, by forming a pattern including projections or depressions on surfaces of the exterior bodies, the influence of a strain can be reduced to be acceptable even when compressive stress and tensile stress are applied. For this reason, the storage battery can change its form such that the exterior body on the side closer to the center of curvature has the smallest curvature radius greater than or equal to 3 mm and less than or equal to 30 mm, preferably greater than or equal to 3 mm and less than or equal to 10 mm.

Figure 13C:
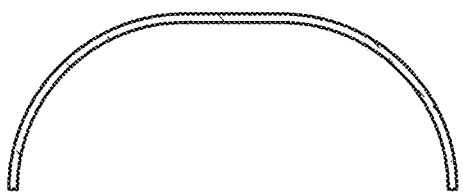
Figure 13D:
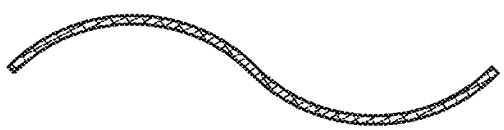

Note that the cross-sectional shape of the storage battery is not limited to a simple arc shape, and the cross section can be partly arc-shaped; for example, a shape illustrated in FIG. 13C, a wavy shape illustrated in FIG. 13D, or an S shape can be used. When the curved surface of the storage battery has a shape with a plurality of centers of curvature, the storage battery can change its form such that a curved surface with the smallest radius of curvature among radii of curvature with respect to the plurality of centers of curvature, which is a surface of the exterior body on the side closer to the center of curvature, has the smallest curvature radius, for example, greater than or equal to 3 mm and less than or equal to 30 mm, preferably greater than or equal to 3 mm and less than or equal to 10 mm.

Next, a variety of examples of the stack of the positive electrode, the negative electrode, and the separator will be described.

Figure 14A:
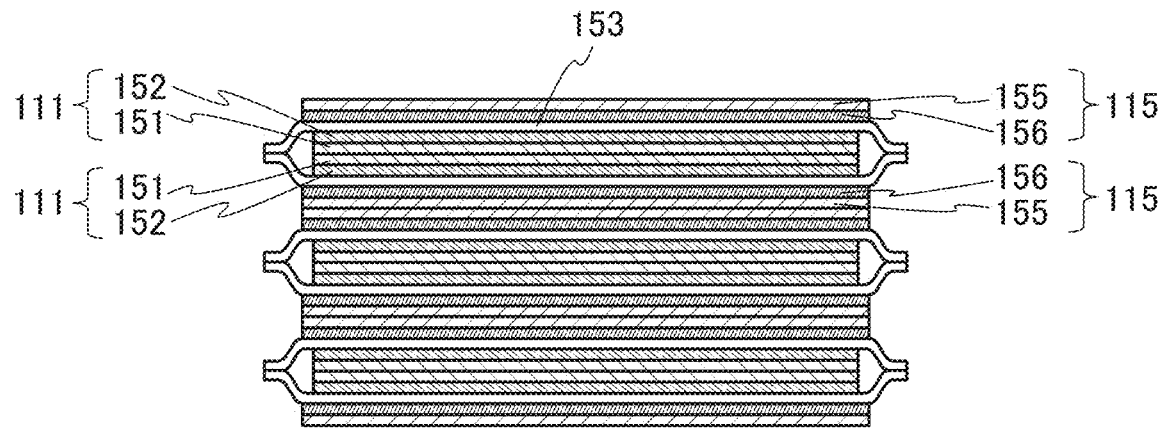
FIGS. 14A to 14C are each a part of a cross-sectional view of a storage battery.

FIG. 14A illustrates an example where six positive electrodes 111 and six negative electrodes 115 are stacked as another structure of the thin storage battery 500. One surface of a positive electrode current collector 151 included in a positive electrode 111 is provided with a positive electrode active material layer 152. One surface of a negative electrode current collector 155 included in a negative electrode 115 is provided with a negative electrode active material layer 156.

In the structure illustrated in FIG. 14A, the positive electrodes 111 and the negative electrodes 115 are stacked so that surfaces of the positive electrodes 111 on each of which the positive electrode active material layer 152 is not provided are in contact with each other and that surfaces of the negative electrodes 115 on each of which the negative electrode active material layer 156 is not provided are in contact with each other. When the positive electrodes 111 and the negative electrodes 115 are stacked in this manner, contact surfaces between metals can be formed; specifically, the surfaces of the positive electrodes 111 on each of which the positive electrode active material layer 152 is not provided can be in contact with each other, and the surfaces of the negative electrodes 115 on each of which the negative electrode active material layer 156 is not provided can be in contact with each other. The coefficient of friction of the contact surface between metals can be lower than that of a contact surface between the active material and the separator.

Therefore, when the thin storage battery 500 is curved, the surfaces of the positive electrodes 111 on each of which the positive electrode active material layer 152 is not provided slide on each other, and the surfaces of the negative electrodes 115 on each of which the negative electrode active material layer 156 is not provided slide on each other: thus, the stress due to the difference between the inner diameter and the outer diameter of a curved portion can be relieved. Here, the inner diameter of the curved portion refers to the radius of curvature of the inner surface of the curved portion in the exterior body of the thin storage battery 500 in the case where the thin storage battery 500 is curved, for example. Therefore, the deterioration of the thin storage battery 500 can be inhibited. Furthermore, the thin storage battery 500 can have high reliability.

Figure 14B:
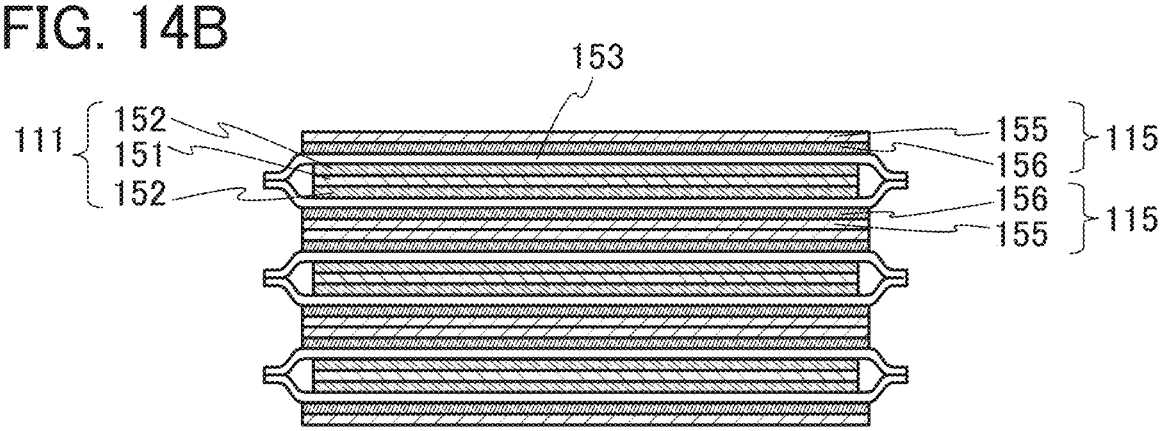

FIG. 14B illustrates an example of a stack of the positive electrodes 111 and the negative electrodes 115 which is different from that in FIG. 14A. The structure illustrated in FIG. 14B is different from that in FIG. 14A in that the positive electrode active material layers 152 are provided on both surfaces of the positive electrode current collector 151. When the positive electrode active material layers 152 are provided on both the surfaces of the positive electrode current collector 151 as illustrated in FIG. 14B, the capacity per unit volume of the thin storage battery 500 can be increased.

Figure 14C:
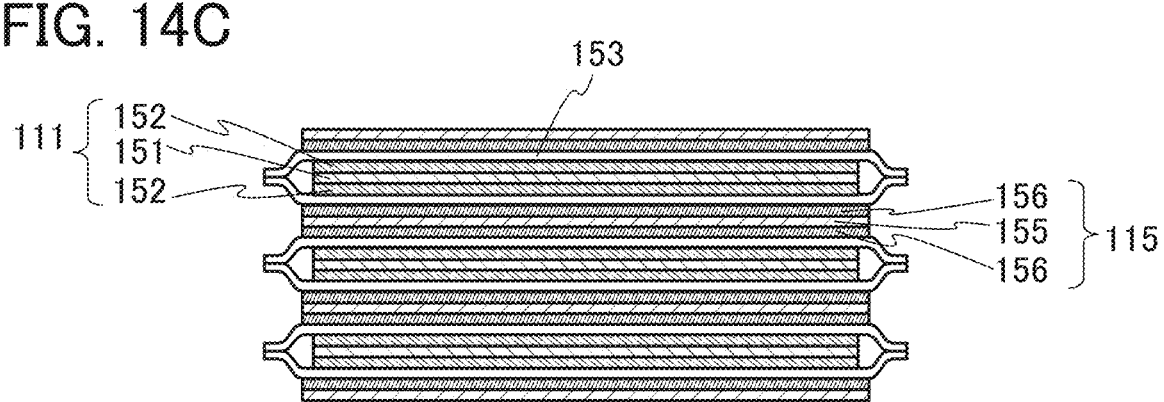

FIG. 14C illustrates an example of a stack of the positive electrodes 111 and the negative electrodes 115 which is different from that in FIG. 14B. The structure illustrated in FIG. 14C is different from that in FIG. 14B in that the negative electrode active material layers 156 are provided on both surfaces of the negative electrode current collector 155. When the negative electrode active material layers 156 are provided on both the surfaces of the negative electrode current collector 155 as illustrated in FIG. 14C, the capacity per unit volume of the thin storage battery 500 can be further increased.

Figure 15A:
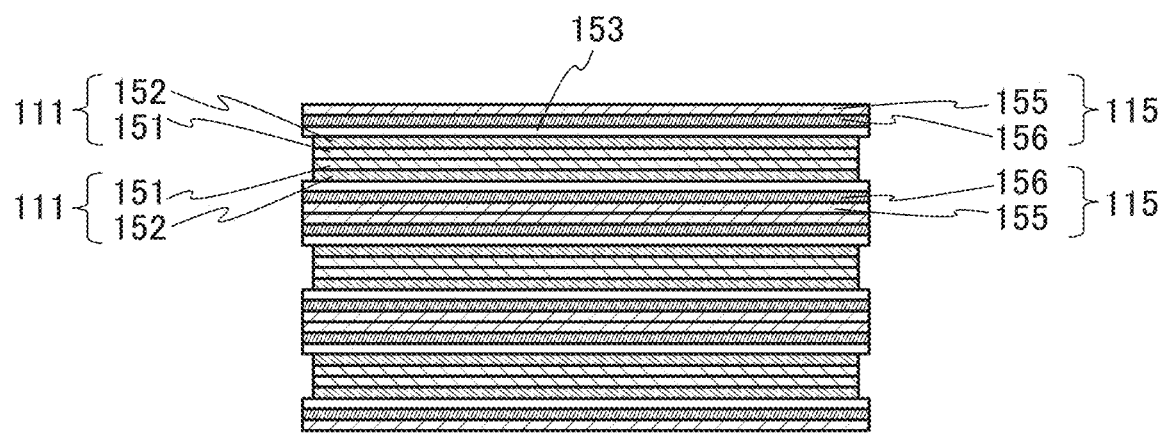
FIGS. 15A and 15B are each a part of a cross-sectional view of a storage battery.

In the structures illustrated in FIGS. 14A to 14C, the separator 153 has a bag-like shape by which the positive electrodes 111 are surrounded; however, one embodiment of the present invention is not limited thereto. FIG. 15A illustrates an example in which the separator 153 has a different structure from that in FIG. 14A. The structure illustrated in FIG. 15A is different from that in FIG. 14A in that the separator 153, which is sheet-like, is provided between every pair of the positive electrode active material layer 152 and the negative electrode active material layer 156. In the structure illustrated in FIG. 15A, six positive electrodes 111 and six negative electrodes 115 are stacked, and six separators 153 are provided.

Figure 15B:
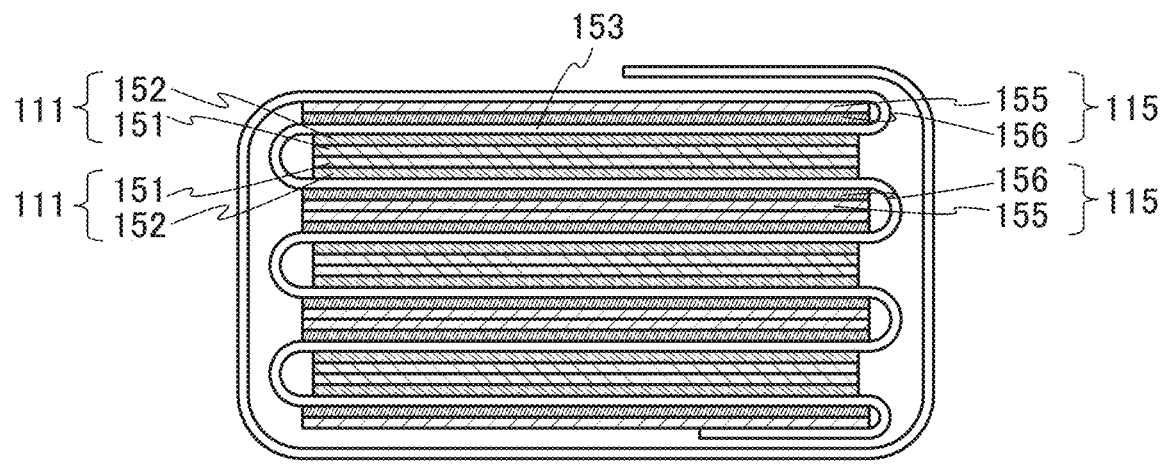

FIG. 15B illustrates an example in which the separator 153 different from that in FIG. 15A is provided. The structure illustrated in FIG. 15B is different from that in FIG. 15A in that one sheet of separator 153 is folded more than once to be interposed between every pair of the positive electrode active material layer 152 and the negative electrode active material layer 156. It can be said that the structure illustrated in FIG. 15B is a structure in which the separators 153 in the respective layers which are illustrated in FIG. 15A are extended and connected together between the layers. In the structure of FIG. 15B, six positive electrodes 111 and six negative electrodes 115 are stacked and thus the separator 153 needs to be folded at least five times. The separator 153 is not necessarily provided so as to be interposed between every pair of the positive electrode active material layer 152 and the negative electrode active material layer 156, and the plurality of positive electrodes 111 and the plurality of negative electrodes 115 may be bound together by extending the separator 153.

Figure 16A:
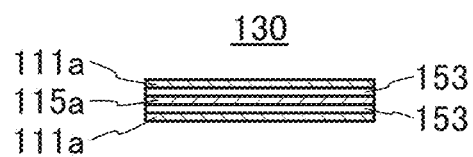
FIGS. 16A to 16C are each a part of a cross-sectional view of a storage battery.
Figure 16B:
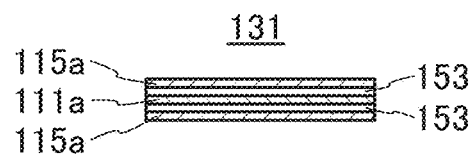
Figure 16C:
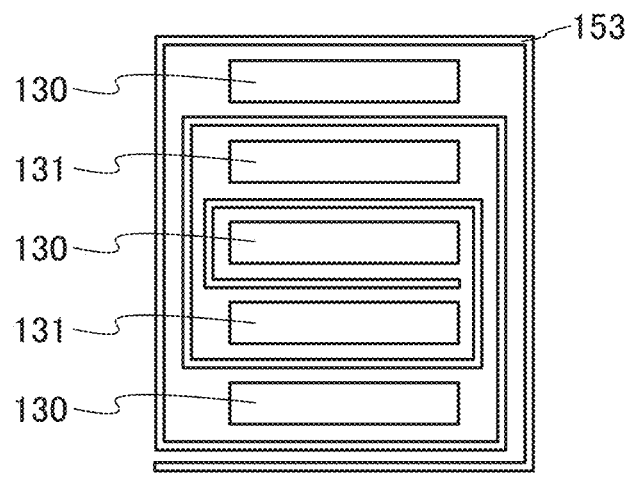

Note that the positive electrode, the negative electrode, and the separator may be stacked as illustrated in FIGS. 16A to 16C. FIG. 16A is a cross-sectional view of a first electrode assembly 130, and FIG. 16B is a cross-sectional view of a second electrode assembly 131. FIG. 16C illustrates an example in which the separator 153 having a structure different from that in FIG. 14A. In FIG. 16C, the first electrode assembly 130, the second electrode assembly 131, and the separator 153 are selectively illustrated for the sake of clarity.

As illustrated in FIG. 16C, the thin storage battery 500 includes a plurality of first electrode assemblies 130 and a plurality of second electrode assemblies 131.

As illustrated in FIG. 16A, in each of the first electrode assemblies 130, a positive electrode 111a including the positive electrode active material layers 152 on both surfaces of a positive electrode current collector 151, the separator 153, a negative electrode 115a including the negative electrode active material layers 156 on both surfaces of a negative electrode current collector 155, the separator 153, and the positive electrode 111a including the positive electrode active material layers 152 on both surfaces of the positive electrode current collector 151 are stacked in this order. As illustrated in FIG. 16B, in each of the second electrode assemblies 131, the negative electrode 115a including the negative electrode active material layers 156 on both surfaces of the negative electrode current collector 155, the separator 153, the positive electrode 111a including the positive electrode active material layers 152 on both surfaces of the positive electrode current collector 151, the separator 153, and the negative electrode 115a including the negative electrode active material layers 156 on both surfaces of the negative electrode current collector 155 are stacked in this order.

As illustrated in FIG. 16C, the plurality of first electrode assemblies 130 and the plurality of second electrode assemblies 131 are covered with the wound separator 153.

<Coin-Type Storage Battery>

Figure 17A:
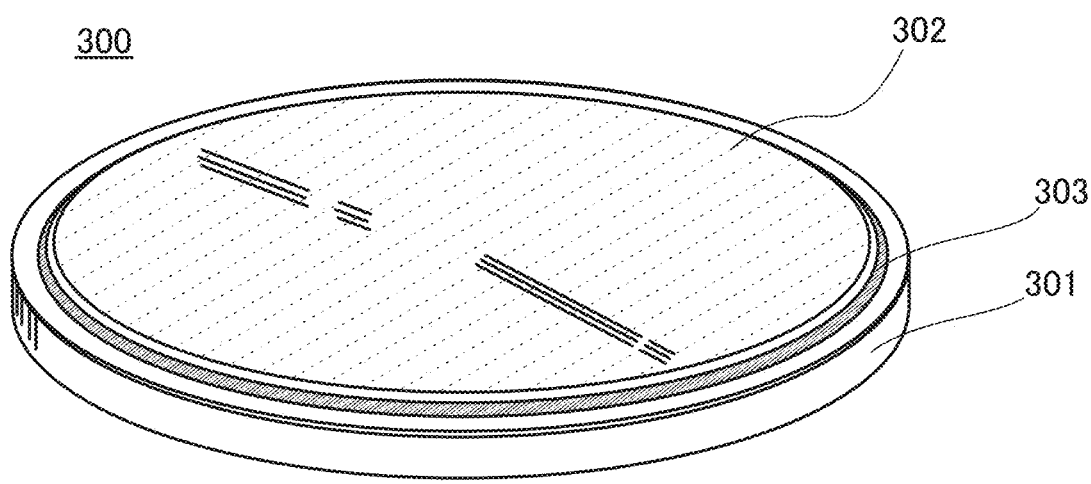
FIGS. 17A and 17B illustrate a coin-type storage battery.
Figure 17B:
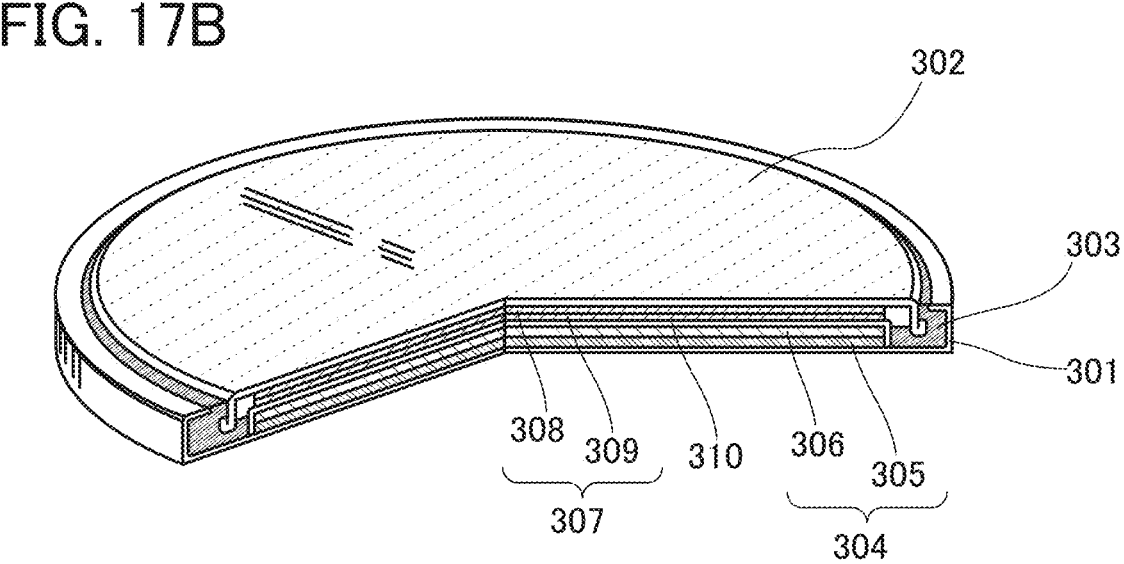

Next, an example of a coin-type storage battery will be described as an example of a power storage device with reference to FIGS. 17A and 17B. FIG. 17A is an external view of a coin-type (single-layer flat type) storage battery, and FIG. 17B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305.

A negative electrode 307 includes a negative electrode current collector 308 and a negative electrode active material layer 309 provided in contact with the negative electrode current collector 308.

The description of the positive electrode 503 can be referred to for the positive electrode 304. The description of the positive electrode active material layer 502 can be referred to for the positive electrode active material layer 306. The description of the negative electrode 506 can be referred to for the negative electrode 307. The description of the negative electrode active material layer 505 can be referred to for the negative electrode active material layer 309. The description of the separator 507 can be referred to for the separator 310. The description of the electrolytic solution 508 can be referred to for the electrolytic solution.

Note that only one surface of each of the positive electrode 304 and the negative electrode 307 used for the coin-type storage battery 300 is provided with an active material layer.

For the positive electrode can 301 and the negative electrode can 302, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the positive electrode can 301 and the negative electrode can 302 are preferably covered by nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 17B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

<Cylindrical Storage Battery>

Figure 18A:
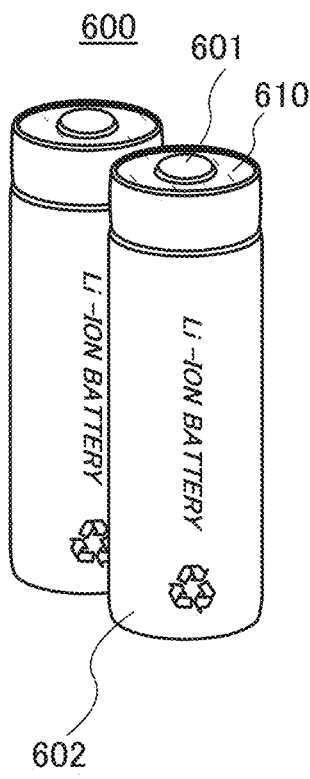
FIGS. 18A and 18B illustrate a cylindrical storage battery.

Next, an example of a cylindrical storage battery will be described as an example of a power storage device with reference to FIGS. 18A and 18B. As illustrated in FIG. 18A, a cylindrical storage battery 600 includes a positive electrode cap (battery cap) 601 on the top surface and a battery can (outer can) 602 on the side surface and bottom surface. The positive electrode cap 601 and the battery can 602 are insulated from each other by a gasket (insulating gasket) 610.

Figure 18B:
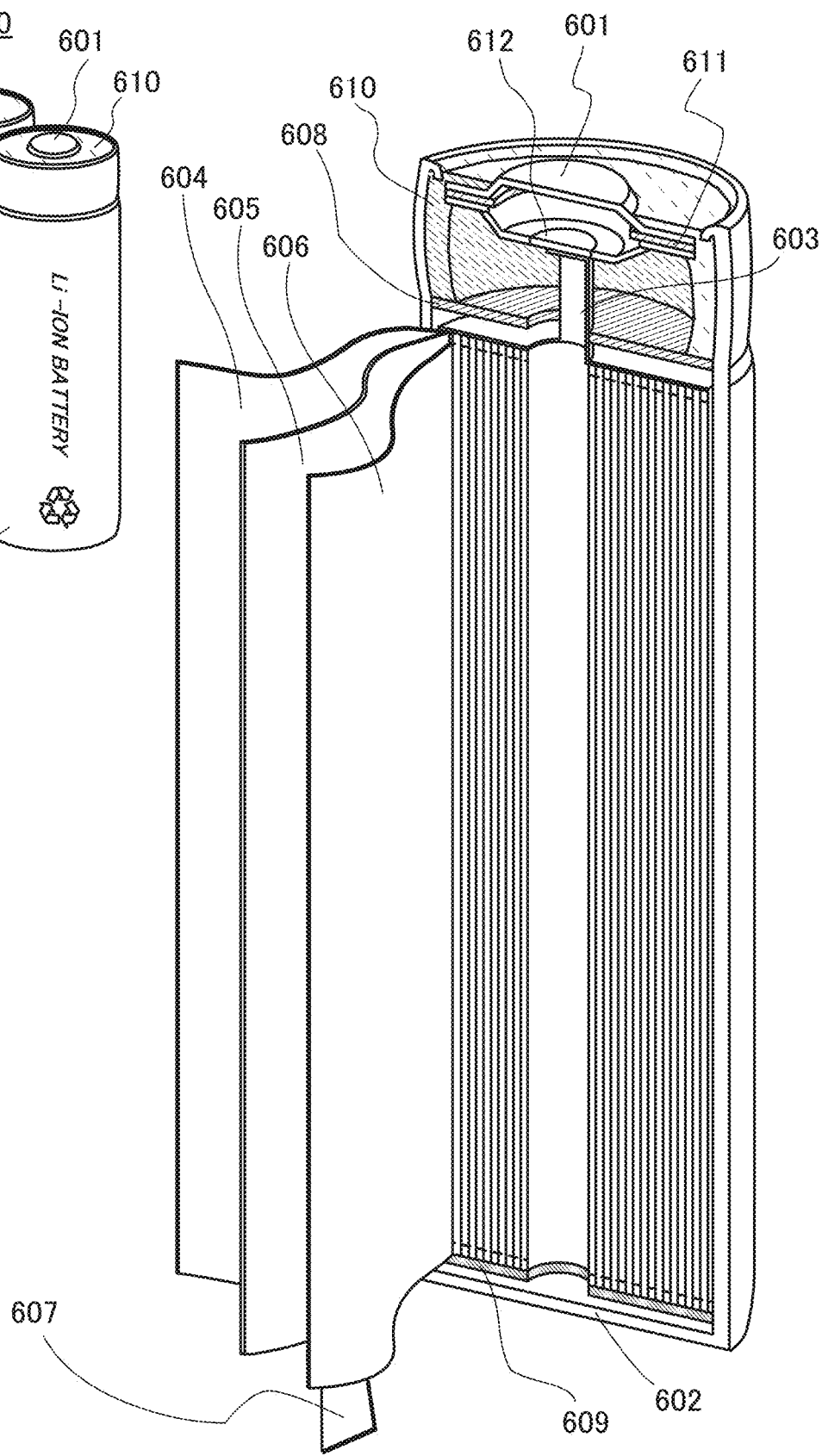

FIG. 18B is a diagram schematically illustrating a cross section of the cylindrical storage battery. Inside the battery can 602 having a hollow cylindrical shape, a storage battery element in which a strip-like positive electrode 604 and a strip-like negative electrode 606 are wound with a stripe-like separator 605 interposed therebetween is provided. Although not illustrated, the storage battery element is wound around a center pin. One end of the battery can 602 is close and the other end thereof is open. For the battery can 602, a metal having a corrosion-resistant property to an electrolytic solution, such as nickel, aluminum, or titanium, an alloy of such a metal, or an alloy of such a metal and another metal (e.g., stainless steel or the like) can be used.

Alternatively, the battery can 602 is preferably covered by nickel, aluminum, or the like in order to prevent corrosion due to the electrolytic solution. Inside the battery can 602, the battery element in which the positive electrode, the negative electrode, and the separator are wound is provided between a pair of insulating plates 608 and 609 which face each other. Furthermore, a nonaqueous electrolytic solution (not illustrated) is injected inside the battery can 602 provided with the storage battery element. As the nonaqueous electrolytic solution, a nonaqueous electrolytic solution that is similar to those of the coin-type storage battery can be used.

The description of the positive electrode 503 can be referred to for the positive electrode 604. The description of the negative electrode 506 can be referred to for the negative electrode 606. The description of the method for fabricating a negative electrode that is described in Embodiment 1 can be referred to for the negative electrode 606. Since the positive electrode and the negative electrode of the cylindrical storage battery are wound, active materials are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the storage battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element.

In the case where an electrode is wound as in the cylindrical storage battery illustrated in FIGS. 18A and 18B, a great stress is caused at the time of winding the electrode. In addition, an outward stress from an axis of winding is applied to the electrode all the time in the case where a wound body of the electrode is provided in a housing. However, the active material can be prevented from being cleaved even when such a great stress is applied to the electrode.

Note that in this embodiment, the coin-type storage battery, the cylindrical storage battery, and the thin storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed. For example, FIGS. 19A to 19C to FIGS. 23A and 23B illustrate examples of other storage batteries.

<Structural Example of Thin Storage Battery>

FIGS. 19A to 19C and FIGS. 20A to 20C illustrate structural examples of thin storage batteries. A wound body 993 illustrated in FIG. 19A includes a negative electrode 994, a positive electrode 995, and a separator 996.

The wound body 993 is obtained by winding a sheet of a stack in which the negative electrode 994 overlaps with the positive electrode 995 with the separator 996 therebetween. The wound body 993 is covered by a rectangular sealed container or the like; thus, a rectangular storage battery is fabricated.

Note that the number of stacks each including the negative electrode 994, the positive electrode 995, and the separator 996 is determined as appropriate depending on capacity and element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 19A:
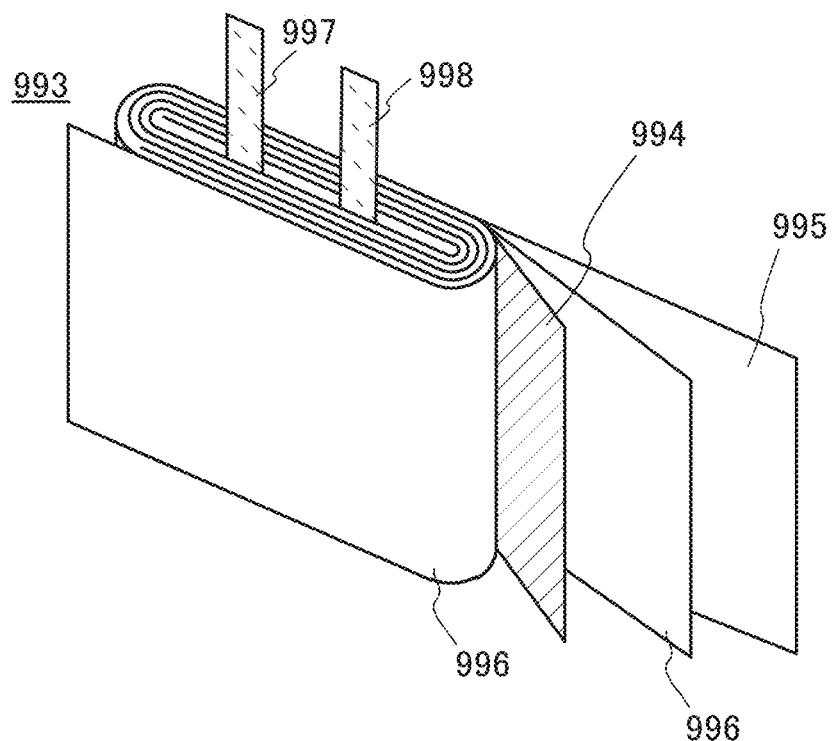
FIGS. 19A to 19C illustrate examples of power storage devices.
Figure 19B:
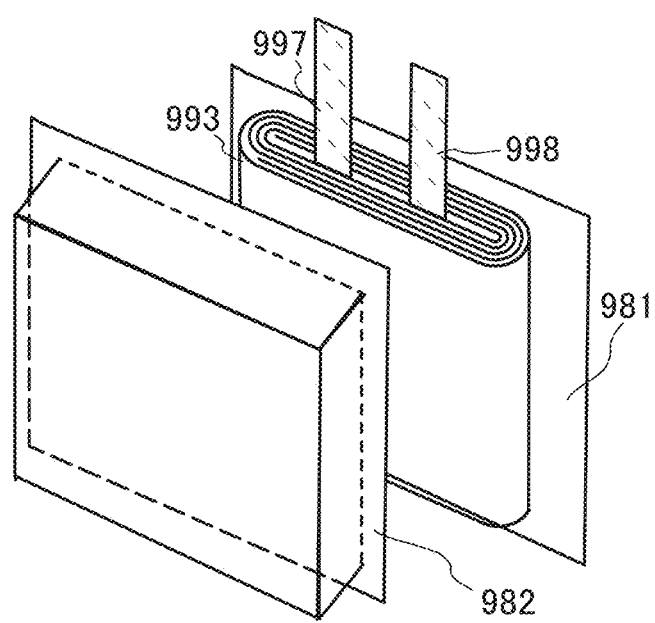
Figure 19C:
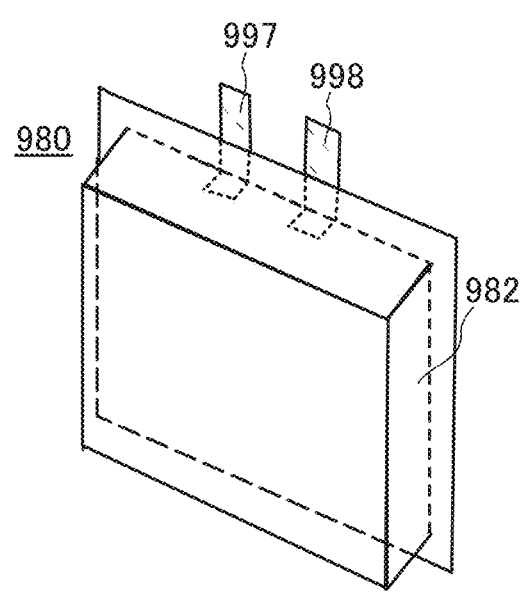

In a storage battery 990 illustrated in FIGS. 19B and 19C, the wound body 993 is packed in a space formed by bonding a film 981 and a film 982 having a depressed portion that serve as exterior bodies by thermocompression bonding or the like. The wound body 993 includes the lead electrode 997 and the lead electrode 998, and is soaked in an electrolytic solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film. 982 having a depressed portion can be changed in their forms when external force is applied; thus, a flexible storage battery can be fabricated.

Although FIGS. 19B and 19C illustrate an example where a space is formed by two films, the wound body 993 may be placed in a space formed by bending one film.

Furthermore, in fabricating a flexible power storage device, a resin material or the like can be used for an exterior body and a sealed container of the power storage device. In that case, a resin material or the like is used for the exterior body and the sealed container. Note that in the case where a resin material is used for the exterior body and the sealed container, a conductive material is used for a portion connected to the outside.

For example, FIGS. 20B and 20C illustrate another example of a flexible thin storage battery. The wound body 993 illustrated in FIG. 20A is the same as that illustrated in FIG. 19A, and the detailed description thereof is omitted.

In the storage battery 990 illustrated in FIGS. 20B and 20C, the wound body 993 is packed in an exterior body 991. The wound body 993 includes the lead electrode 997 and the lead electrode 998, and is soaked in an electrolytic solution inside a space surrounded by the exterior body 991 and an exterior body 992. For example, a metal material such as aluminum or a resin material can be used for the exterior bodies 991 and 992. With the use of a resin material for the exterior bodies 991 and 992, the exterior bodies 991 and 992 can be changed in their forms when external force is applied; thus, a flexible thin storage battery can be fabricated.

When the electrode including the active material of one embodiment of the present invention is used in the flexible thin storage battery, the active material can be prevented from being cleaved even if a stress caused by repeated bending of the thin storage battery is applied to the electrode.

When the active material in which at least part of the cleavage plane is covered with graphene is used for an electrode as described above, a decrease in the voltage and discharge capacity of a battery can be prevented. Accordingly, the cycle performance of the storage battery can be improved.

<Structural Example of Power Storage System>

Structural examples of power storage systems will be described with reference to FIGS. 21A and 21B to FIGS. 23A and 23B. Here, a power storage system refers to, for example, a device including a power storage device.

Figure 21A:
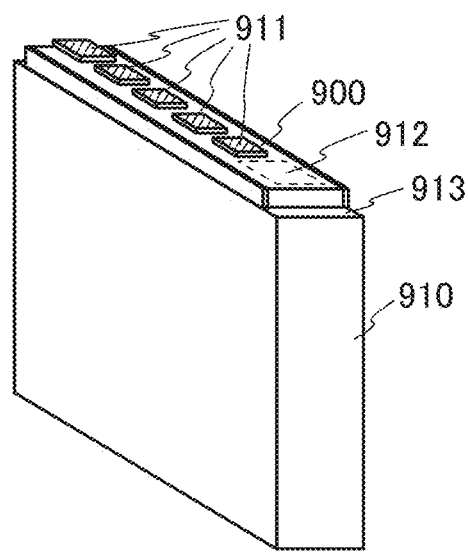
FIGS. 21A and 21B illustrate an example of a power storage device.
Figure 21B:
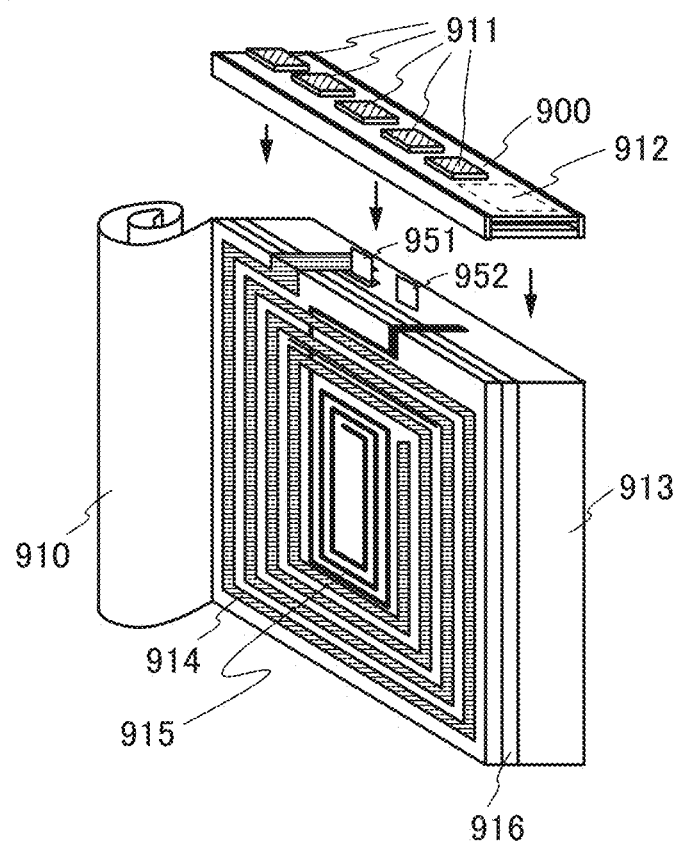

FIGS. 21A and 21B are external views of a power storage system. The power storage system includes a circuit board 900 and a storage battery 913. A label 910 is attached to the storage battery 913. As shown in FIG. 21B, the power storage system further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage system includes a layer 916 between the storage battery 913 and the antennas 914 and 915. The layer 916 may have a function of blocking an electromagnetic field by the storage battery 913. As the layer 916, for example, a magnetic body can be used.

Note that the structure of the power storage system is not limited to that shown in FIGS. 21A and 21B.

For example, as shown in FIGS. 22A1 and 22A2, two opposite surfaces of the storage battery 913 in FIGS. 21A and 21B may be provided with respective antennas. FIG. 22A1 is an external view showing one side of the opposite surfaces, and FIG. 22A2 is an external view showing the other side of the opposite surfaces. For portions similar to those in FIGS. 21A and 21B, the description of the power storage system illustrated in FIGS. 21A and 21B can be referred to as appropriate.

As illustrated in FIG. 22A1, the antenna 914 is provided on one of the opposite surfaces of the storage battery 913 with the layer 916 interposed therebetween, and as illustrated in FIG. 22A2, the antenna 915 is provided on the other of the opposite surfaces of the storage battery 913 with a layer 917 interposed therebetween. The layer 917 may have a function of preventing an adverse effect on an electromagnetic field by the storage battery 913. As the layer 917, for example, a magnetic body can be used.

With the above structure, both of the antennas 914 and 915 can be increased in size.

Alternatively, as illustrated in FIGS. 22B1 and 22B2, two opposite surfaces of the storage battery 913 in FIGS. 21A and 21B may be provided with different types of antennas. FIG. 22B1 is an external view showing one side of the opposite surfaces, and FIG. 22B2 is an external view showing the other side of the opposite surfaces. For portions similar to those in FIGS. 21A and 21B, the description of the power storage system illustrated in FIGS. 21A and 21B can be referred to as appropriate.

As illustrated in FIG. 22B1, the antenna 914 is provided on one of the opposite surfaces of the storage battery 913 with the layer 916 interposed therebetween, and as illustrated in FIG. 22B2, an antenna 918 is provided on the other of the opposite surfaces of the storage battery 913 with the layer 917 interposed therebetween. The antenna 918 has a function of communicating data with an external device, for example. An antenna with a shape that can be applied to the antennas 914 and 915, for example, can be used as the antenna 918. As a system for communication using the antenna 918 between the power storage system and another device, a response method that can be used between the power storage system and another device, such as NFC, can be employed.

Figure 23A:
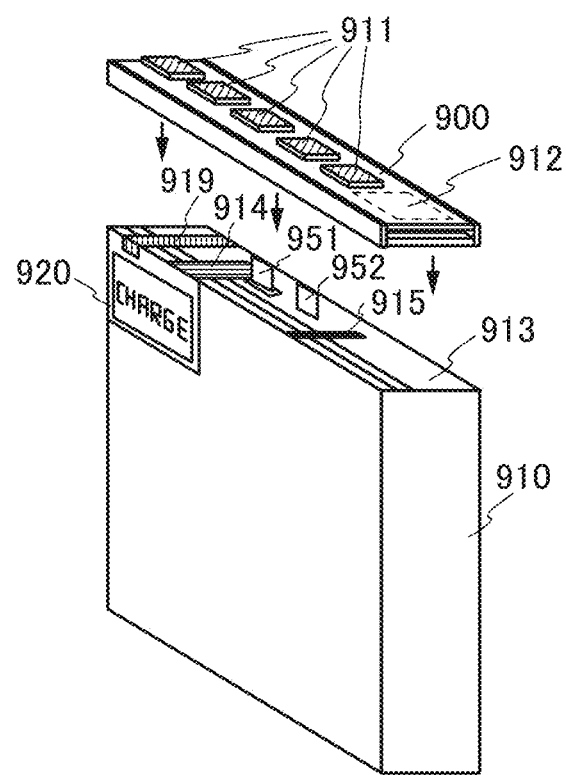
FIGS. 23A and 23B illustrate examples of power storage devices.

Alternatively, as illustrated in FIG. 23A, the storage battery 913 in FIGS. 21A and 21B may be provided with a display device 920. The display device 920 is electrically connected to the terminal 911 via a terminal 919. It is possible that the label 910 is not provided in a portion where the display device 920 is provided. For portions similar to those in FIGS. 21A and 21B, the description of the power storage system illustrated in FIGS. 21A and 21B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 23B:
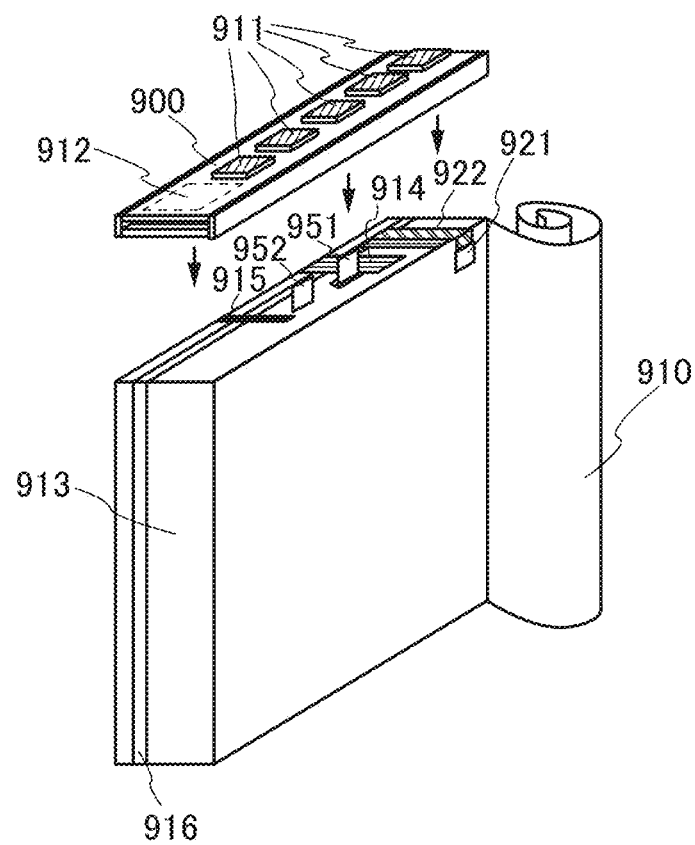

Alternatively, as illustrated in FIG. 23B, the storage battery 913 illustrated in FIGS. 21A and 21B may be provided with a sensor 921. The sensor 921 is electrically connected to the terminal 911 via a terminal 922. For portions similar to those in FIGS. 21A and 21B, the description of the power storage system illustrated in FIGS. 21A and 21B can be referred to as appropriate.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on an environment (e.g., temperature) where the power storage system is placed can be determined and stored in a memory inside the circuit 912.

The electrode of one embodiment of the present invention is used in the storage battery and the power storage system that are described in this embodiment. The capacity of the storage battery and the power storage system can thus be high. Furthermore, energy density can be high. Moreover, reliability can be high, and life can be long.

This embodiment can be implemented in appropriate combination with any of the other embodiments.

Embodiment 3

In this embodiment, an example of an electronic device including a flexible storage battery will be described.

FIGS. 24A to 24G illustrate examples of electronic devices including the flexible storage batteries described in Embodiment 2. Examples of electronic devices each including a flexible storage battery include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, a flexible storage battery can be incorporated along a curved inside/outside wall surface of a house or a building or a curved interior/exterior surface of a car.

Figure 24A:
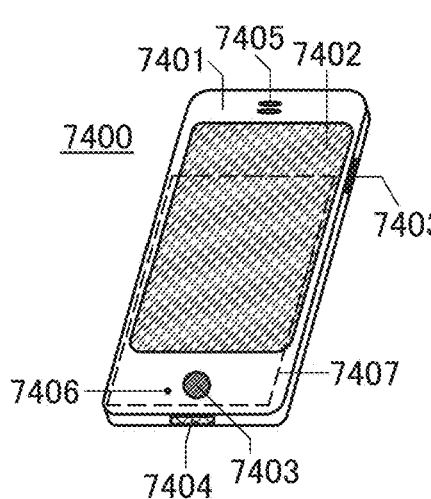
FIGS. 24A to 24G illustrate examples of electronic devices.

FIG. 24A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 24B:
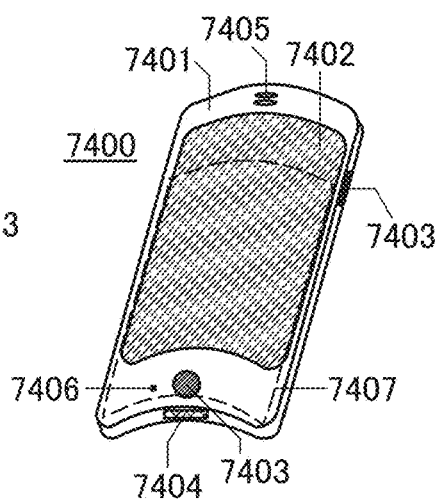
Figure 24C:
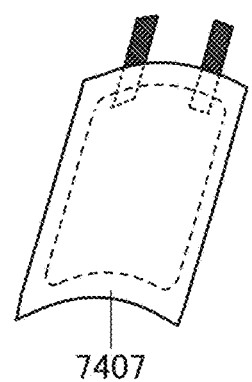

FIG. 24B illustrates the mobile phone 7400 that is bent. When the whole mobile phone 7400 is bent by the external force, the power storage device 7407 included in the mobile phone 7400 is also bent. FIG. 24C illustrates the bent power storage device 7407. The power storage device 7407 is a thin storage battery. The power storage device 7407 is fixed in a state of being bent. Note that the power storage device 7407 includes a lead electrode 7408 electrically connected to a current collector 7409.

Figure 24D:
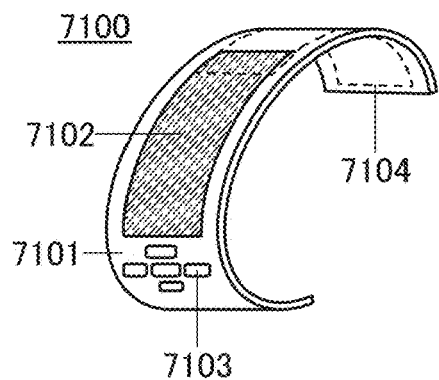
Figure 24E:

FIG. 24D illustrates an example of a bangle display device. A portable display device 7100 includes a housing 7101, a display portion 7102, an operation button 7103, and a power storage device 7104. FIG. 24E illustrates the bent power storage device 7104. When the display device is worn on a user's arm while the power storage device 7104 is bent, the housing changes its form and the curvature of a part or the whole of the power storage device 7104 is changed. Note that the radius of curvature of a curve at a point refers to the radius of the circular arc that best approximates the curve at that point. The reciprocal of the radius of curvature is curvature. Specifically, a part or the whole of the housing or the main surface of the power storage device 7104 is changed in the range of radius of curvature from 40 mm to 150 mm inclusive. When the radius of curvature at the main surface of the power storage device 7104 is greater than or equal to 40 mm and less than or equal to 150 mm, the reliability can be kept high.

Figure 24F:
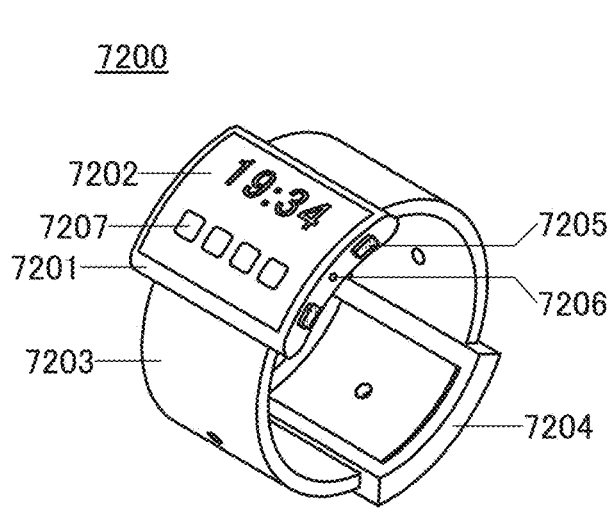

FIG. 24F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operation system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 is provided with a power storage device including the electrode of one embodiment of the present invention. For example, the power storage device 7104 illustrated in FIG. 24E that is in the state of being curved can be provided in the housing 7201. Alternatively, the power storage device 7104 illustrated in FIG. 24E can be provided in the band 7203 such that it can be curved.

A portable information terminal 7200 preferably includes a sensor. As the sensor, for example a human body sensor such as a fingerprint sensor, a pulse sensor, or a temperature sensor, a touch sensor, a pressure sensitive sensor, an acceleration sensor, or the like is preferably mounted.

Figure 24G:
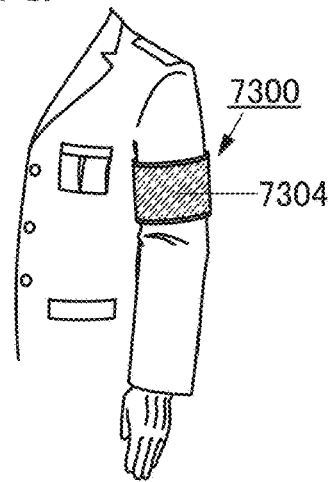

FIG. 24G illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication, which is a communication method based on an existing communication standard.

The display device 7300 includes an input output terminal, and data can be directly transmitted to and received from another information terminal via a connector. In addition, charging via the input output terminal is possible. Note that the charging operation may be performed by wireless power feeding without using the input output terminal.

This embodiment can be implemented in appropriate combination with any of the other embodiments.

Embodiment 4

In this embodiment, examples of electronic devices that can include power storage devices will be described.

Figure 25A:
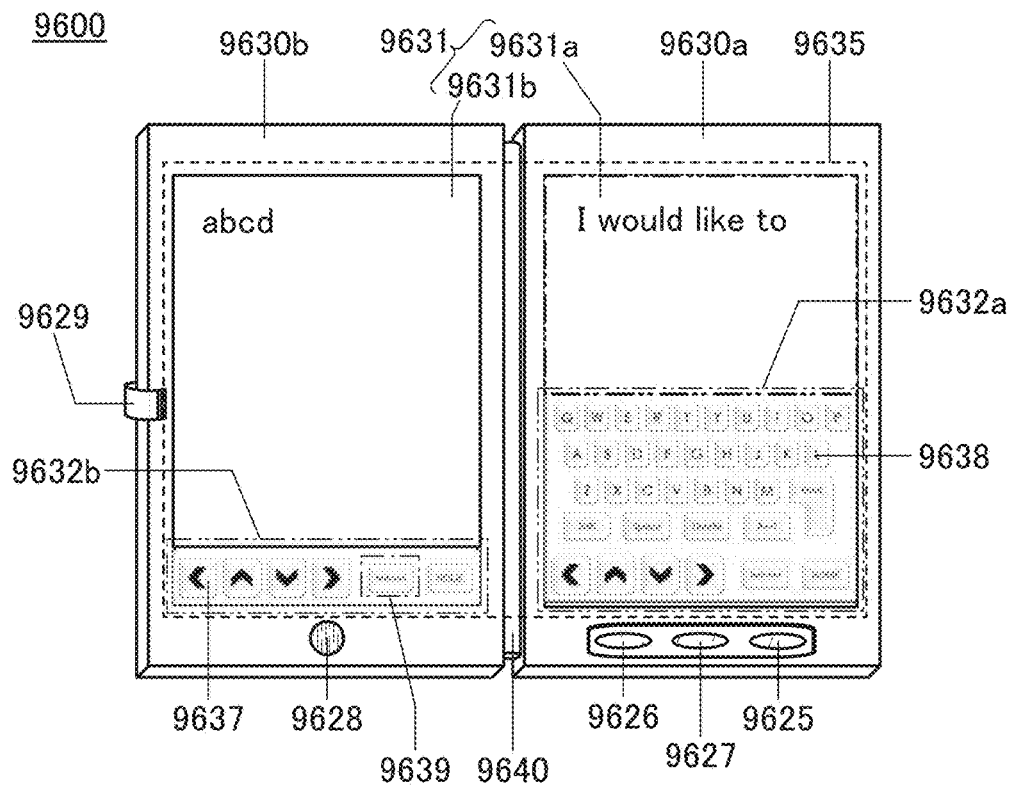
FIGS. 25A to 25C illustrate an example of an electronic device.
Figure 25B:
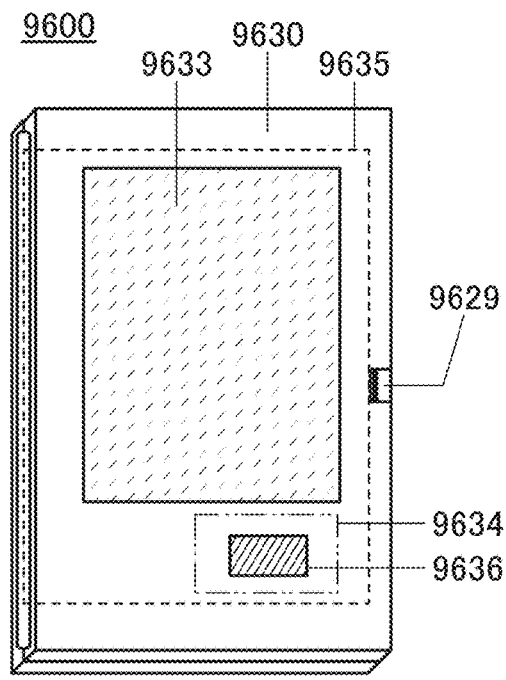

FIGS. 25A and 25B illustrate an example of a tablet terminal that can be folded in half A tablet terminal 9600 illustrated in FIGS. 25A and 25B includes a housing 9630*a*, a housing 9630*b*, a movable portion 9640 connecting the housings 9630*a* and 9630*b*, a display portion 9631 including a display portion 9631*a* and a display portion 9631*b*, a display mode changing switch 9626, a power switch 9627, a power saving mode changing switch 9625, a fastener 9629, and an operation switch 9628. FIG. 25A illustrates the tablet terminal 9600 that is opened, and FIG. 25B illustrates the tablet terminal 9600 that is closed.

The tablet terminal 9600 includes a power storage unit 9635 inside the housings 9630*a* and 9630*b*. The power storage unit 9635 is provided across the housings 9630*a* and 9630*b*, passing through the movable portion 9640.

Part of the display portion 9631*a* can be a touch panel region 9632*a*, and data can be input by touching operation keys 9638 that are displayed. Note that FIG. 25A shows, as an example, that half of the area of the display portion 9631*a* has only a display function and the other half of the area has a touch panel function. However, the structure of the display portion 9631*a* is not limited to this, and all the area of the display portion 9631*a* may have a touch panel function. For example, all the area of the display portion 9631*a* can display a keyboard and serve as a touch panel while the display portion 9631*b* can be used as a display screen.

As in the display portion 9631*a*, part of the display portion 9631*b* can be a touch panel region 9632*b*. When a keyboard display switching button 9639 displayed on the touch panel is touched with a finger, a stylus, or the like, a keyboard can be displayed on the display portion 9631*b*.

Touch input can be performed in the touch panel region 9632*a* and the touch panel region 9632*b* at the same time.

The display mode changing switch 9626 allows switching between a landscape mode and a portrait mode, color display and black-and-white display, and the like. The power saving mode changing switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Although the display portion 9631*a* and the display portion 9631*b* have the same area in FIG. 25A, one embodiment of the present invention is not limited to this example. The display portion 9631*a* and the display portion 9631*b* may have different areas or different display quality. For example, one of the display portions 9631*a* and 9631*b* may display higher definition images than the other.

The tablet terminal is closed in FIG. 25B. The tablet terminal includes the housing 9630, a solar cell 9633, and a charge and discharge control circuit 9634 including a DCDC converter 9636. The power storage unit of one embodiment of the present invention is used as the power storage unit 9635.

The tablet terminal 9600 can be folded such that the housings 9630*a* and 9630*b* overlap with each other when not in use. Thus, the display portions 9631*a* and 9631*b* can be protected, which increases the durability of the tablet terminal 9600. In addition, the power storage unit 9635 of one embodiment of the present invention has flexibility and can be repeatedly bent without a significant decrease in charge and discharge capacity. Thus, a highly reliable tablet terminal can be provided.

The tablet terminal illustrated in FIGS. 25A and 25B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processing portion, and the like. Note that the solar cell 9633 can be provided on one or both surfaces of the housing 9630 and the power storage unit 9635 can be charged efficiently. The use of a lithium-ion storage battery as the power storage unit 9635 brings an advantage such as reduction in size.

Figure 25C:
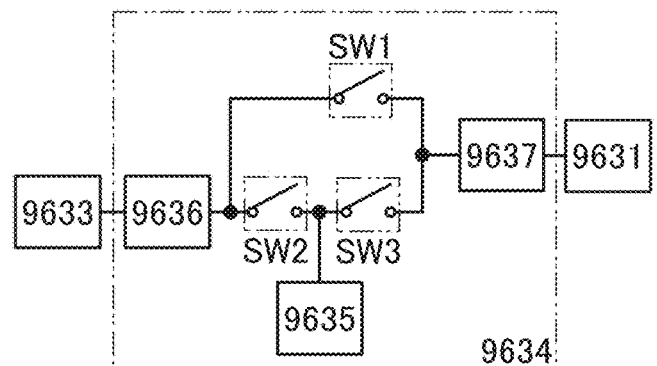

The structure and operation of the charge and discharge control circuit 9634 illustrated in FIG. 25B will be described with reference to a block diagram in FIG. 25C. The solar cell 9633, the power storage unit 9635, the DCDC converter 9636, a converter 9637, switches SW1 to SW3, and the display portion 9631 are illustrated in FIG. 25C, and the power storage unit 9635, the DCDC converter 9636, the converter 9637, and the switches SW1 to SW3 correspond to the charge and discharge control circuit 9634 in FIG. 25B.

First, an example of operation when electric power is generated by the solar cell 9633 using external light will be described. The voltage of electric power generated by the solar cell is raised or lowered by the DCDC converter 9636 to a voltage for charging the power storage unit 9635. When the display portion 9631 is operated with the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module capable of performing charging by transmitting and receiving electric power wirelessly (without contact), or any of the other charge means used in combination.

Figure 26:
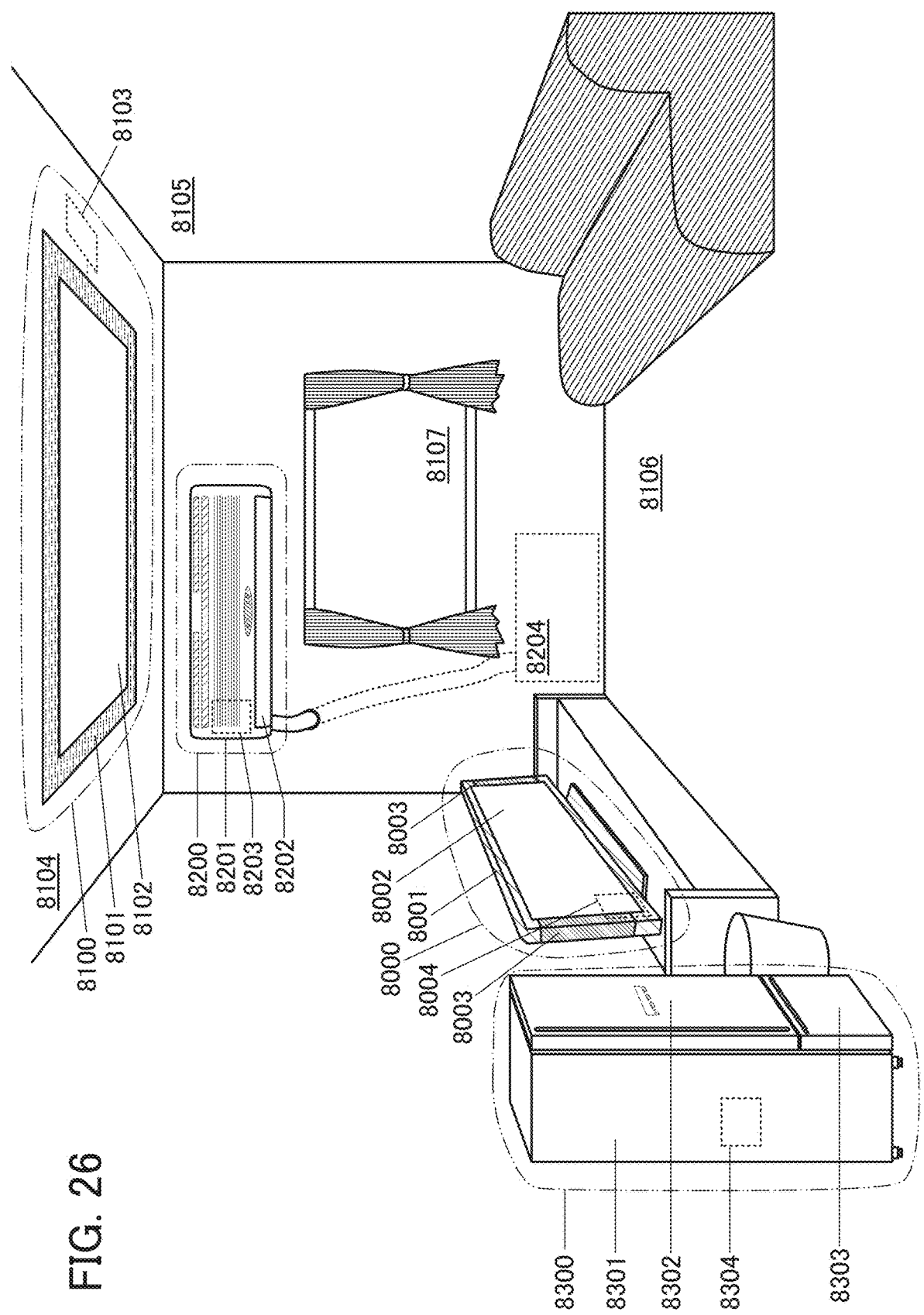
FIG. 26 illustrates examples of electronic devices.

FIG. 26 illustrates other examples of electronic devices. In FIG. 26, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, and the power storage device 8004. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can be operated with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 26, an installation lighting device 8100 is an example of an electronic device including a power storage device 8103 of one embodiment of the present invention. Specifically, the lighting device 8100 includes a housing 8101, a light source 8102, and the power storage device 8103. Although FIG. 26 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can be operated with the use of power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 26 as an example, the power storage device of one embodiment of the present invention can be used in an installation lighting device provided in, for example, a wall 8105, a floor 8106, a window 8107, or the like other than the ceiling 8104. Alternatively, the power storage device of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 26, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, and the power storage device 8203. Although FIG. 26 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the power storage devices 8203 are provided in both the indoor unit 8200 and the outdoor unit 8204, the air conditioner can be operated with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 26 as an example, the power storage device of one embodiment of the present invention can be used in an air conditioner in which the functions of an indoor unit and an outdoor unit are integrated in one housing.

In FIG. 26, an electric refrigerator-freezer 8300 is an example of an electronic device including a power storage device 8304 of one embodiment of the present invention. Specifically, the electric refrigerator-freezer 8300 includes a housing 8301, a door for a refrigerator 8302, a door for a freezer 8303, and the power storage device 8304. The power storage device 8304 is provided in the housing 8301 in FIG. 26. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can be operated with the use of the power storage device 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the power storage device of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electronic devices are used. For example, in the case of the electric refrigerator-freezer 8300, electric power can be stored in the power storage device 8304 in night time when the temperature is low and the door for a refrigerator 8302 and the door for a freezer 8303 are not often opened or closed. On the other hand, in daytime when the temperature is high and the door for a refrigerator 8302 and the door for a freezer 8303 are frequently opened and closed, the power storage device 8304 is used as an auxiliary power supply; thus, the usage rate of electric power in daytime can be reduced.

This embodiment can be implemented in combination with any of the other embodiments as appropriate.

Embodiment 5

In this embodiment, examples of vehicles using power storage devices will be described.

The use of power storage devices in vehicles enables production of next-generation clean energy vehicles such as hybrid electric vehicles (HEVs), electric vehicles (EVs), and plug-in hybrid electric vehicles (PHEVs).

Figure 27A:
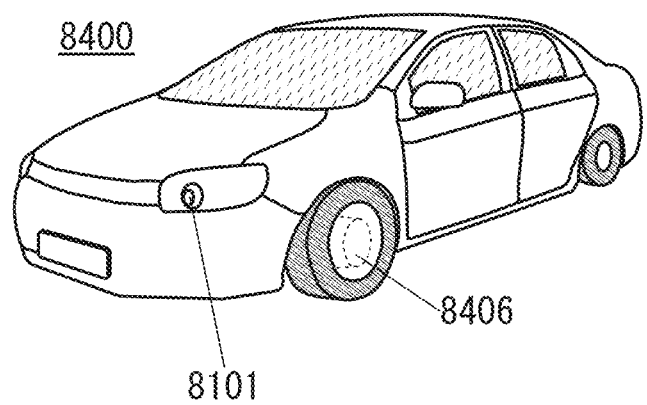
FIGS. 27A and 27B illustrate examples of electronic devices.
Figure 27B:
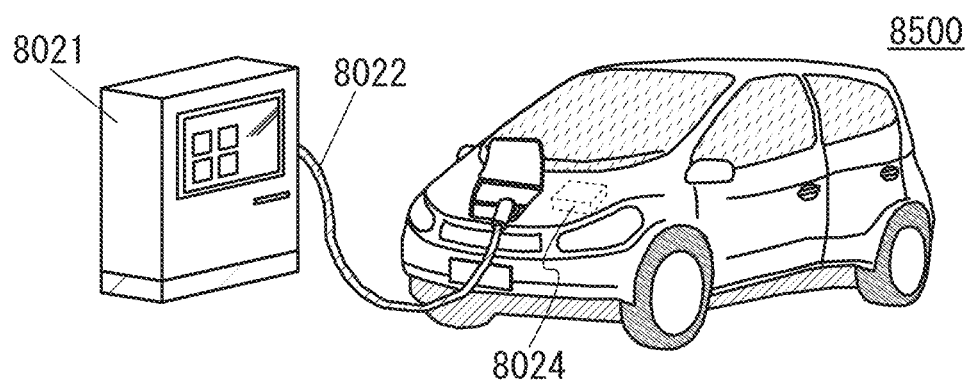

FIGS. 27A and 27B each illustrate an example of a vehicle using one embodiment of the present invention. An automobile 8400 illustrated in FIG. 27A is an electric vehicle that runs on the power of an electric motor. Alternatively, the automobile 8400 is a hybrid electric vehicle capable of driving appropriately using either an electric motor or an engine. One embodiment of the present invention can provide a high-mileage vehicle. The automobile 8400 includes the power storage device. The power storage device is used not only for driving the electric motor 8406, but also for supplying electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

FIG. 27B illustrates an automobile 8500 including the power storage device. The automobile 8500 can be charged when the power storage device is supplied with electric power through external charging equipment by a plug-in system, a contactless power feeding system, or the like. In FIG. 27B, a power storage device 8024 included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The ground-based charging apparatus 8021 may be a charging station provided in a commerce facility or a power source in a house. For example, with the use of a plug-in technique, the power storage device 8024 included in the automobile 8500 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device included in the vehicle can be used as a power source for supplying electric power to products other than the vehicle. In such a case, the use of a commercial power source can be avoided at peak time of electric power demand.

This embodiment can be implemented in appropriate combination with any of the other embodiments.

EXAMPLE

In this example, the negative electrode of one embodiment of the present invention will be described with reference to the flow chart of FIG. 3.

Slurry used to be applied to form the electrode was formed according to Steps S101 to S105 in FIG. 3.

In Step S101 in FIG. 3, a p-type silicon wafer with a plane orientation (100) was ground to form silicon particles used as the negative electrode active materials 121. Conditions for grinding in ball mill treatment are as follows: putting 4 g of silicon powder, balls with a diameter of 3 mm, and acetone in a container; 400 rpm; and 5 hours. Furthermore, a sieve with a hole diameter of 75 μm was used.

In Step S102 in FIG. 3, the surfaces of the silicon particles were oxidized to form silicon oxide films. Heat treatment was performed at 900° C. in an air atmosphere for 1.5 hours.

Figure 28:
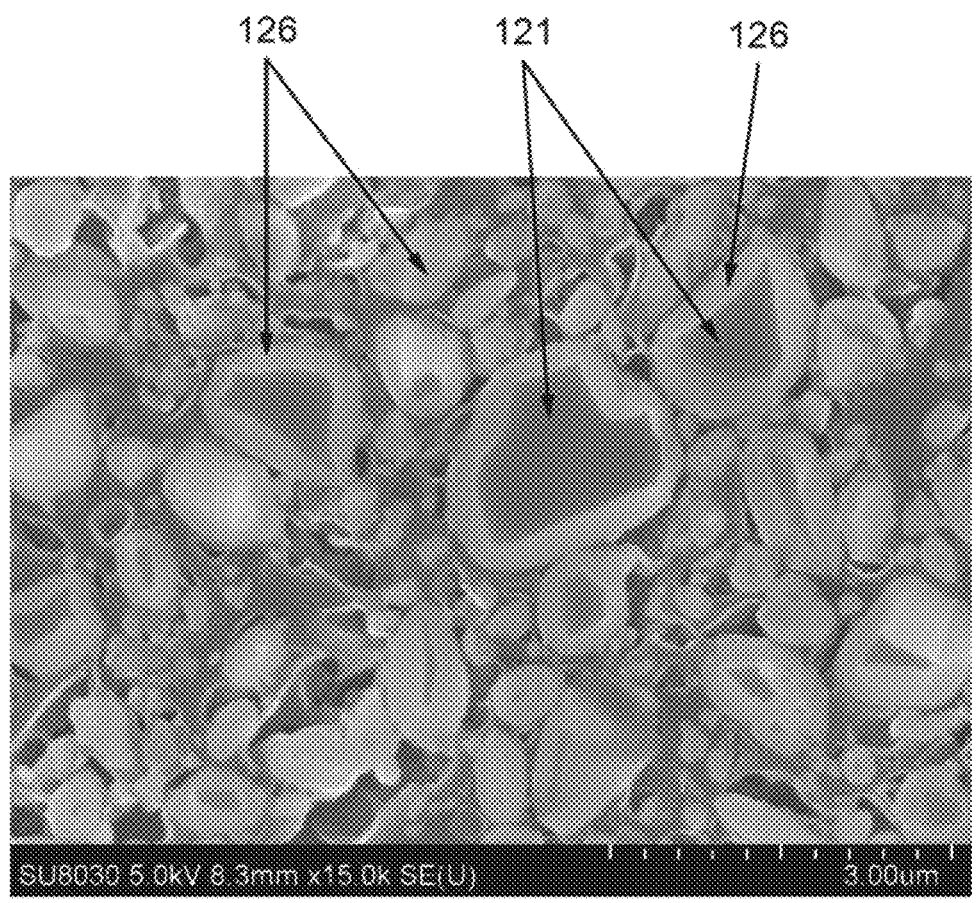
FIG. 28 is a cross-sectional SEM image of a negative electrode active material layer.

FIG. 28 is a cross-sectional SEM image of the silicon particles formed in Step S102 in the above-described manner. The cross-sectional SEM image of FIG. 28 shows that the silicon oxide films 126 are formed on the surfaces of the silicon particles. The silicon particles with a small diameter were subjected to heat treatment to be entirely the silicon oxide films 126.

In Step S103 in FIG. 3, graphene compounds and a binder were added to the silicon particles formed in Step S102. Here, graphene oxide flakes were used as the graphene compounds. The silicon particles, graphene oxide flakes, a precursor of polyimide were mixed at a weight ratio of 60:20:20 (weight %). Specifically, 1.0 g of silicon particles, 0.33 g of graphene oxide flakes, 2.4 g of a precursor of polyimide were mixed. Note that 13.7% of the precursor of polyimide was imidized through a heating step to be polyimide. That is, the weight of the precursor imidized to be polyimide was 0.33 g (2.4 g×0.137).

The mixing was performed as follows. A mixed solution containing graphene oxide flakes, a precursor of polyimide, and 6.0 ml of NMP (dispersion medium) was formed. A proper amount of the mixed solution (here, 0.6 ml) was mixed with the silicon particles, and kneading and volatilizing the dispersion medium were performed. The mixing, kneading, and volatilizing of the dispersion medium were repeated a plurality of times until the mixed solution did not remain. Note that the kneading was performed for 40 minutes, and the dispersion medium was volatilized at 110° C. for 10 hours.

In Step S104, the silicon oxide films formed on the surfaces of the silicon particles were removed by etching treatment. The etching treatment was performed using a mixed solution containing 7.13% ammonium hydrogen fluoride ($NH_4HF_2$) and 15.4% ammonium fluoride ($NH_4F$) (product name: LAL500, produced by Stella Chemifa Corporation). The mixed solution was dripped to the silicon particles, they were left for 5 minutes, and washing with pure water was performed more than once. Note that vacuum drying in Step S104 was performed at 110° C. for 10 hours. Heat treatment was performed in a vacuum furnace at 400° C. for 1 hour. By the heat treatment, the graphene oxide flakes added in Step S103 was thermally reduced to be graphene flakes and the precursor of polyimide was imidized to be polyimide.

Figure 29:
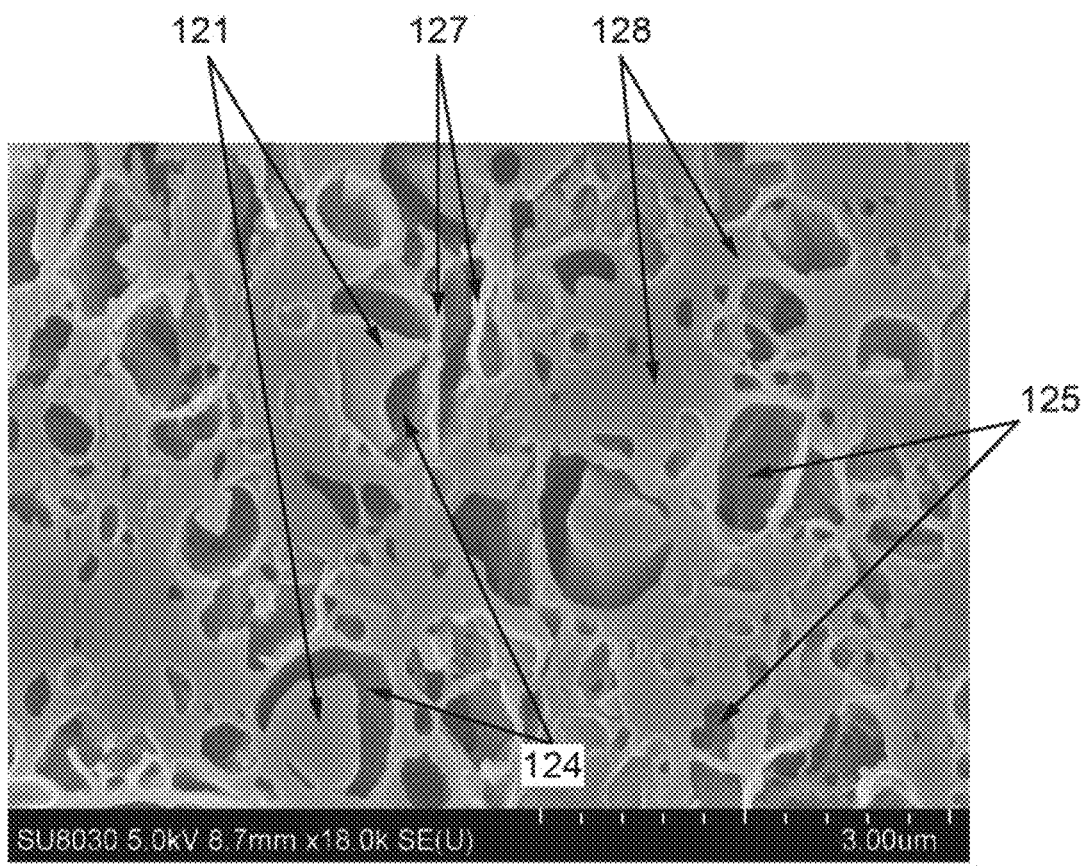
FIG. 29 is a cross-sectional SEM image of a negative electrode active material layer.

FIG. 29 is a cross-sectional SEM image of the mixture formed in Step S104 in the above-described manner. The cross-sectional SEM image of FIG. 29 shows that the silicon particles, which serve as the negative electrode active materials 121, the spaces 124 provided on the periphery of the silicon particles are surrounded by the mixture of graphene flakes 127 and polyimide 128 and the space 125 is surrounded by the graphene flakes 127 and the polyimide 128 in a region without the silicon particles. Here, the graphene flake 127 has a thickness of approximately 100 nm and thus is presumed to be a plurality of reduced graphene oxide layers.

In Step S105, a precursor of polyimide and the mixture formed in Step S104 were mixed to form slurry. The mixture and the precursor of polyimide were mixed at a ratio of 85:15 (weight %). Specifically, 0.256 g of the mixture, 0.3504 g of the precursor of polyimide were mixed, 1.21 g of NMP (dispersion medium) was added to the resulting mixture, and kneading was performed for 40 minutes.

According to Steps S106 to S108 in FIG. 3, the slurry was applied to a negative electrode current collector, the dispersion medium was volatilized, and heat treatment was performed, so that a negative electrode was formed.

In Step S106, the slurry was applied to the negative electrode current collector and the dispersion medium was volatilized. As the negative electrode current collector, copper with a thickness of 18 μm was used. As the applying method, a blade method was employed. Note that the blade having a gap of 100 μm with respect to a surface of the current collector was used. Note that the volatilization of the dispersion medium was performed with a circulation dryer at 80° C. for 2 hours.

In Step S107, heat treatment was performed in a vacuum furnace at 400° C. for 1 hour.

Figure 30:
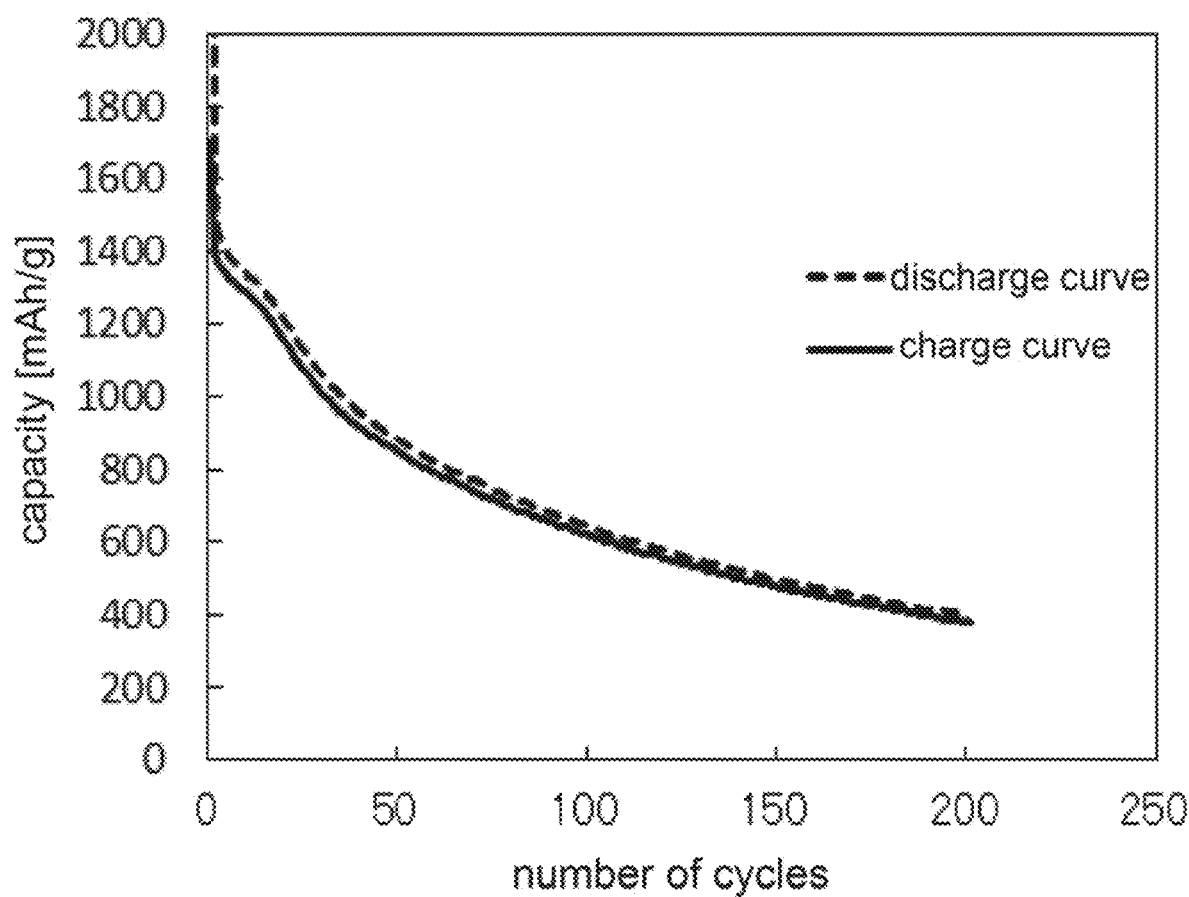
FIG. 30 is a graph showing the relation between charge and discharge cycles and discharge capacity of a power storage battery.

FIG. 30 shows the cycle performance of a lithium-ion storage battery using the negative electrode formed in the above manner. A half cell was formed and the cycle performance thereof was measured. For the measurement of the cycle performance of the half cell, metal lithium was used as a positive electrode. A coin-type half cell CR2032 (diameter: 20 mm, height: 3.2 mm) was formed as the half cell. The charge and discharge rate is 1 C.

An electrolytic solution was formed by dissolving lithium hexafluorophosphate (LiPF$_6$) at a concentration of 1 mol/L in a mixed solution in which ethylene carbonate (EC) and diethyl carbonate (DEC) were mixed at a volume ratio of 3:7. As a separator, polypropylene was used.

In FIG. 30, the vertical axis represents capacity (mAh/g) and the horizontal axis represents the number of cycles. In this measurement, charge and discharge were performed 200 cycles. The solid curve is a charge curve, and the dotted curve is a discharge curve.

Reference Example 1

In a negative electrode active material layer in a negative electrode of this reference example, silicon particles formed by grinding a silicon wafer were used as negative electrode active materials, but spaces provided on the periphery of the silicon particles in one embodiment of the present invention were not provided.

The negative electrode active materials in the negative electrode of the reference example were formed through the steps except Steps S102 and S104 in FIG. 3 described in the above example. Specifically, the negative electrode active materials were formed through the steps except Step S102, in which heat treatment is performed on silicon particles so that silicon oxide films are formed on the surfaces of the silicon particles, and Step S104, in which the silicon oxide films are removed.

Figure 31:
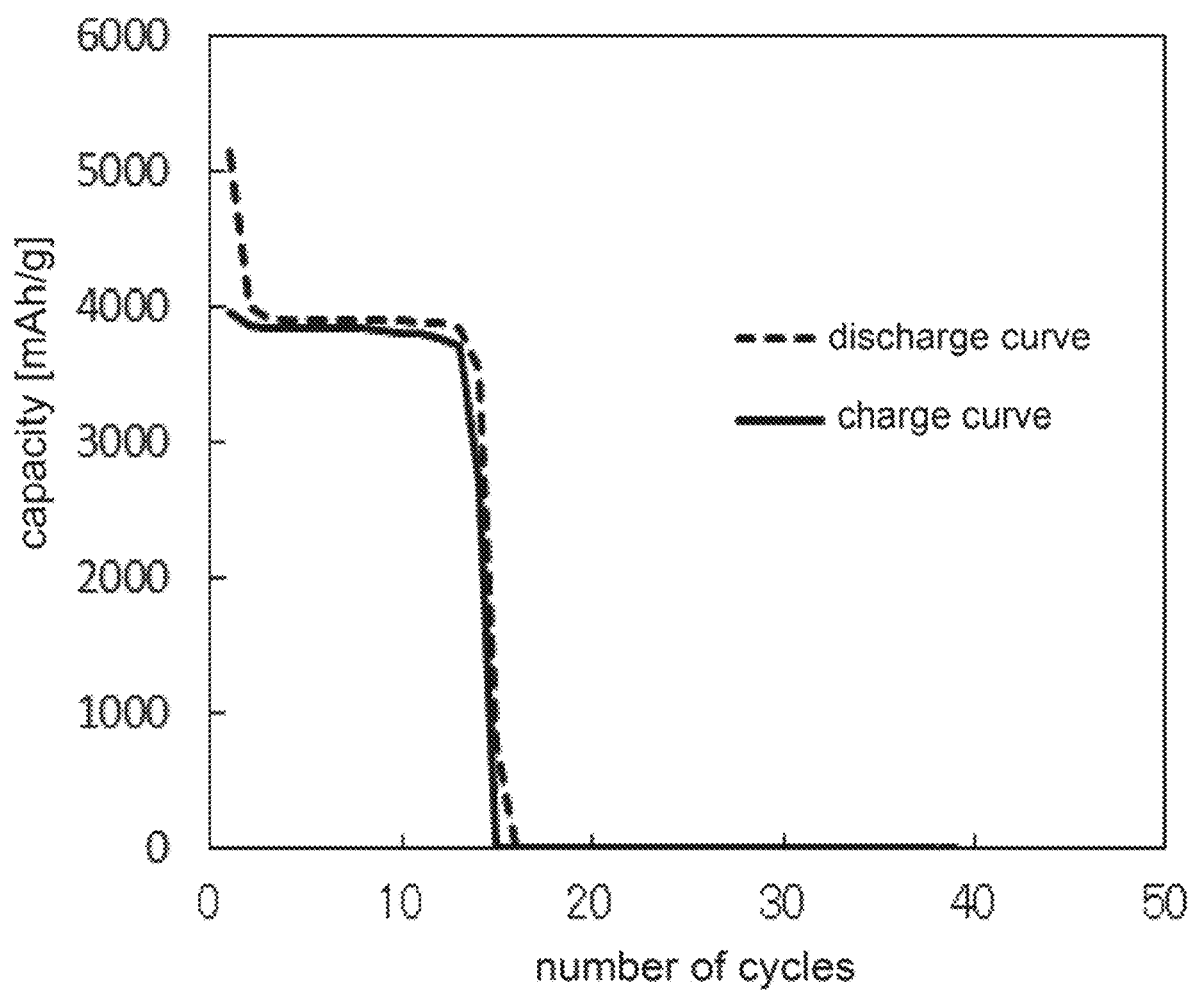
FIG. 31 is a graph showing the relation between charge and discharge cycles and discharge capacity of a power storage battery.

FIG. 31 shows the cycle performance of the lithium-ion storage battery using the negative electrode formed in the above manner. A half cell was formed and the cycle performance thereof was measured. For the measurement of the cycle performance of the half cell, metal lithium was used as a positive electrode. A coin-type half cell CR2032 (diameter: 20 mm, height: 3.2 mm) was formed as the half cell. The charge and discharge rate is 1 C.

An electrolytic solution was formed by dissolving lithium hexafluorophosphate (LiPF$_6$) at a concentration of 1 mol/L in a mixed solution in which ethylene carbonate (EC) and diethyl carbonate (DEC) were mixed at a volume ratio of 3:7. As a separator, polypropylene was used.

In FIG. 31, the vertical axis represents capacity (mAh/g) and the horizontal axis represents the number of cycles. In this measurement, charge and discharge were performed 39 cycles. The solid curve is a charge curve, and the dotted curve is a discharge curve.

Concerning the cycle performance of the negative electrode of the reference example, when the cycle number exceeds 10, the capacity rapidly decreases, and before the cycle number reaches 20, the capacity is not able to hold, as shown in FIG. 31. The reason for the rapid decrease in capacity in this reference example is as follows: stress due to an increase and a decrease in the volume of the silicon particles accompanying charge and discharge cycles reduces a region in which the negative electrode current collector and the silicon particle are in contact with each other and a region in which the active materials are in contact with each other, so that a conductive path in the negative electrode is lost, resulting in deterioration of the battery characteristics.

In contrast, concerning the cycle performance of the negative electrode formed according to one embodiment of the present invention, the capacity gently decreases as the cycle number increases, but the capacity holds even when the cycle number reaches 200, as shown in FIG. 30. This is because the spaces on the periphery of the silicon particles or the spaces distributed in the negative electrode active material layer relieved stress due to repeated increases and decreases in the volume of the silicon particles. This maintained a conductive path in the negative electrode, preventing a decrease in capacity accompanying charge and discharge cycles.

This application is based on Japanese Patent Application serial no, 2015-142050 filed with Japan Patent Office on Jul. 16, 2015, the entire contents of which are hereby incorporated by reference.

What is claimed is:

1. A method for manufacturing a negative electrode, the method comprising the steps of:
    forming a plurality of silicon particles;
    performing a heat treatment on the plurality of silicon particles in an atmosphere containing air to form a silicon oxide film on a surface of each of the plurality of silicon particles;
    mixing a graphene compound, a binder, and the plurality of silicon particles after the heat treatment;
    performing an etching treatment on the plurality of silicon particles after the heat treatment; and
    forming a slurry after the etching treatment,
    wherein part of the silicon oxide film on the surface of each of the plurality of silicon particles is removed by the etching treatment,
    wherein the part of the silicon oxide film which is removed by the etching treatment forms a space, and
    wherein the heat treatment is performed at a temperature higher than or equal to 700° C. and lower than or equal to 1000° C.

2. The method for manufacturing a negative electrode according to claim 1, wherein the space is present between a first silicon particle of the plurality of silicon particles and a second silicon particle of the plurality of silicon particles.

3. The method for manufacturing a negative electrode according to claim 2,
    wherein the graphene compound is in contact with a first surface of the first silicon particle of the plurality of silicon particles,
    wherein the graphene compound is in contact with a first surface of the second silicon particle of the plurality of silicon particles, and wherein the graphene compound is in contact with a second surface of the second silicon particle of the plurality of silicon particles.

4. The method for manufacturing a negative electrode according to claim 1, wherein the graphene compound is in contact with the plurality of silicon particles.

5. The method for manufacturing a negative electrode according to claim 1,
wherein the graphene compound includes 2 or more and 100 or less reduced graphene oxide layers,
wherein a distance between a first reduced graphene oxide layer and a second reduced graphene oxide layer is greater than or equal to 0.335 nm and less than or equal to 0.7 nm, and
wherein an average diameter of the plurality of silicon particles is greater than or equal to 0.5 μm and less than or equal to 1.5 μm.

6. A method for manufacturing a negative electrode, the method comprising the steps of:
forming a plurality of active material particles;
performing a heat treatment on the plurality of active material particles in an atmosphere containing air to form an oxide film on a surface of each of the plurality of active material particles;
mixing a graphene compound, a binder, and the plurality of active material particles after the heat treatment;
performing an etching treatment on the plurality of active material particles after the heat treatment; and
forming a slurry after the etching treatment,
wherein part of the oxide film on the surface of each of the plurality of active material particles is removed by the etching treatment,
wherein the part of the oxide film which is removed by the etching treatment forms a space,
wherein a thickness of the oxide film is greater than or equal to 100 nm and less than or equal to 900 nm, and
wherein an aqueous solution containing fluorine is used for the etching treatment.

7. The method for manufacturing a negative electrode according to claim 6, wherein the space is present between a first active material particle of the plurality of active material particles and a second active material particle of the plurality of active material particles.

8. The method for manufacturing a negative electrode according to claim 7,
wherein the graphene compound is in contact with a first surface of the first active material particle of the plurality of active material particles,
wherein the graphene compound is in contact with a first surface of the second active material particle of the plurality of active material particles, and
wherein the graphene compound is in contact with a second surface of the second active material particle of the plurality of active material particles.

9. The method for manufacturing a negative electrode according to claim 6, wherein the graphene compound is in contact with the plurality of active material particles.

10. The method for manufacturing a negative electrode according to claim 6,
wherein the graphene compound includes 2 or more and 100 or less reduced graphene oxide layers,
wherein a distance between a first reduced graphene oxide layer and a second reduced graphene oxide layer is greater than or equal to 0.335 nm and less than or equal to 0.7 nm, and
wherein an average diameter of the plurality of active material particles is greater than or equal to 0.5 μm and less than or equal to 1.5 μm.

11. The method for manufacturing a negative electrode according to claim 6, wherein the heat treatment is performed at a temperature higher than or equal to 700° C. and lower than or equal to 1000° C.

* * * * *